US012540000B2

(12) United States Patent
Gilligan et al.

(10) Patent No.: US 12,540,000 B2
(45) Date of Patent: *Feb. 3, 2026

(54) THERMAL REGULATING LAY FLAT BEVERAGE CONTAINER PACKAGING

(71) Applicant: Acorn West LLC, Los Angeles, CA (US)

(72) Inventors: John Gilligan, Santa Barbara, CA (US); Ron Valtierra, Vacaville, CA (US); Justin Haas, Fairfield, CA (US)

(73) Assignee: Acorn West LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,697

(22) Filed: May 5, 2023

(65) Prior Publication Data

US 2023/0271742 A1 Aug. 31, 2023

Related U.S. Application Data

(63) Continuation of application No. 17/321,195, filed on May 14, 2021, now Pat. No. 11,685,570.

(Continued)

(51) Int. Cl.
*F25D 31/00* (2006.01)
*B65D 1/24* (2006.01)
(Continued)

(52) U.S. Cl.
CPC ........... *B65D 1/243* (2013.01); *F25D 31/007* (2013.01); *B65D 81/133* (2013.01); *B65D 81/18* (2013.01);
(Continued)

(58) Field of Classification Search
CPC ...... B65D 1/243; B65D 81/133; B65D 81/18; B65D 2501/24019; B65D 2501/24152;
(Continued)

(56) References Cited

U.S. PATENT DOCUMENTS

| | | |
|---|---|---|
| 1,310,161 A | 7/1919 | Johnson |
| 1,892,170 A | 12/1932 | Sneed, Jr. |

(Continued)

FOREIGN PATENT DOCUMENTS

| | | | | |
|---|---|---|---|---|
| BE | 882835 A | * | 8/1980 | ............. B65D 71/70 |
| GB | 2047661 | * | 8/1980 | ............. B65D 71/70 |

(Continued)

OTHER PUBLICATIONS

Complaint for Patent Infringement, dated Dec. 20, 2018, Docket No. 1 in the US District Court, Central District of California—Western Division, Case No. 2:18-cv-10568.

(Continued)

*Primary Examiner* — Gideon R Weinerth
(74) *Attorney, Agent, or Firm* — Michele V. Frank; Venable LLP

(57) ABSTRACT

Beverage container packing trays, systems, and techniques of packing beverage containers include at least a beverage container tray including beverage container contoured compartments configured to receive one or more beverage containers in a lay flat configuration. The beverage container contoured compartments include at least a cradle element, a conical element, and a neck support element. The beverage container tray includes thermo pack compartments that house transport thermo packs adjacent to at least a portion of the beverage containers.

22 Claims, 32 Drawing Sheets

Related U.S. Application Data

(60) Provisional application No. 63/025,712, filed on May 15, 2020.

(51) Int. Cl.
  *B65D 85/30* (2006.01)
  *F25D 3/06* (2006.01)
  *F25D 3/08* (2006.01)
  *B65D 81/133* (2006.01)
  *B65D 81/18* (2006.01)

(52) U.S. Cl.
  CPC ........... *B65D 2501/24019* (2013.01); *B65D 2501/24152* (2013.01); *B65D 2501/24343* (2013.01); *B65D 2501/2456* (2013.01); *F25D 2331/803* (2013.01)

(58) Field of Classification Search
  CPC .. B65D 2501/24343; B65D 2501/2456; F25D 31/007; F25D 2331/803; F25D 2331/804; F25D 2303/082; F25D 2303/084; F25D 2303/0843; F25D 2303/0844; F25D 2303/0846; F25D 19/003; F25D 3/06
  USPC ....... 220/516; 62/457.5, 457.9, 457.4, 457.7, 62/457.3
  See application file for complete search history.

(56) References Cited

U.S. PATENT DOCUMENTS

| | | | |
|---|---|---|---|
| 1,907,606 A | 5/1933 | Stoddard | |
| 1,908,389 A | 5/1933 | White | |
| 1,919,427 A | 7/1933 | Foreman | |
| 1,960,279 A | 5/1934 | Read | |
| 1,977,160 A | 10/1934 | White | |
| 2,003,134 A | 5/1935 | Bowman | |
| 2,024,648 A * | 12/1935 | Kissling | F25D 3/14 62/388 |
| 2,050,143 A | 8/1936 | White | |
| 2,189,410 A | 2/1940 | Stute | |
| 2,222,572 A | 11/1940 | Reger | |
| 2,393,245 A | 1/1946 | Hadsell | |
| 2,609,670 A | 9/1952 | Wheeler et al. | |
| 2,807,402 A | 9/1957 | Nelbach | |
| 2,973,119 A | 2/1961 | Parker | |
| 2,979,227 A * | 4/1961 | Taber | F25D 31/007 62/529 |
| 3,023,885 A | 3/1962 | Kindseth | |
| 3,038,625 A | 6/1962 | Sinner et al. | |
| 3,039,667 A | 6/1962 | Kozlik | |
| 3,368,709 A | 2/1968 | Waller | |
| 3,421,679 A | 1/1969 | Goldman | |
| 3,643,812 A | 2/1972 | Mander et al. | |
| 3,802,220 A | 4/1974 | Pompo | |
| 3,930,579 A | 1/1976 | Kurtz | |
| 4,037,722 A | 7/1977 | Bremer | |
| 4,088,259 A | 5/1978 | Sutton | |
| 4,213,310 A | 7/1980 | Buss | |
| 4,266,407 A * | 5/1981 | Gibson | F25D 3/08 62/529 |
| 4,292,817 A | 10/1981 | Loucks | |
| 4,344,300 A | 8/1982 | Taylor | |
| 4,499,997 A | 2/1985 | Swingley, Jr. | |
| 4,554,798 A | 11/1985 | D'Amour et al. | |
| 4,560,064 A | 12/1985 | Peterson et al. | |
| 4,580,412 A | 4/1986 | Wells | |
| 4,607,502 A | 8/1986 | Tomac | |
| 4,793,548 A | 12/1988 | Ross | |
| 4,819,793 A | 4/1989 | Willard et al. | |
| 4,911,300 A | 3/1990 | Colonna | |
| 4,932,548 A | 6/1990 | Bensinger | |
| 4,947,658 A | 8/1990 | Wheeler et al. | |
| 5,071,026 A | 12/1991 | Apps | |
| 5,096,085 A | 3/1992 | Eek et al. | |
| 5,201,421 A | 4/1993 | Maier | |
| 5,215,195 A | 6/1993 | Williams | |
| 5,335,770 A | 8/1994 | Baker et al. | |
| 5,377,862 A | 1/1995 | Oakes et al. | |
| 5,427,222 A | 6/1995 | Miura et al. | |
| 5,501,352 A | 3/1996 | Apps | |
| 5,582,343 A | 12/1996 | Dalvey | |
| 5,816,409 A | 10/1998 | Baker et al. | |
| 5,913,444 A | 6/1999 | Steiner | |
| 5,950,829 A | 9/1999 | Gale | |
| 5,975,300 A | 11/1999 | Gale | |
| 6,290,057 B1 * | 9/2001 | Hurley | B65D 81/133 206/592 |
| 6,325,210 B1 | 12/2001 | Henry, Jr. | |
| 6,334,329 B1 | 1/2002 | Weller | |
| 6,336,556 B1 | 1/2002 | Gale | |
| 6,598,419 B1 | 7/2003 | Tago | |
| 6,702,115 B1 | 3/2004 | Roper | |
| 6,820,743 B2 | 11/2004 | Hurley et al. | |
| 6,910,582 B2 | 6/2005 | Lantz | |
| 7,017,746 B2 | 3/2006 | Apps | |
| D561,025 S | 2/2008 | Gilfert | |
| D561,588 S | 2/2008 | Gilfert | |
| D590,715 S | 4/2009 | Gilfert | |
| 7,584,852 B2 | 9/2009 | O'Brien et al. | |
| 7,743,626 B2 | 6/2010 | Buckingham | |
| 7,789,239 B2 | 9/2010 | Juliano | |
| D631,352 S | 1/2011 | Gilfert | |
| D632,960 S | 2/2011 | Gilfert | |
| 7,883,001 B2 | 2/2011 | Goodrich | |
| 8,333,275 B2 | 12/2012 | McFarlane et al. | |
| 8,434,620 B2 | 5/2013 | Hall | |
| 8,607,984 B2 | 12/2013 | Breton et al. | |
| 8,701,884 B2 | 4/2014 | Williams et al. | |
| 8,844,718 B2 | 9/2014 | Hall | |
| 8,887,916 B2 | 11/2014 | Gilfert et al. | |
| 10,059,495 B1 | 8/2018 | Korustan et al. | |
| 10,124,924 B2 * | 11/2018 | Gilligan | B65D 21/04 |
| 10,281,188 B2 | 5/2019 | Shew | |
| 10,507,950 B2 | 12/2019 | Carrier et al. | |
| 10,619,905 B2 | 4/2020 | Starling | |
| 10,696,441 B2 | 6/2020 | Gilligan et al. | |
| 11,104,471 B2 | 8/2021 | Gilligan et al. | |
| 11,261,015 B2 | 3/2022 | Gilligan et al. | |
| 11,377,290 B2 | 7/2022 | Morine | |
| 11,685,570 B2 * | 6/2023 | Gilligan | B65D 1/243 220/516 |
| 11,713,173 B2 | 8/2023 | Gilligan et al. | |
| 11,718,442 B2 * | 8/2023 | Gilligan | B65D 1/34 206/433 |
| 11,801,966 B2 * | 10/2023 | De Blay | B65D 25/30 |
| 12,104,847 B1 * | 10/2024 | Hurley | F25D 3/08 |
| 2003/0070951 A1 | 4/2003 | Hurley et al. | |
| 2004/0031711 A1 | 2/2004 | O'Malley | |
| 2007/0138047 A1 * | 6/2007 | Berglin | B65D 81/025 206/521 |
| 2007/0277546 A1 | 12/2007 | Lehman | |
| 2008/0184674 A1 | 8/2008 | Hall et al. | |
| 2008/0302691 A1 | 12/2008 | Olson et al. | |
| 2010/0112292 A1 | 5/2010 | Gilfert | |
| 2010/0326858 A1 | 12/2010 | Williams et al. | |
| 2011/0024318 A1 | 2/2011 | Gilfert | |
| 2011/0030418 A1 | 2/2011 | Starling | |
| 2012/0037529 A1 | 2/2012 | Hall | |
| 2013/0068829 A1 | 3/2013 | Dillon et al. | |
| 2013/0126384 A1 | 5/2013 | Ogg | |
| 2013/0213854 A1 | 8/2013 | Orgeldinger et al. | |
| 2013/0313145 A1 | 11/2013 | Gilfert et al. | |
| 2014/0319018 A1 | 10/2014 | Collison | |
| 2015/0129447 A1 | 5/2015 | Tremblay | |
| 2015/0210457 A1 | 7/2015 | DiMauro | |
| 2016/0290703 A1 | 10/2016 | Allen | |
| 2017/0050757 A1 | 2/2017 | Gray et al. | |
| 2017/0138664 A1 | 5/2017 | Greenberg | |
| 2018/0037359 A1 | 2/2018 | Gilligan et al. | |
| 2019/0100347 A1 | 4/2019 | Carrier et al. | |
| 2019/0178571 A1 | 6/2019 | Kelly | |
| 2020/0109888 A1 | 4/2020 | Gosselin | |
| 2021/0018244 A1 | 1/2021 | Juan Díaz | |

(56) References Cited

U.S. PATENT DOCUMENTS

| | | | |
|---|---|---|---|
| 2021/0139215 A1 | 5/2021 | Gilligan et al. | |
| 2021/0354870 A1* | 11/2021 | Gilligan | B65D 1/243 |
| 2022/0127057 A1 | 4/2022 | Ronning et al. | |
| 2023/0091646 A1 | 3/2023 | Gilligan et al. | |
| 2023/0159255 A1* | 5/2023 | Gilligan | B65D 5/5028 |
| | | | 206/433 |
| 2023/0192348 A1 | 6/2023 | Gilligan et al. | |
| 2023/0271742 A1* | 8/2023 | Gilligan | B65D 1/243 |
| | | | 220/516 |

FOREIGN PATENT DOCUMENTS

| | | |
|---|---|---|
| GB | 2328934 A | 3/1999 |
| WO | 2008058346 A1 | 5/2008 |
| WO | 2011073406 A1 | 6/2011 |
| WO | 2015/049702 A1 | 4/2015 |

OTHER PUBLICATIONS

Defendant's Answer to Complaint; Counterclaims; and Demand for Jury Trial, dated Jun. 7, 2019 , Docket No. 22 in the US District Court, Central District of California—Western Division, Case No. 2:18-cv-10568-CJC-SK.

Answer and Affirmative Defenses to Defendants; and Counterclaims and Demand for Jury Trial, dated Jun. 28, 2019 Docket No. 27 in the US District Court, Central District of California—Western Division, Case No. 2:18-cv-10568-CJC-SK.

Complaint for Patent Infringement, dated Jan. 15, 2021, U.S. District Court Eastern District of Washington, Case No. 2:21-cv-00036-1 with Exhibits A (U.S. Pat. No. 10,124,924) and B (U.S. Pat. No. 10,696,441) (97 pages).

Notice of Allowance and Fees Due dated Jul. 31, 2018, directed to U.S. Appl. No. 15/671,348; 13 pages.

Non-Final Office Action dated May 28, 2019, directed to U.S. Appl. No. 16/180,840; 19 pages.

Final Office Action dated Sep. 12, 2019, directed to U.S. Appl. No. 16/180,840; 21 pages.

Notice of Allowance and Fees Due dated Jan. 15, 2020, directed to U.S. Appl. No. 16/180,840; 8 pages.

Notice of Allowance and Fees Due dated Mar. 18, 2020, directed to U.S. Appl. No. 16/180,840; 8 pages.

Non-Final Office Action dated Aug. 26, 2020, directed to U.S. Appl. No. 16/884,922; 16 pages.

Non-Final Office Action dated Mar. 15, 2021, directed to U.S. Appl. No. 17/098,190; 15 pages.

Notice of Allowance dated Apr. 28, 2021, directed to U.S. Appl. No. 16/884,922; 7 pages.

Non-Final Office Action dated Aug. 11, 2021, directed to U.S. Appl. No. 17/321,195; 14 pages.

Complaint for Patent Infringement and Breach of Contract; Jury Trial Demanded, dated Sep. 30, 2021, United States District Court for the Central District of California; Case No. 2:21-cv-7821; 20 pages.

Defendants' Joint Answer, Affirmative Defenses, and Counterclaims to Plaintiff's Complaint; Demand for a Jury Trial dated Dec. 28, 2021; United States District Court for the Central District of California; Case No. 2:21-cv-07821-CJC-SK; 29 pages.

First Amended Complaint for Patent Infringement and Breach of Contract, Jury Trial Demanded dated Jan. 18, 2022; United States District Court for the Central District of California; Case No. 2:21-cv-07821-CJC-SK; 20 pages.

Defendants' Joint Answer, Affirmative Defenses, and Counterclaims to Plaintiff's First Amended Complaint for Patent Infringement and Breach of Contract; Demand for a Jury Trial dated Feb. 1, 2022; United States District Court for the Central District of California; Case No. 2:21-cv-07821-CJC-SK; 43 pages.

Plaintiff Acorn West LLC's Answer to Counterclaims and Affirmative Defenses; Jury Trial Demanded, dated Feb. 22, 2022; United States District Court for the Central District of California; Case No. 2:21-cv-07821-CJC-SK; 14 pages.

Notice of Allowance and Fee(s) Due dated Mar. 15, 2022, directed to U.S. Appl. No. 17/397,619; 7 pages.

Notice of Allowance and Fee(s) Due dated Mar. 31, 2022, directed to U.S. Appl. No. 17/321,195; 9 pages.

Notice of Allowance and Fee(s) Due dated Jun. 14, 2022, directed to U.S. Appl. No. 17/397,619; 5 pages.

Corrected Notice of Allowability dated Jun. 23, 2022, directed to U.S. Appl. No. 17/397,619; 2 pages.

Notice of Allowance and Fee(s) Due dated Jul. 6, 2022, directed to U.S. Appl. No. 17/321,195; 8 pages.

Notice of Motion to Amend First Amended Complaint; Memorandum of Points and Authorities in Support Thereof filed Sep. 7, 2022, United States District Court for the Central District of California, Case No. 2:21-cv-07821-CJC-SK; 10 pages.

Declaration of Sarah S. Brooks in Support of Plaintiff's Notice of Motion to Amend First Amended Complaint and Memorandum of Points and Authorities in Support Thereof filed Sep. 7, 2022, United States District Court for the Central District of California; 114 pages.

Defendants' Joint Answer, Affirmative Defenses, and Counterclaims to Plaintiff's Second Amended Complaint for Patent Infringement and Breach of Contract dated Oct. 12, 2022; 67 pages.

Notice of Allowance and Fee(s) Due mailed Feb. 16, 2023, directed to U.S. Appl. No. 17/321,195; 8 pages.

Non-Final Rejection mailed Apr. 4, 2022, directed to U.S. Appl. No. 17/581,431; 12 pages.

Notice of Allowance and Fee(s) Due mailed Mar. 16, 2023, directed to U.S. Appl. No. 17/581,431; 8 pages.

Notice of Allowance and Fee(s) Due mailed Aug. 3, 2022, directed to U.S. Appl. No. 17/581,431; 7 pages.

Corrected Notice of Allowability mailed Aug. 30, 2022, directed to U.S. Appl. No. 17/581,431; 4 pages.

Non-Final Rejection mailed Aug. 29, 2023, directed to U.S. Appl. No. 18/108,799; 7 pages.

Notice of Allowance mailed Nov. 3, 2023, directed to U.S. Appl. No. 18/108,799; 7 pages.

Non-Final Rejection dated Oct. 18, 2024, directed to U.S. Appl. No. 17/993,818; 10 pages.

Non-Final Rejection dated Oct. 22, 2024, directed to U.S. Appl. No. 17/993,822; 10 pages.

Notice of Allowance dated Jul. 31, 2024, directed to U.S. Appl. No. 18/108,799; 5 pages.

Notice of Allowance dated Mar. 7, 2024, directed to U.S. Appl. No. 18/108,799; 5 pages.

Final Rejection dated Feb. 27, 2025, directed to U.S. Appl. No. 17/993,818; 12 pages.

Notice of Allowance dated Mar. 19, 2025, directed to U.S. Appl. No. 18/108,799; 7 pages.

Final Rejection dated May 23, 2025, directed to U.S. Appl. No. 17/993,822; 16 pages.

Non-Final Rejection dated Dec. 30, 2025, directed to U.S. Appl. No. 17/993,818; 11 pages.

\* cited by examiner

THERMAL REGULATING LAY FLAT BEVERAGE CONTAINER PACKAGING

CROSS REFERENCE TO RELATED APPLICATION

This application is a continuation of U.S. patent application Ser. No. 17/321,195, entitled "THERMAL REGULATING LAY FLAT BEVERAGE CONTAINER PACKAGING," filed May 14, 2021, which claims priority to U.S. Provisional Application No. 63/025,712, entitled "THERMAL REGULATING LAY FLAT BEVERAGE CONTAINER PACKAGING," filed on May 15, 2020, the disclosures of which are incorporated by reference herein in their entirety.

TECHNICAL FIELD

The present disclosure relates to packaging for materials, and particularly to packaging for beverage containers, such as wine bottles, beer bottles, spirits bottles, and the like.

BACKGROUND

Historically, packaging and/or packaging materials for shipment of beverage containers (e.g., wine bottles, beer bottles, spirits bottles, etc.) have included bubble wrap, Styrofoam, popcorn, and other traditional packaging materials. For example, multiple bottles could be wrapped in bubble wrap, positioned in Styrofoam, and/or otherwise secured and placed into a box for transit. More recently, molded paper pulp trays have been used to secure multiple bottles during transit. Beverage containers may be packaged to lay flat, rather than upright, during transit. In certain instances, consumers and/or beverage container producers may wish to control the temperature in molded paper pulp beverage container packing. There is a need for improved beverage container packaging and, more particularly, a lay flat beverage container packaging configured to regulate the temperature of beverage containers.

SUMMARY

A beverage container packing tray includes beverage container contoured compartments configured to receive one or more beverage containers in a lay flat configuration. The beverage container contoured compartments may include at least a cradle element, a conical element, and a neck support element. The beverage container packing tray may include at least one transport thermo pack compartment configured to house one or more transport thermo packs adjacent to at least a portion of the beverage containers.

According to various aspects, the beverage container packing tray includes thermo pack compartments located adjacent to a portion of the beverage container contoured compartments that are configured to house an upper portion of a beverage container.

According to various aspects, the beverage container packing tray includes thermo pack compartments with a recessed area configured to house the transport thermo pack adjacent to a neck of a beverage container.

According to various aspects, the beverage container packing tray includes a thermo pack compartment including a recessed area configured to house the transport thermo pack between the necks of a plurality of beverage containers.

According to various aspects, the beverage container packing tray includes thermo pack compartments located adjacent to corners the beverage container packing tray.

According to various aspects, the beverage container packing tray includes thermo pack compartments located adjacent at least one of the beverage container contoured compartments.

According to various aspects, the beverage container packing tray includes a plurality of platforms.

According to various aspects, the beverage container packing tray includes platforms that include substantially flat surfaces that allow the beverage container packing tray to be stacked on a second beverage container packing tray.

A beverage container packing system includes a first beverage container packing tray including beverage container contoured compartments and one or more thermo pack compartments. Each of the beverage container contoured compartments may be configured to receive a beverage container in a lay flat configuration and the thermo pack compartments may be configured to receive a transport thermo pack adjacent to at least a portion of a beverage container. The beverage container packing system may include a second beverage container packing tray defining second beverage container contoured compartments and second thermo pack compartments. The second beverage container packing tray may be substantially similar to the first beverage container packing tray.

According to various embodiments, a beverage container packing system may include a shipping container configured to receive the first and second beverage container packing trays.

According to various aspects, the beverage container packing system may include beverage container contoured compartments that include a bottle cradle element, a conical element, and bottle neck support element.

According to various aspects, the beverage container packing system may include a thermo pack compartment that is located adjacent to a portion of the beverage container contoured compartment that is configured to house an upper portion of a beverage container.

According to various aspects, the beverage container packing system may include a thermo pack compartment that includes a recessed area configured to house the transport thermo pack adjacent to a neck of a beverage container.

According to various aspects, the beverage container packing system may include a thermo pack compartment that includes a recessed area configured to house the transport thermo pack between the necks of a plurality of beverage containers.

According to various aspects, the beverage container packing system may include thermo pack compartments that are located adjacent to corners of the first tray and second tray.

According to various aspects, the beverage container packing system may include first and second beverage container packing trays that are configured to at least partially encapsulate the beverage container and transport thermo packs.

According to various aspects, the beverage container packing system may include first and second beverage container packing trays that include a plurality of platforms that include substantially flat surfaces that allow the first and second trays to be stacked.

According to various aspects, the beverage container packing system includes a box liner configured to receive at least the first and second beverage container packing trays inside of the shipping container.

A method of packing beverage containers includes placing a plurality of beverage containers in a plurality of bottle contoured compartments in a first beverage container packing tray. The compartments may be configured to receive a beverage container in a lay flat configuration. At least one transport thermo pack is placed in a thermo pack compartment adjacent to at least one of the bottle contoured compartments. A tray assembly is assembled by placing a second beverage container packing tray onto the first beverage container packing tray so that beverage containers and transport thermo packs are at least partially encapsulated by the first and second trays. The tray assembly is placed in a shipping container.

According to various aspects, the method of packing beverage containers further includes placing a box liner in the shipping container, the box line including an insulating material.

According to various aspects, the method of packing beverage containers further includes placing beverage containers in bottle contoured compartments of a third beverage container packing tray. At least one transport thermo pack is placed in a thermo pack compartment adjacent to the bottle contoured compartments. A second tray assembly is assembled by placing a fourth beverage container packing tray onto the third beverage container packing tray so that beverage containers and transport thermo packs are at least partially encapsulated by the third and fourth trays. The second tray assembly is placed on the tray assembly in the shipping container.

BRIEF DESCRIPTION OF DRAWINGS

The foregoing and other features and advantages of the disclosure will be apparent from the following, more particular description of various exemplary embodiments, as illustrated in the accompanying drawings wherein like reference numbers generally indicate identical, functionally similar, and/or structurally similar elements. The first digits in the reference number indicate the drawing in which an element first appears.

DETAILED DESCRIPTION

Figure 1:
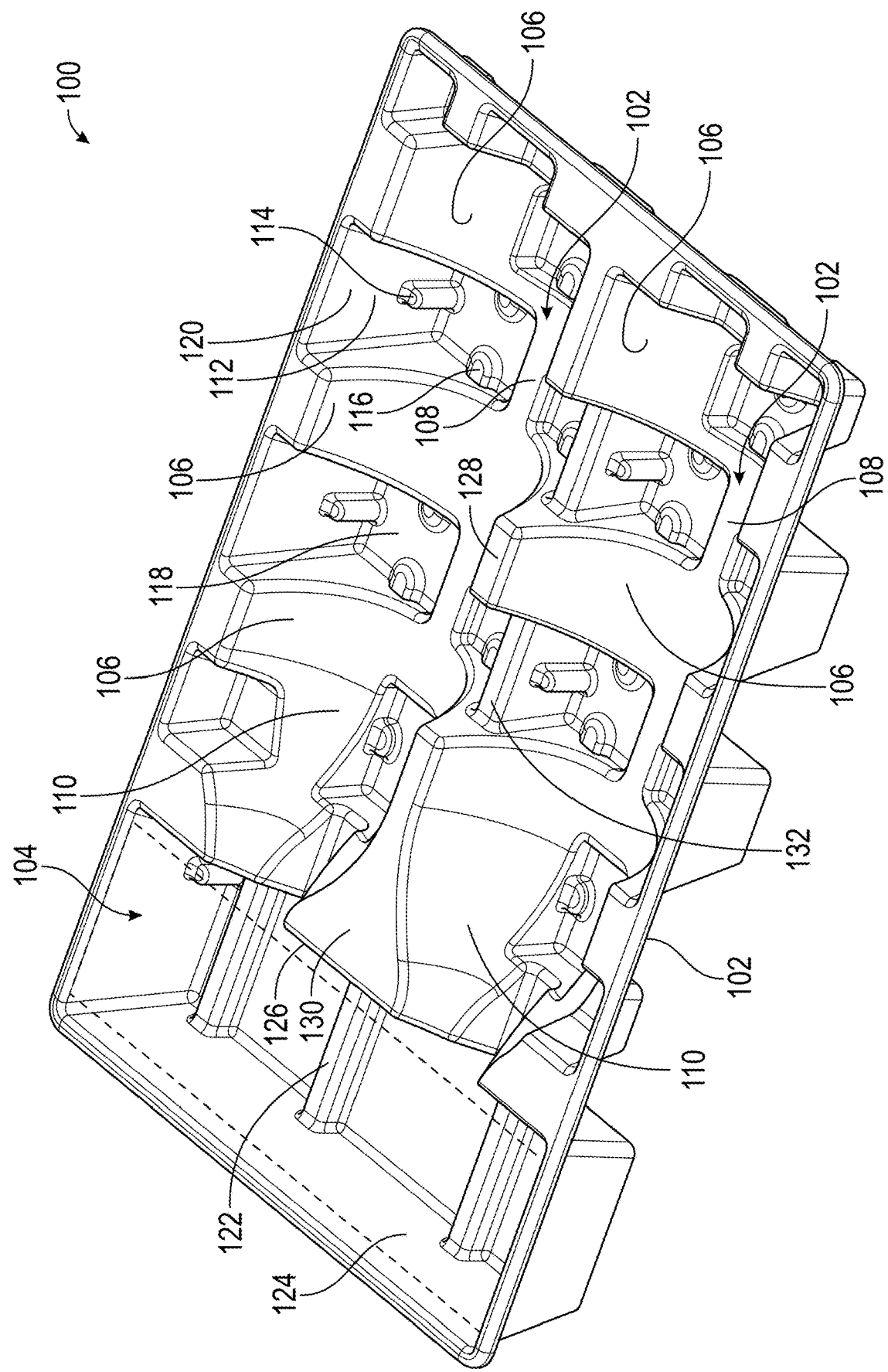
FIG. 1 depicts a beverage container packing tray according to various embodiments.

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

Any publications and references cited herein are hereby incorporated by reference in their entirety.

As used herein, the term "a" refers to one or more. The terms "including," "for example," "such as," "e.g.," "may be" and the like, are meant to include, but are not be limited to, the listed examples.

Beverage container packing as described and shown herein is directed to molded trays, such as molded paper-pulp trays, that can accommodate beverage containers in an environmentally regulated environment. The beverage container packing disclosed herein may include trays configured to accommodate beverage containers in horizontal configuration (or lay flat configuration) along with components, elements, and/or mechanisms for controlling environmental conditions in the packaging, such as transport thermo packs, ice packs, thermo bricks, heaters, and the like to prevent spoiling during transport, especially during hotter or colder times of the year.

Beverage container packing or packaging is disclosed herein in various embodiments. These various embodiments and configurations may include beverage container packing trays that encapsulate multiple beverage containers. The trays may retain multiple beverage containers, such as wine bottles, beer bottles, spirits bottles, and the like, for shipment in a container, such as a cardboard box, crate, or other container. The beverage containers may vary in size including, for example, 375 ml, 500 ml, 750 ml, or any other size. The term beverage container as used herein may also refer to any container that encloses a fluid, whether or not the fluid is a beverage.

The beverage container packing tray retains multiple beverage containers along with mechanisms for regulating the temperature or other environmental conditions inside the packaging. The mechanisms for regulating temperature or other environmental conditions in the packaging may be referred to thermo packs or transport thermo packs. A thermo pack may include, for example, a plastic or other material that encloses a fluid or solid that absorbs thermal energy. In one example, the thermo pack includes a gel-based cold pack. In another example, the thermo pack includes ice, a solid that simulates ice, a thermal brick, and/or other solid that absorbs thermal energy. Alternatively, a transport thermo pack may be a heating pack that radiates thermal energy, thereby maintaining the beverage containers at a higher temperature than would occur without a heating source. Each transport thermo pack may transmit thermal energy to or absorb thermal energy from one or more beverage containers. The transport thermo pack may be contoured to match the space between adjacent rows of beverage containers. Other temperature regulation components or items used to control temperature may include heaters, mechanisms to provide heat, coolers, refrigerators, fans, ice packs, heating packs, chemical elements that heat or cool the packaging, and/or any other items or devices to modify or control temperature in the packaging. The trays may be configured to accommodate transport thermo packs, for example, near to the top of the beverage containers, near the bottom of the beverage containers, along the side of the beverage containers, surrounding the beverage containers, in between beverage containers, or in other locations. The transport thermo packs are placed in the tray at appropriate locations.

Once the beverage containers and transport thermo packs are placed in a first tray, a second tray is placed on the first tray. The second tray may include, for example, a similar geometry to the first tray. In certain cases, the shape (contours) of the second tray may mirror the shape of the first tray. In some instances, the first tray and second tray may be identical or substantially identical with the exception of, for example, minor differences. In some cases, the second tray may include different geometry than the first tray. The second tray geometry may, for example, compliment the first tray. The second tray may accommodate the beverage containers and the transport thermo packs. The first tray and second tray may encapsulate the beverage containers and transport thermo packs in a claim-shell, sandwich, and/or similar configuration. The first tray, second tray, beverage containers, and thermo transport packs are placed in a shipping container, such as a cardboard box, regular slotted container (RSC), crate, or similar container, for transit. In certain cases, multiple assemblies of first tray, second tray, beverage containers, and thermo transport packs may be stacked in a shipping container.

In various embodiments, a beverage container packing tray may include bottle accommodating elements, thermo pack accommodating elements, and other features. The bottle accommodating elements and other elements of the tray may allow for the beverage container to lay flat during transit, rather than being upright. Laying flat may reduce the susceptibility of the bottle to impact and damage during transit. The lay flat configuration may allow the bottles to be used with certain types of packaging containers (e.g., cardboard boxes). The bottle accommodating elements may match or resemble the contour of a beverage container. The bottle accommodating elements may include cradle elements, conical elements, semi-conical elements, and/or other elements. The bottle accommodating elements (and subcomponents) may be contoured to encapsulate a beverage container, such as a wine bottle, beer bottle, spirits bottles, and the like. These features of the bottle accommodating elements, particularly the cradle elements, conical elements, the recessed areas between the elements, and/or the cavities between the cradle and conical elements absorb energy when the container is subjected to impact forces, such as when the packaging is dropped or roughly handled. Absorbing impact in the beverage container accommodating elements prevents the beverage containers from being damaged.

The beverage container packaging as disclosed herein may include spaces and/or structure to accommodate thermo transport packs. The beverage container packing system disclosed herein includes spaces to package the thermo packs positioned between and/or around the beverage containers. The use of thermo packs and/or other temperature regulation components with molded paper pulp or other packaging materials provides temperature control in a cost effective, light weight, structurally sound, and environmentally-conscious packaging manner. By including thermo transport packs in the beverage container packaging, the environmental conditions, such as temperature, humidity, ventilation, and/or other conditions, are controlled during transit. For example, the transport thermo pack may, for example, increase the humidity in the package. In some cases, the transport thermo pack may absorb moisture in the package to decrease the humidity of the package. Humidity control may be useful in scenarios where beverage containers are transmitted in conjunction with food items, vegetation, tobacco products, medicines, and/or other material affected by humidity changes. Controlling environmental conditions during transit may be for example be useful (and in certain cases necessary) in transporting beverages that are sensitive to environmental conditions. For example, the beverage container packaging disclosed herein allows temperature-sensitive beverages to be packaged and transported without spoiling and/or degradation due to environmental effects. The beverage container packaging includes space to accommodate thermo packs and/or other items used to control temperature, while maintaining the structural integrity of the packaging. For example, the trays and/or other elements of the beverage container packaging include a combination of spaces or voids to accommodate thermo packs and/or other items used to control temperature and sufficient structural elements to withstand loads, impacts, and/or other dynamic events during shipping.

In various embodiments, beverage container packing trays may be fabricated from molded paper pulp. The molded paper pulp may include and/or be fabricated from recycled paper products. In certain cases, the molded paper pulp and/or other packaging materials include a liquid resistant coating, plastic wrapping, material treatment, and/or other features to accommodate the environmental effects of a thermo pack housed in the packaging. The beverage container packaging trays according to some embodiments may include a moisture resistant material that retains structural integrity throughout transit and storage. The thermo packs can provide additional protection of the beverage containers, but the packing system can also be used without thermo packs. The moisture resistance within the center support allows the center support to absorb excess moisture and pull moisture from the wine labels, thus adding another protection benefit. In contrast, expanded polystyrene (EPS) containers do not allow excessive moisture to escape from the cavity, leaving bottle labels at risk. The rapid exchange of temperature within the packing system described herein allows for rapid evaporation of moisture from within the regular slotted container (RSC) shipping container.

In some embodiments, the shipping container, trays, and other components may include a water-resistant coating. For example, a coating may be applied to the molded paper pulp such that the paper pulp maintains its shape in the presence of moisture. The transport thermo pack disposed beverage container packing trays may leak, or a temperature difference between the atmospheric temperature and the temperature of the transport thermo pack may cause condensation to form. By coating the trays, shipping container, and/or other components with a water-resistant coating, the system can maintain its shape and provide support and cushioning for the beverage containers.

The coating according to various embodiments is a water-based additive that is mixed in the paper slurry before the actual molding cycle. Less than 3% of water used in production is made of the additive. The water-based material does not outgas, deform, or add any negative effects to the parts and environment. It does, however, add slight moisture and/or water resistance. This reduces the likelihood of degradation during use with thermo packs, product transportation, and shipping through humid areas. The outer shipping container may not need any coating as the pulp inners may retain moisture with the bottom cavities, such as the first compartments of the bottom tray. The additive to the pulp allows the paper material to absorb moisture and pull moisture from wine labels. The additive to the pulp also allows the paper material to exchange moisture with the atmosphere, thereby allowing the bottom tray, the center support, and/or the top tray to expel moisture without degrading their structural integrity.

In various embodiments, the beverage container shipping systems disclosed herein may also include box liners. For example, a box liner may provide insulation surrounding the packaging elements, such as pairs of beverage container packing trays. The box liner may line the inside a shipping container, such as cardboard box. Box liners of varying degrees of thickness, materials, and other properties may be used to enhance the thermal capabilities of the beverage container packaging. The box liner may in conjunction with, for example, the transport thermo packs increase the R value of the cooling time range for the beverage container packaging. In certain cases, the box liner is fabricated from recyclable materials to reduce the environmental impact of the beverage container packaging.

FIG. 1 depicts a beverage container packing tray according to various embodiments. In the example shown, a beverage container packing tray 100 includes bottle contoured compartments 102 (beverage container contoured compartments, bottle contoured elements), thermo pack compartment 104 (thermo pack space, thermo pack accommodating space, thermo brick slot), and/or other elements. The beverage container packing tray 100 (also referred to as a tray, packing tray) is configured to accommodate beverage containers (not shown) in a lay flat or horizontal position. The bottle contoured compartments 102 (two shown) are configured to support a beverage container that is laid flat in the tray 100. The bottle contoured compartments 102 may include one or more cradle elements 106, spine elements 108, conical elements 110 (semi-conical elements), and/or other elements. The cradle elements 106 may include a semi-circular cradle shape structure that matches or approximates the outer shape of the beverage container. The cradle elements 106 are configured to continuously surround a portion of the beverage container, such as half of the container. In the example shown, the cradle elements 106 partially surround roughly half of the beverage container at two locations near the bottom of the container. The cradle elements 106 are separated by recessed portions 112. The recessed portions 112 may include a gap in material between the cradle elements 106. In certain cases, the recessed portions 112 include first stiffener elements 114 and second stiffener elements 116. The stiffener elements 114 may provide structural rigidity. The stiffener elements 114 may also be configured to deform when the tray 100 is subject to loading. The first stiffener elements 114 may be located between a base 118 of the tray and a side wall 120 of the tray. The first stiffener 114 provides structural rigidity in the event that a side wall 120 is flexed away from or toward the center of the tray 100. The second stiffener elements 116 may be located between a base 118 of the tray (tray base) and a cradle element 106. The second stiffener elements 116 may provide structural rigidity as the tray 100 is flexed about its long end.

In certain cases, there are platforms 128 between adjacent cradle elements and platforms 130 between the conical elements 110. The platforms 128, 130 provide structural rigidity in the tray and define the boundary between adjacent bottle contoured compartments 102. Recessed elements 132 are located between the platforms 128 and/or platforms 130. The recessed elements 132 allow the tray 100 to flex with loads applied, for example, during transit.

In various embodiments, a spine element 108 may connect multiple cradle elements 106. By analogy to anatomy, the spine element 108 may resemble a spine and the cradle elements 106 may resemble ribs. The spine element 108 may connect multiple cradle elements 106. The conical element 110 may be configured to match the contour of (surround) a tapered portion of a beverage container. For example, certain beverage containers, such as wine bottles include a tapered portion near the upper portion of the bottle. The conical element 110 is configured to accommodate the tapered portion of the beverage container. The conical element 110 may resemble the shape of a space shuttle capsule. The conical element 110 may taper to a neck of the beverage container. For example, the neck of the beverage container may pass through an end of the conical element 110. The neck of the beverage container may extend from an end of the conical element 110 and into a thermo pack compartment 104.

In various embodiments, a thermo pack compartment 104 is configured to house one or more thermo packs. In certain cases, beverage containers are placed in the beverage container contoured compartment 102 and transport thermo packs are placed in the thermo pack compartment 104. The thermo pack compartment 104 may include dividers 122 (ribs) that partition in the thermo pack compartment 104. The dividers 122 may be positioned to accommodate the size of the thermo pack. The dividers 122 may reduce the surface area of a transport pack that contacts the bottom surface transport pack compartment 104. The transport thermo packs may include water from, for example, condensate. Exposing the tray 100 to water over a period of time may cause damage to the tray. So, it may be advantageous to limit the surface area of the tray 100 that contacts the pack. In certain cases, the dividers 122 enhance the structural characteristics of the thermo pack compartment.

In various embodiments, the thermo pack compartment 104 is bounded by outer walls 124 a partition wall 126. The outer walls 124 form the outside of the tray 100 in the thermo compartment 104 portion of the tray 100. The partition wall 126 defines a boundary between the thermo pack compartment 104 and the bottle contoured compartments 102. The geometry of the thermo pack compartment 104 may be sized to accommodate particular thermo packs. Thermo transport packs (not shown) are placed in the thermo pack compartment adjacent to, for example, the upper portion (e.g., necks) of the beverage containers. As a result of their placement near the necks of the beverage containers, the transport thermo packs provide cooling or heating directly to the beverage containers.

In some embodiments, beverage containers (not shown) are placed in the beverage container packing tray 100 in, for example, the beverage container contoured compartments 102. The beverage containers may contact the cradle elements 106, the spine elements 108, and the conical elements 110. A portion of the beverage container may extend into the transport thermo pack compartment 104. Transport thermo packs are placed in the transport thermo pack compartment 104. A second tray may be placed on the top of the tray. The second tray may be identical to the first tray and/or may mirror the first tray. The first and second trays may completely surround, protect, and secure the beverage containers, transport thermo packs, and other items. This assembly may be placed in beverage container shipping container.

Figure 2:
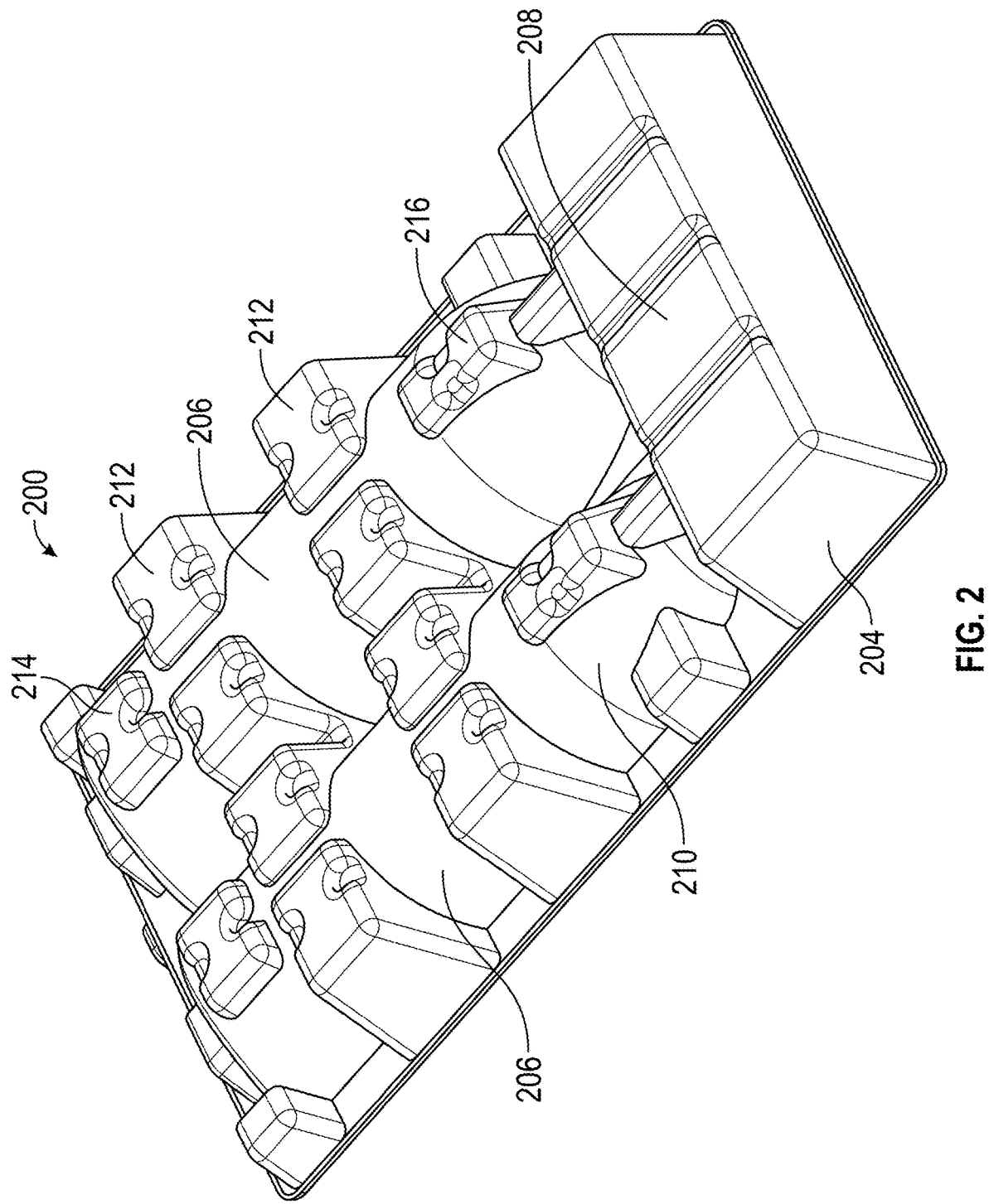
FIG. 2 depicts an underside of a beverage container packing tray according to various embodiments.

FIG. 2 depicts an underside of a beverage container packing tray according to various embodiments. In the example shown, a beverage container packing tray 200 is depicted. The beverage container packing tray 200 depicted may include a different view, such as a bottom view or underside view, of beverage container packing tray 100 of FIG. 1. The beverage container packing tray 200 may include cradle elements 206. The cradle elements 206 may include the underside of cradle elements 106 of FIG. 1. The tray 200 includes conical elements 210, which may include the underside of conical elements 110 of FIG. 1. The tray 200 further includes a thermo pack compartment 204, which may include the underside of thermo pack compartment 104 of FIG. 1.

The beverage container packing tray 200 includes platforms 208, 212-216. The platforms allow the tray 200 to sit steady on a flat surface, such as the bottom of shipping container, a box, a top or bottom of another tray, and/or any other relatively flat surface. In certain cases, the platforms 208, 212-216 aid in stacking of beverage tray container packing trays 200. In the example shown, the tray 200 includes thermo pack compartment platforms 208 (four platforms shown). Platforms 208 may be located on the underside of thermo pack compartment 104 of FIG. 1. Platforms 216 may extend from the conical elements 210. In the example shown, two platforms 216 extend from the conical elements 210. Platforms 212 may be disposed between the cradle elements 206. Platforms 212 (eight shown) may include and/or extend from, for example, the recessed elements 132 between the cradle elements 106 of FIG. 1. Platforms 214 may extend from the cradle elements 206. In the example shown, two platforms 214 extend from the cradle elements 206 that contact a lower portion of a beverage container.

In certain cases, multiple beverage container trays 200 are stacked on top of one another in a shipping container. A first tray 200 may be placed in the bottom of the shipping container, loaded with beverage containers, and transport thermo packs. A second tray 200 is placed on top of the first tray so the two trays encase (surround) the beverage containers, thermo transport packs, and other components. Platforms 208, 212-216 of a third tray may be stacked on the platforms 208, 212-216 of the second tray 200. Because the platforms include flat or relatively flat surfaces, the trays may be efficiently stacked. The flat surfaces of the platforms 208, 212-216 allow stacked beverage container trays 200 to transmit load between trays while reducing the load applied to beverage containers housed within the trays. Stacking flat platforms 208, 212-216 of one tray on the platforms of another tray allows the trays to be stacked while reducing damage to the trays, which may be fabricated out of paper-based materials that are somewhat susceptible to damage. In some instances, a first set of trays is stacked on a second set of trays during transit to ship, for example, four beverage containers. Additional sets of trays may be stacked to ship six, eight, or any number of beverage containers in a single package.

Figure 3:
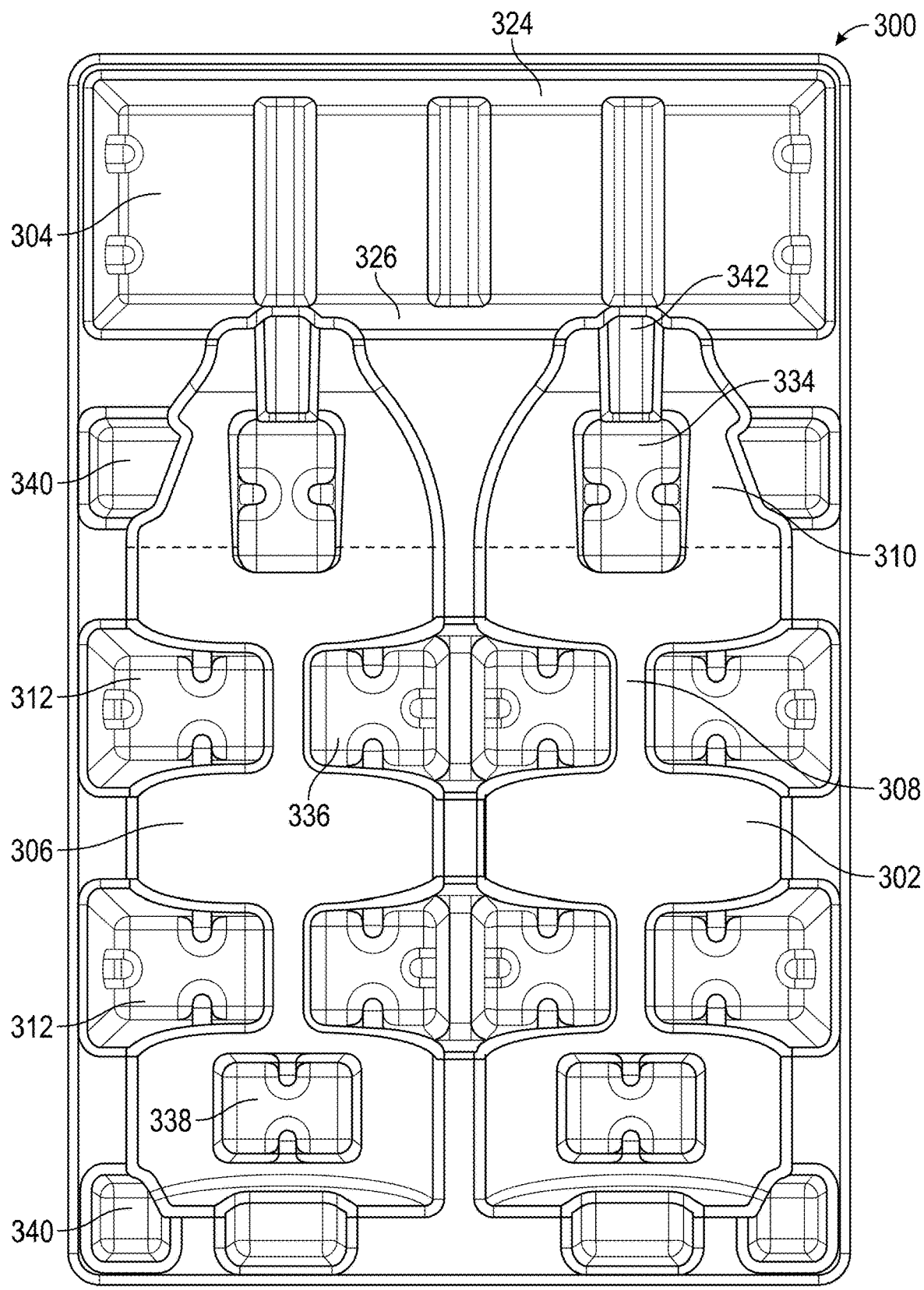
FIG. 3 depicts a top view of a beverage container packing tray according to various embodiments.

FIG. 3 depicts a top view of a beverage container packing tray according to various embodiments. The beverage container packing tray 300 may be similar to tray 100 of FIG. 1 and/or tray 200 of FIG. 2. In the example shown, the packing tray 300 includes bottle contoured compartments 302, a thermo pack compartment 304, and/or other elements. The bottle contoured components 302 may include, for example, bottle cradle elements 306, spine elements 308, conical elements 310, neck support elements 342 (bottle neck supports), and other components. In certain cases, the neck support element 342 may be an element of the conical section 310. The neck support element 342 may be configured to support a neck portion of a beverage container, such as a wine bottle, spirits bottle, beer bottle, soda bottle, and the like. The neck portion 342 may span the conical section and terminate at a partition wall 326 of the thermo pack compartment 304.

In various embodiments, the tray 300 includes multiple recessed elements 312, 334, 336, 338, 340. Recessed elements 312 may be located between cradle elements 306 along the outer edges of the tray 300. Recessed elements 336 may be located between cradle elements 306 along the inner portion of the tray 300. Recessed elements 312, 336 may be included to provide platforms (e.g., platforms 212 of FIG. 2) on an opposite side (bottom side) of the tray 300. Recessed elements 334 are included in the conical section 310 of the tray 300. The recessed elements 334 form platforms, such as platforms 216 of FIG. 2, on an opposite side of the tray 300. Recessed elements 334 also function to provide structural rigidity and flexibility in the conical section 310. Recessed elements 338 are included in the cradle elements 302 that contact a lower portion of the beverage container. Recessed elements 338 form platforms, such as platform 214 of FIG. 2, on an opposite side of the tray 300. Additional recessed elements 340 are included at locations around a perimeter of the tray 300. Recessed elements 340 function to stiffen the tray and/or increase the structural rigidity of the tray 300.

In various embodiments, the thermo pack compartment 304 is configured to house (accommodate) thermo packs. The thermo pack compartment 304 is bounded by outer walls 324 and a partition wall 326. The outer walls 324 define portions of the outer surface of the tray 300. The partition wall 326 may define a boundary (border) between the thermo pack compartment 304 and the beverage container accommodating space 302. The partition wall 326 and outer walls 324 may include a draft (for example, a seven degree or other draft) to enable the tray 300 to be removed from the mold during fabrication.

Figure 4:
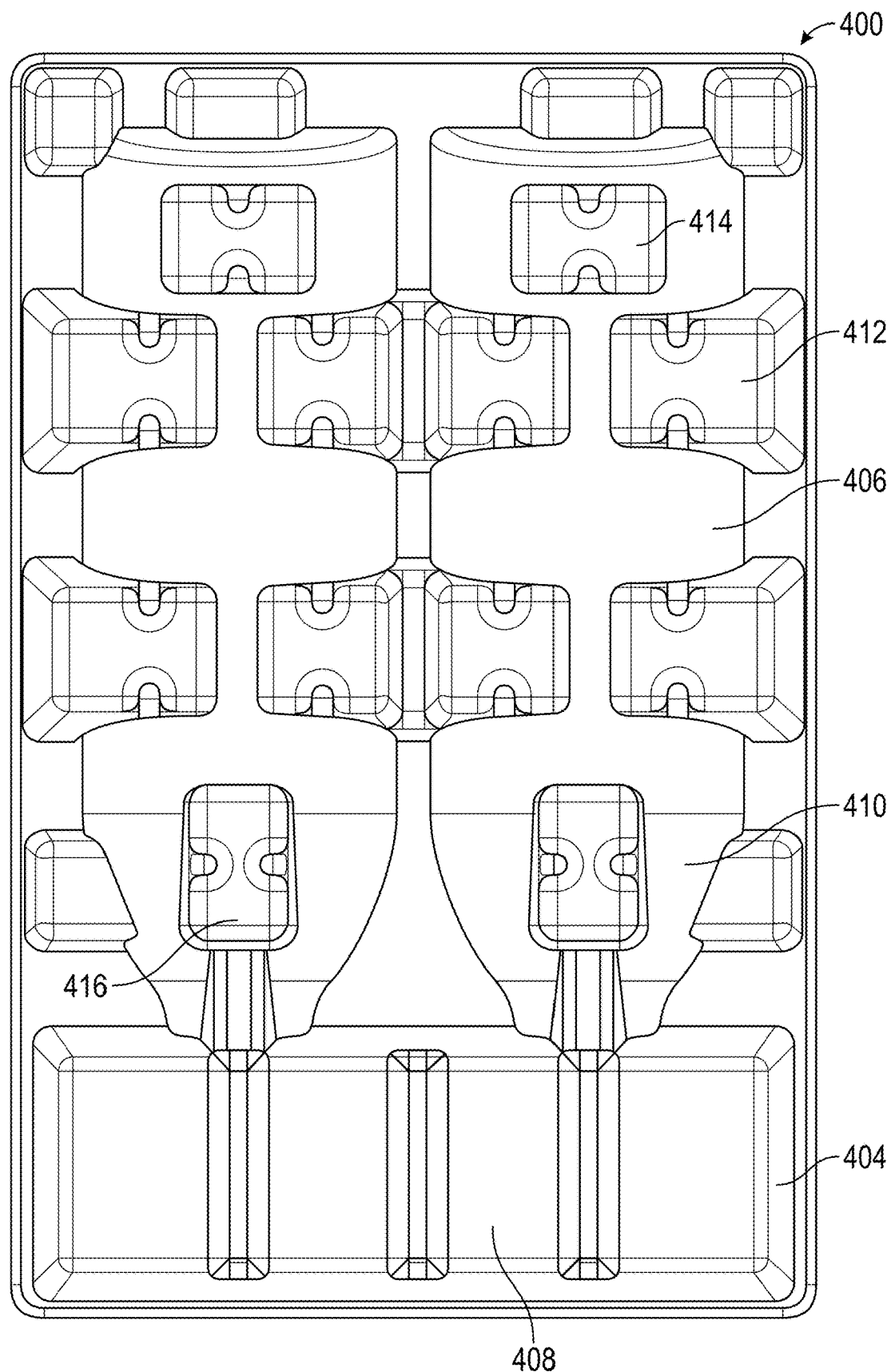
FIG. 4 depicts a bottom view of beverage container packing tray according to various embodiments.

FIG. 4 depicts a bottom view of beverage container packing tray according to various embodiments. The beverage container packing tray 400 may be similar to tray 100 of FIG. 1, tray 200 of FIG. 2, and/or tray 300 of FIG. 3. The beverage container packing tray 400 depicted may include a different view, such as a bottom view or underside view, of beverage container packing tray 100 of FIG. 1 and/or tray 300 of FIG. 3. The beverage container packing tray 400 may include cradle elements 406, conical elements 410, thermo pack compartments 404, and/or other elements.

The beverage container packing tray 400 includes platforms 408, 412-416. The platforms 408, 412-416 allow the tray 400 to sit steady on a flat surface, such as the bottom of shipping container, a box, a top of another tray, and/or any other relatively flat surface. In certain cases, the platforms 408, 412-416 aid in stacking of beverage tray container packing trays 400. In the example shown, the tray 400 includes thermo pack compartment platforms 408 (four platforms shown). Platforms 416 may extend from the conical elements 410. In the example shown, two platforms 416 extend from the conical surface 410. Platforms 412 may be disposed between the cradle elements 406. Platforms 414 may extend from the cradle elements 406. In the example shown, two platforms 414 extend from the cradle elements 406 that contact a lower portion of a beverage container.

Figure 5:
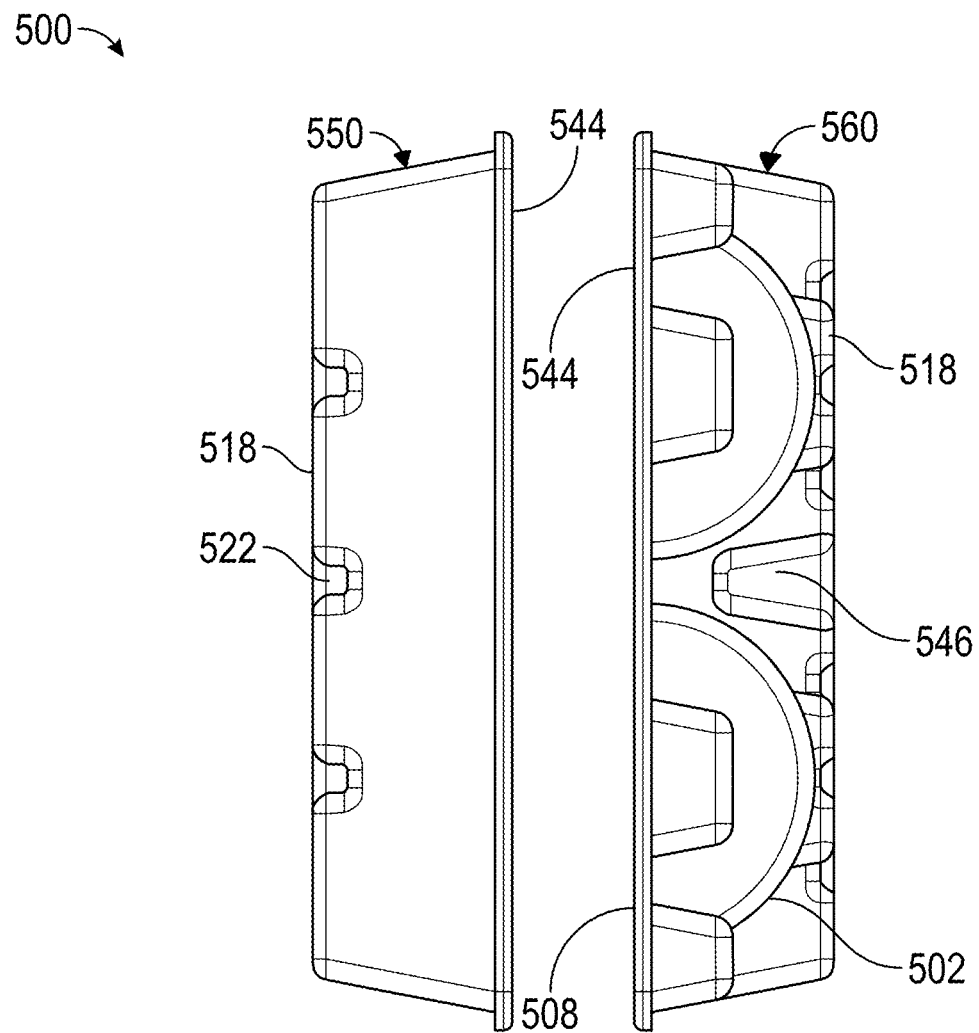
FIG. 5 depicts front, back, and side views of a beverage container packing tray according to various embodiments.
Figure 5:
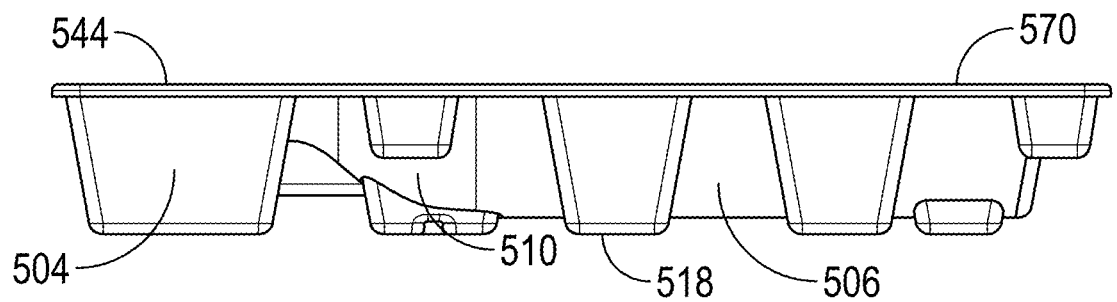

FIG. 5 depicts front, back and side views of a beverage container packing tray according to various embodiments. Three separate views of the beverage container packing tray 500 are depicted in the figure shown. As shown, a front view 550 of a beverage container packing tray includes a tray base 518 (a bottom of a tray) and an upper surface 544 of a tray. The front view 550 may depict the thermo pack compartment end 504 of the tray 500. The thermo pack compartment dividers 522 are depicted.

In the example shown, a back view 560 of a beverage container packing tray includes a tray base 518 and an upper surface 544 of the tray. The back view 560 may depict an end of the tray including the bottle accommodating spaces 502. A center channel 546 is located in the center of tray. The center channel 546 may span the underside of platforms between bottle accommodating spaces 502 (e.g., the underside of platforms 128, 130 of FIG. 1).

As shown, a side view 570 of a beverage container packing tray includes a tray base 518 and an upper surface 544 of the tray. The side view of thermo pack compartment 504 illustrates the draft of the walls of the same. The bottle cradle elements 506 and conical elements 510 are shaped to match the contour of a beverage container.

Figure 6:
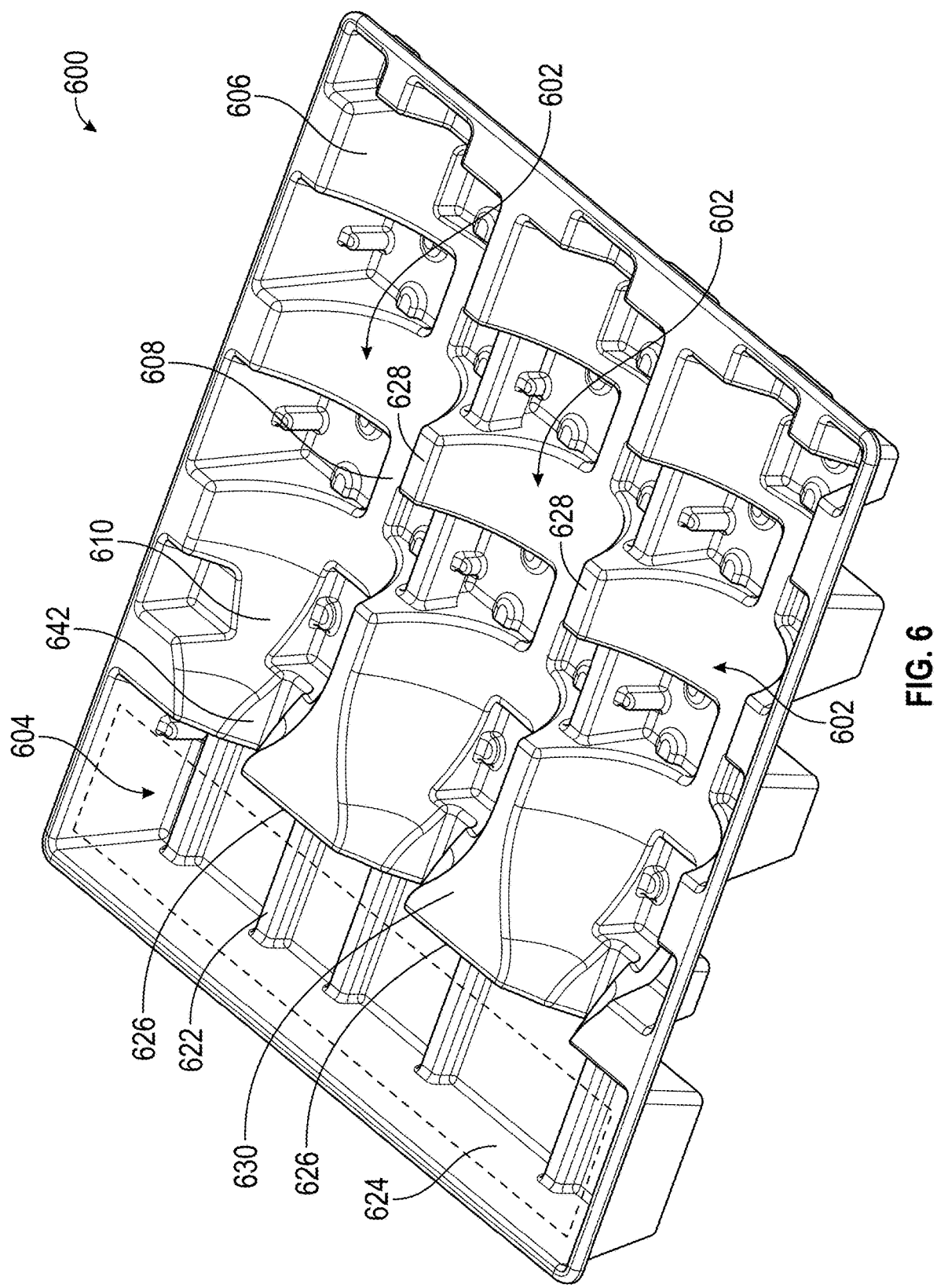
FIG. 6 depicts a beverage container packing tray according to various embodiments.

FIG. 6 depicts a beverage container packing tray according to various embodiments. In the example shown, a beverage container packing tray 600 is configured to accommodate three beverage containers. Beverage container packing tray 600 may be similar in many respects to the beverage container packing trays 100, 200, 300, 400, 500 of FIGS. 1-5, and some of features that are similar across the designs will not be discussed in relation to FIG. 6 to avoid redundancy. The beverage container packing tray 600 may include bottle contoured compartments 602, thermo pack compartments 604, and/or other elements. The bottle contoured compartments 602 include bottle cradle elements 606, spine elements 608, conical elements 610, bottle neck support elements 642, and/or other components. The bottle neck support elements 642 include a pass through to accommodate the neck portion, a reduced diameter portion, of a beverage container. The beverage container packing tray 600 (also referred to as a tray, packing tray) is configured to accommodate three beverage containers (not shown) in a lay flat or horizontal position.

In some embodiments, there are platforms 628 between adjacent cradle elements and platforms 630 between the conical elements 610. The platforms 628, 630 provide structural rigidity in the tray 600 and define the boundary between adjacent bottle contoured compartments 602.

In various embodiments, a thermo pack compartment 604 houses thermo packs. In certain cases, beverage containers are placed in the tray 600 in the bottle contoured compartments 602. The thermo pack compartment 604 may include dividers 622 (ribs) that partition in the thermo pack compartment 604. The dividers 622 may be reduce thermo pack contact with the tray 600. In certain cases, the dividers 622 enhance the structural characteristics of the thermo pack compartment 604. The thermo pack compartment 604 may be sized to accommodate multiple thermo packs and/or particular sizes of thermo packs.

In various embodiments, the thermo pack compartment 604 is bounded by outer walls 624 and a partition wall 626. The outer walls 624 form the outside of the tray 600 in the thermo compartment 604 portion of the tray 600. The partition wall 626 defines a boundary between the thermo pack compartment 604 and the beverage container contoured compartments 602. The geometry of the thermo pack compartment 604 may be sized to accommodate particular thermo packs.

Figure 7:
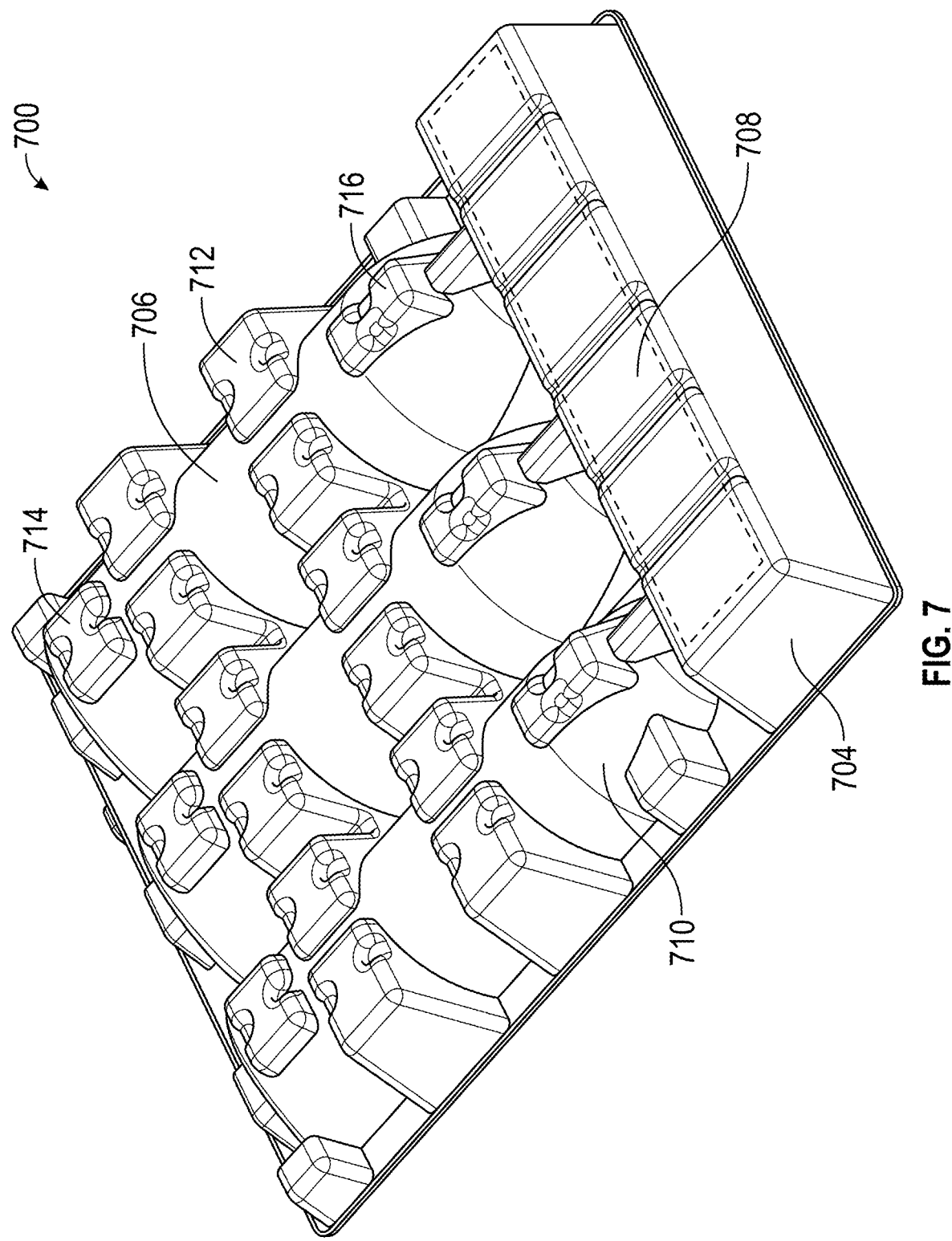
FIG. 7 depicts an underside of a beverage container packing tray according to various embodiments.

FIG. 7 depicts an underside of a beverage container packing tray according to various embodiments. In the example shown, a beverage container packing tray 700 is depicted. The beverage container packing tray 700 depicted may include a different view, such as a bottom view or underside view, of beverage container packing tray 600 of FIG. 6. The beverage container packing tray 700 may include cradle elements 706. The cradle elements 706 may include the underside of cradle elements 606 of FIG. 6. The tray 700 includes conical elements 710, which may include the underside of conical elements 610 of FIG. 6. The tray 700 further includes a thermo pack compartment 704, which may include the underside of thermo pack compartment 704 of FIG. 7.

The beverage container packing tray 700 includes platforms 708, 712-716. The platforms allow the tray 700 to sit steady on a flat surface, such as the bottom of shipping container, a box, a top of another tray, and/or any other relatively flat surface. In certain cases, the platforms 708, 712-716 aid in stacking of beverage tray container packing trays 700. In the example shown, the tray 700 includes thermo pack compartment platforms 708 (six platforms shown). Platforms 708 may be located on the underside of thermo pack compartment 604 of FIG. 6. Platforms 716 may extend from the conical elements 710. In the example shown, two platforms 716 extend from the conical surface 710. Platforms 712 may be disposed between the cradle elements 706. Platforms 712 (twelve shown) may include and/or extend from, for example, recessed elements between the cradle elements 606 of FIG. 6. Platforms 714 may extend from the cradle elements 706. In the example shown, three platforms 714 extend from the cradle elements 706 that contact a lower portion of a beverage container.

Figure 8:
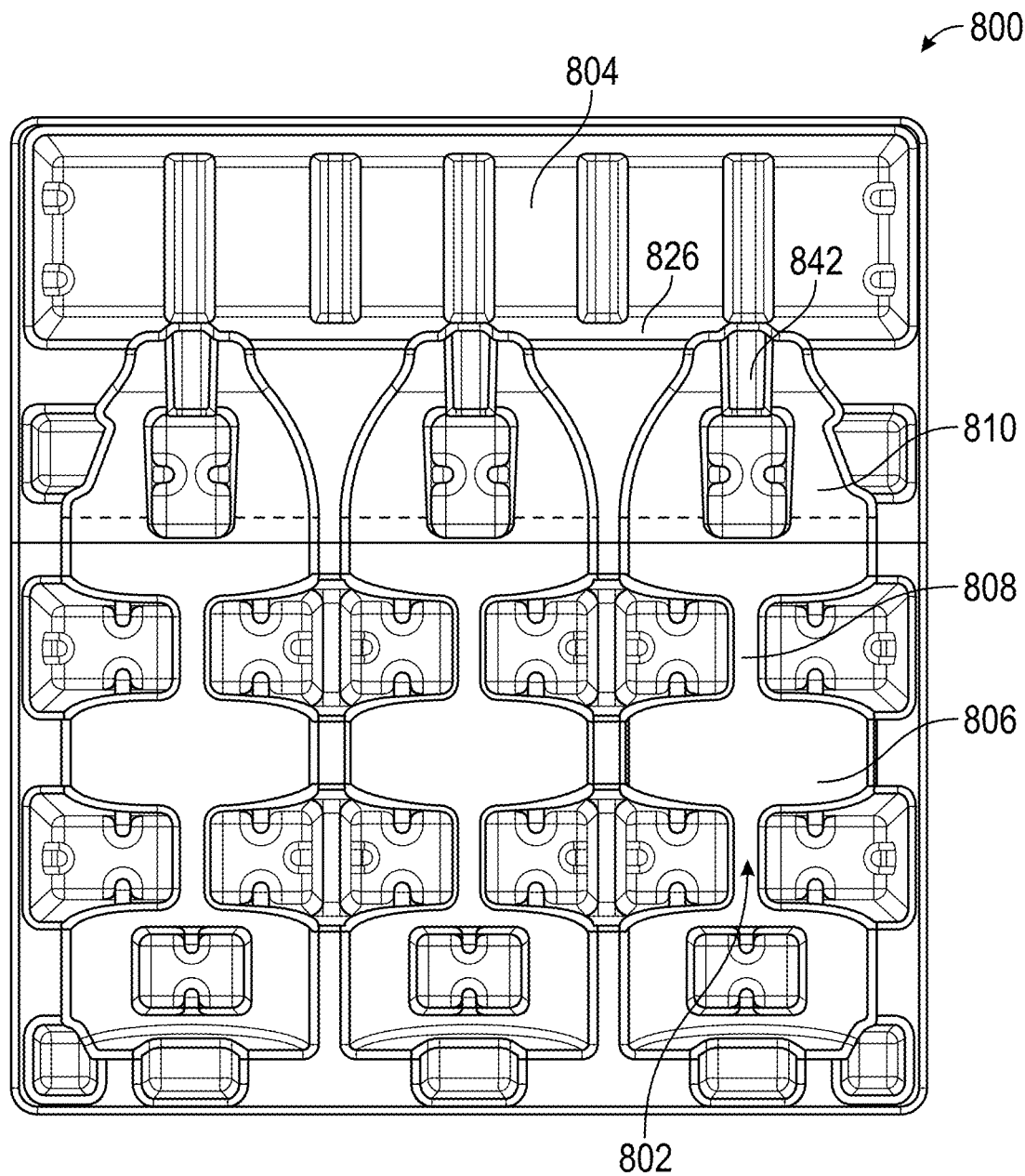
FIG. 8 depicts a top view of a beverage container packing tray according to various embodiments.

FIG. 8 depicts a top view of a beverage container packing tray according to various embodiments. The beverage container packing tray 800 may be similar to tray 600 of FIG. 6 and/or tray 700 of FIG. 7. In the example shown, the packing tray 800 includes bottle contoured compartments 802, a thermo pack compartment 804, and/or other elements. The bottle accommodating elements 802 may include, for example, bottle cradle elements 806, spine elements 808, conical elements 810, neck support elements 842, and/or other components. In various embodiments, the beverage container tray 800 includes a neck support portion 842. The neck portion 842 may be an element of the conical section 810. The neck support portion 842 may be configured to support a neck portion of a beverage container. The neck portion 842 span the conical section and terminate at a partition wall 826 of the thermo pack compartment 804.

Figure 9:
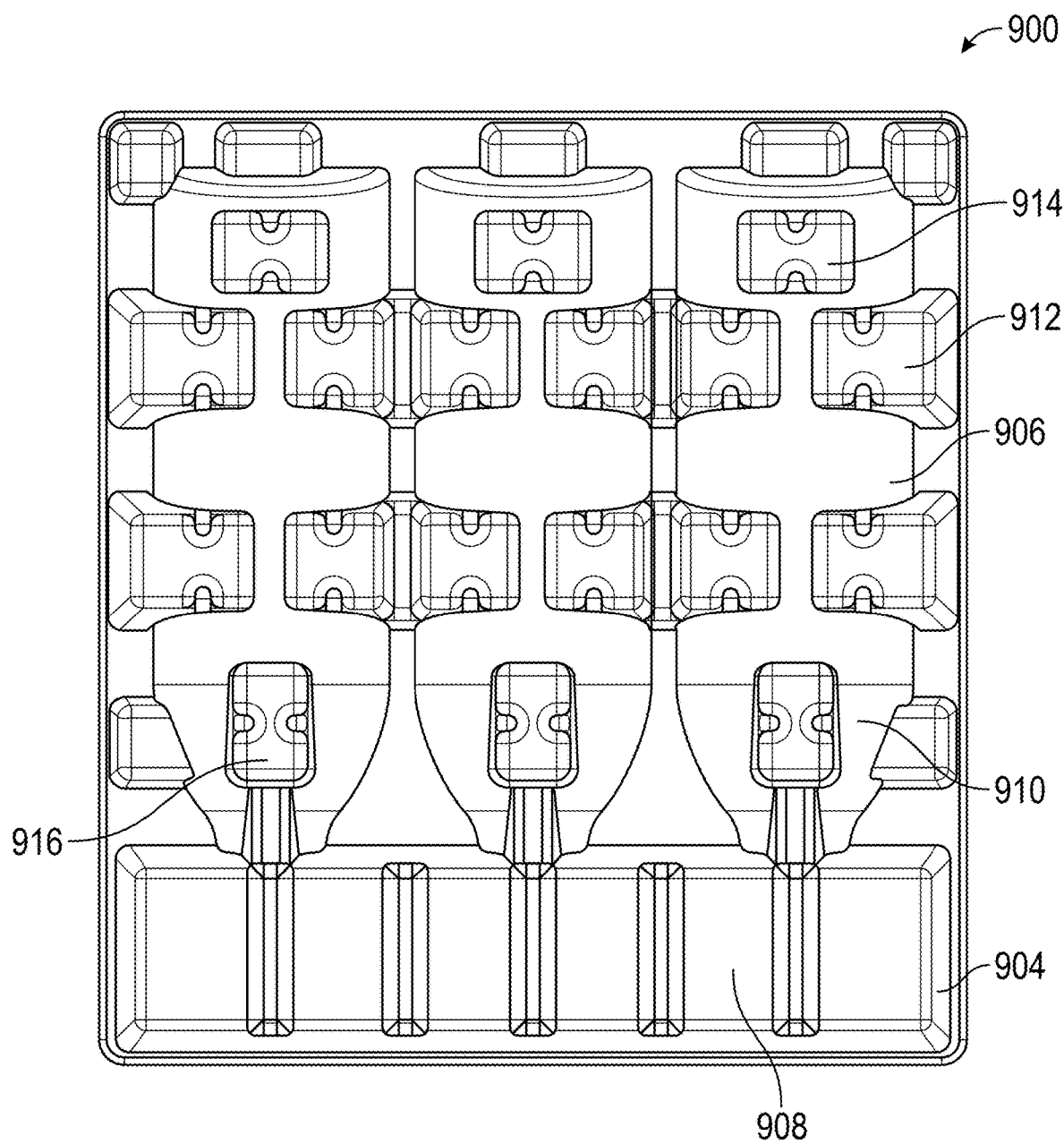
FIG. 9 depicts a bottom view of beverage container packing tray according to various embodiments.

FIG. 9 depicts a bottom view of beverage container packing tray according to various embodiments. In the example shown, a bottom side of a beverage container packing tray 900 is depicted. The beverage container packing tray 900 depicted may include a different view, such as a bottom view or underside view, of beverage container packing tray 600 of FIG. 6 and/or tray 800 of FIG. 8. The beverage container packing tray 900 may include cradle elements 906, conical elements 910, thermo pack compartment 904, and/or other elements.

The beverage container packing tray 900 includes platforms 908, 912-916. The platforms 908, 912-916 allow the tray 900 to sit steady on a flat surface, such as the bottom of shipping container, a box, a top of another tray, and/or any other relatively flat surface. In certain cases, the platforms 908, 912-916 aid in stacking of beverage tray container packing trays 900. In the example shown, the tray 900 includes thermo pack compartment platforms 908 (six platforms shown). Platforms 916 may extend from the conical elements 910. In the example shown, three platforms 916 extend from the conical surface 910. Platforms 912 may be disposed between the cradle elements 906. In the example shown, twelve platforms 912 extending at least partially between the cradle elements 906. Platforms 914 may extend from the cradle elements 906. In the example shown, three platforms 914 extend from the cradle elements 906 that contact a lower portion of a beverage container.

Figure 10:
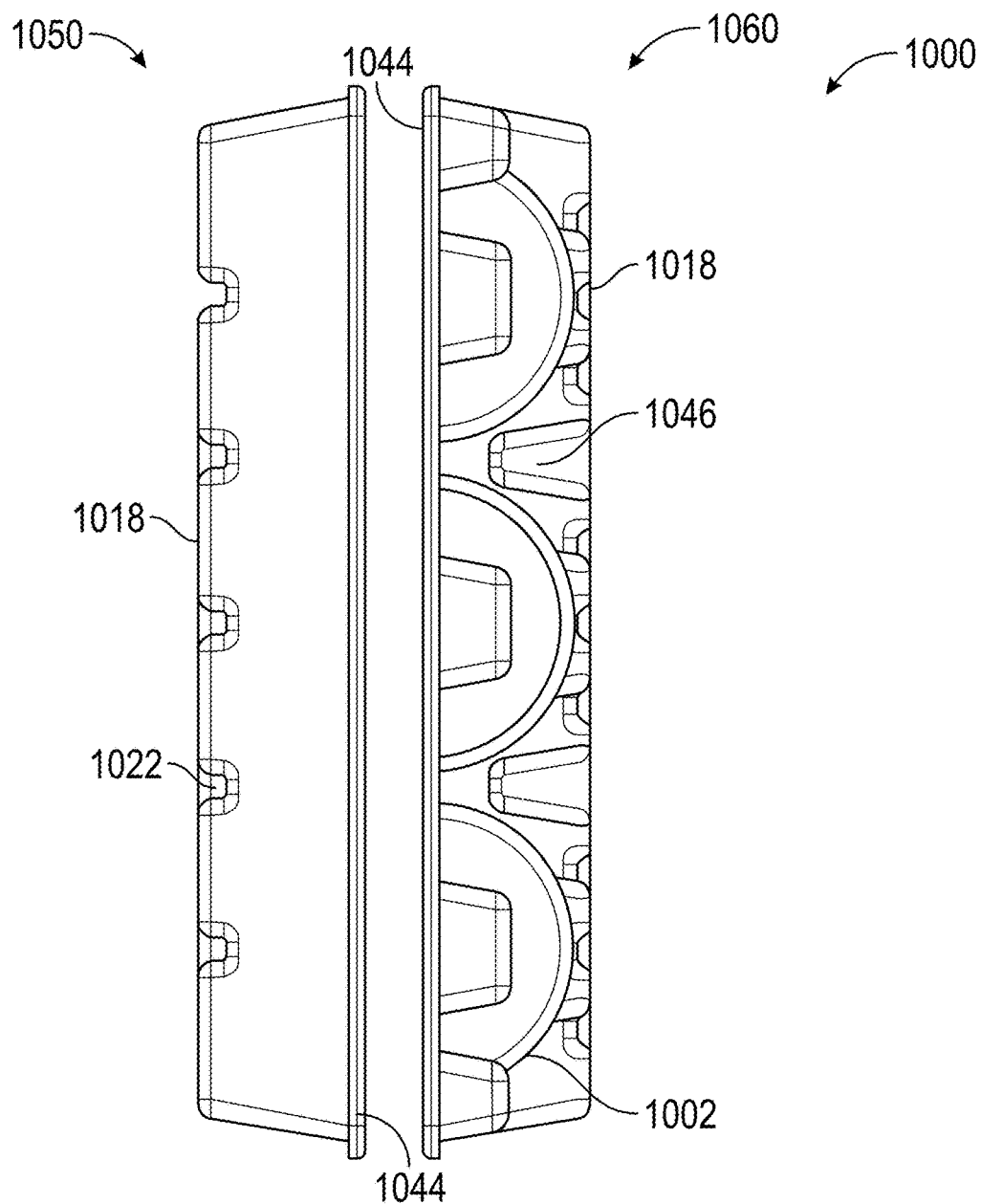
FIG. 10 depicts bottom, side, and back views of a beverage container packing tray according to various embodiments.
Figure 10:
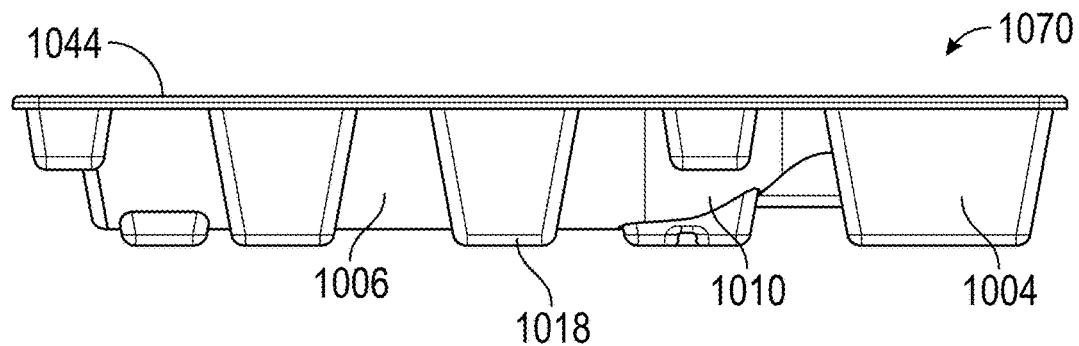

FIG. 10 depicts front, back and side views of a beverage container packing tray according to various embodiments. Three separate views of the beverage container packing tray 1000 are depicted in the figure shown. As shown, a front view 1050 of a beverage container packing tray includes a tray base 1018 (a bottom of a tray) and an upper surface 1044 of a tray. The front view 1050 may depict the tray from the end closest to the thermo pack compartment, the thermo pack compartment end of the tray 1000. The thermo pack compartment dividers 1022 are depicted.

In the example shown, a back view 1060 of a beverage container packing tray includes a tray base 1018 and an upper surface 1044 of the tray. The back view 1060 may depict an end of the tray including the beverage container contoured compartments 1002 (bottle contoured compartments). A channel 1046 is located in the center of tray. The channel 1046 may span the underside of platforms between bottle accommodating spaces 1002 (e.g., the underside of platforms 628, 630 of FIG. 6).

As shown, a side view 1070 of a beverage container packing tray includes a tray base 1018 and an upper surface 1044 of the tray. The side view of thermo pack compartment 1004 illustrates the draft of the walls of the same. The bottle cradle elements 1006 and conical elements 1010 are shaped to match the contour of a beverage container.

Figure 11:
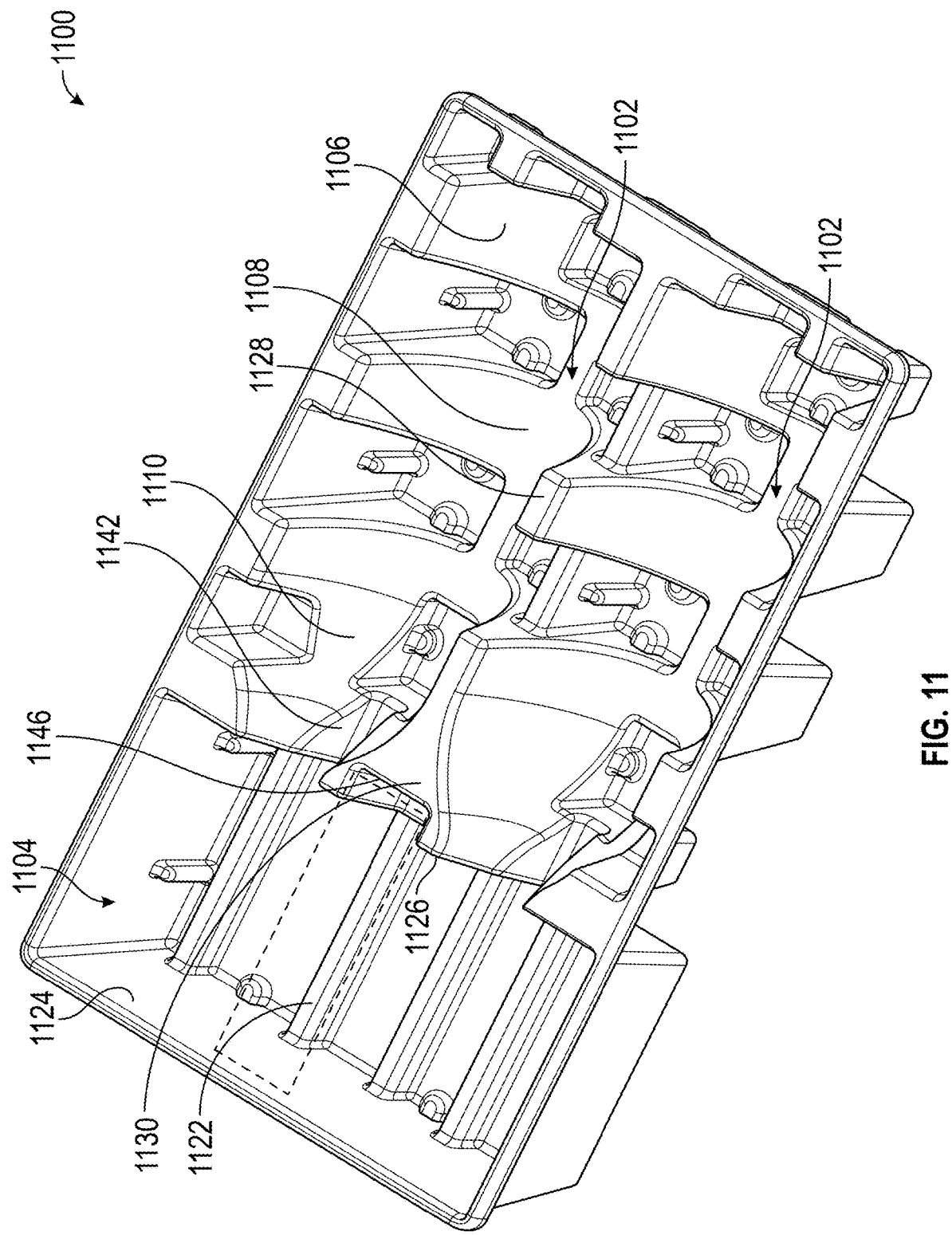
FIG. 11 depicts a beverage container packing tray according to various embodiments.

FIG. 11 depicts a beverage container packing tray according to various embodiments. In the example shown, a beverage container packing tray 1100 is configured to accommodate two beverage containers (not shown) in a lay flat or horizontal position. The beverage container packing tray 1100 is configured to accommodate transport thermo packs between at least a portion of the beverage containers. Beverage container packing tray 1100 may be similar in many respects to the beverage container packing trays 100, 200, 300, 400, 500 of FIGS. 1-5, and some of features similar across the designs will not be discussed in relation to FIG. 11 to avoid redundancy.

The beverage container packing tray 1100 may include bottle contoured compartments 1102, thermo pack compartments 1104, and/or other elements. The bottle contoured compartments 1102 include bottle cradle elements 1106, spine elements 1108, conical elements 1110, bottle neck support element 1142, and/or other components. The beverage container packing tray 1100 (also referred to as a tray, packing tray) is configured to accommodate two beverage containers (not shown) in a lay flat or horizontal position.

In some embodiments, there are platforms 1128 between adjacent cradle elements and platforms 1130 between the conical elements 1110. The platforms 1128, 1130 provide structural rigidity in the tray 1100 and define the boundary between adjacent bottle contoured compartments 1102. In the example shown, platform 1130 includes a recessed area 1146 (notch, slot) that is shaped to accommodate a transport thermo pack. The recessed area 1146 may be located in between and adjacent to bottle neck support elements 1142. Such a configuration allows for the transport thermo pack to be installed between portions of beverage containers, such as between the necks of adjacent beverage containers.

In various embodiments, a thermo pack compartment 1104 houses thermo packs. In certain cases, beverage containers are placed in the tray 1100 in the bottle contoured compartments 1102. The thermo pack compartment 1104 may include a recessed area 1146 that accommodates a thermo pack. The thermo pack may be placed in the recessed area 1146 between the neck support elements 1142, thereby providing a thermo pack adjacent to the necks of beverage containers. In certain cases, dividers 1122 are positioned to accommodate and/or partition thermo packs. In certain cases, the dividers 1122 enhance the structural characteristics of the thermo pack compartment.

In various embodiments, the thermo pack compartment 1104 is bounded by outer walls 1124 a partition wall 1126. The outer walls 1124 form the outside of the tray 1100 in the thermo compartment 1104 portion of the tray 1100. The partition wall 1126 defines a boundary between the thermo pack compartment 1104 and the bottle contoured compartments 1102. The geometry of the thermo pack compartment 1104 may be sized to accommodate particular thermo packs. Thermo transport packs (not shown) are placed in the thermo pack compartment adjacent to, for example, the upper portion (e.g., necks) of the beverage containers. As a result of their placement near the necks of the beverage containers, the transport thermo packs provide cooling or heating directly to the beverage containers.

Figure 12:
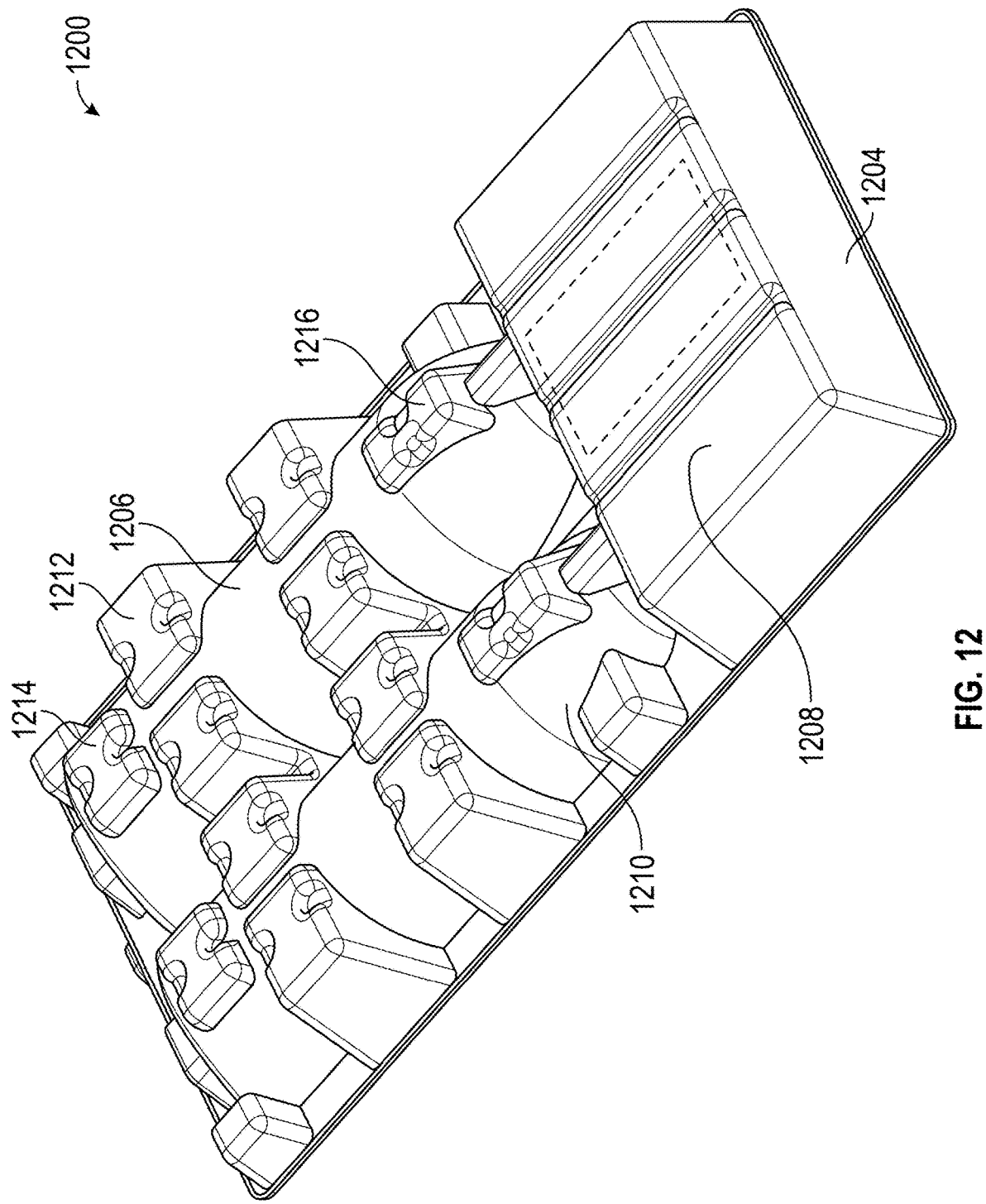
FIG. 12 depicts an underside of a beverage container packing tray according to various embodiments.

FIG. 12 depicts an underside of a beverage container packing tray according to various embodiments. In the example shown, a beverage container packing tray 1200 is depicted. The beverage container packing tray 1200 depicted may include a different view, such as a bottom view or underside view, of beverage container packing tray 1100 of FIG. 11. The beverage container packing tray 1200 may include cradle elements 1206. The cradle elements 1206 may include the underside of cradle elements 1106 of FIG. 11. The tray 1200 includes conical elements 1210, which may include the underside of conical elements 1110 of FIG. 11. The tray 1200 further includes a thermo pack compartment 1204, which may include the underside of thermo pack compartment 1104 of FIG. 11. In the example shown, a thermo transport pack may be installed in the transport thermo pack 1204 in the location denoted by the blue rectangle. Though, the transport thermo pack would be installed in the transport thermo pack compartment of the 1104 of FIG. 11.

The beverage container packing tray 1200 includes platforms 1208, 1212-1216. Platforms 1208, 1212-1216 may be similar to platforms 208, 212-216 of FIG. 2.

Figure 13:
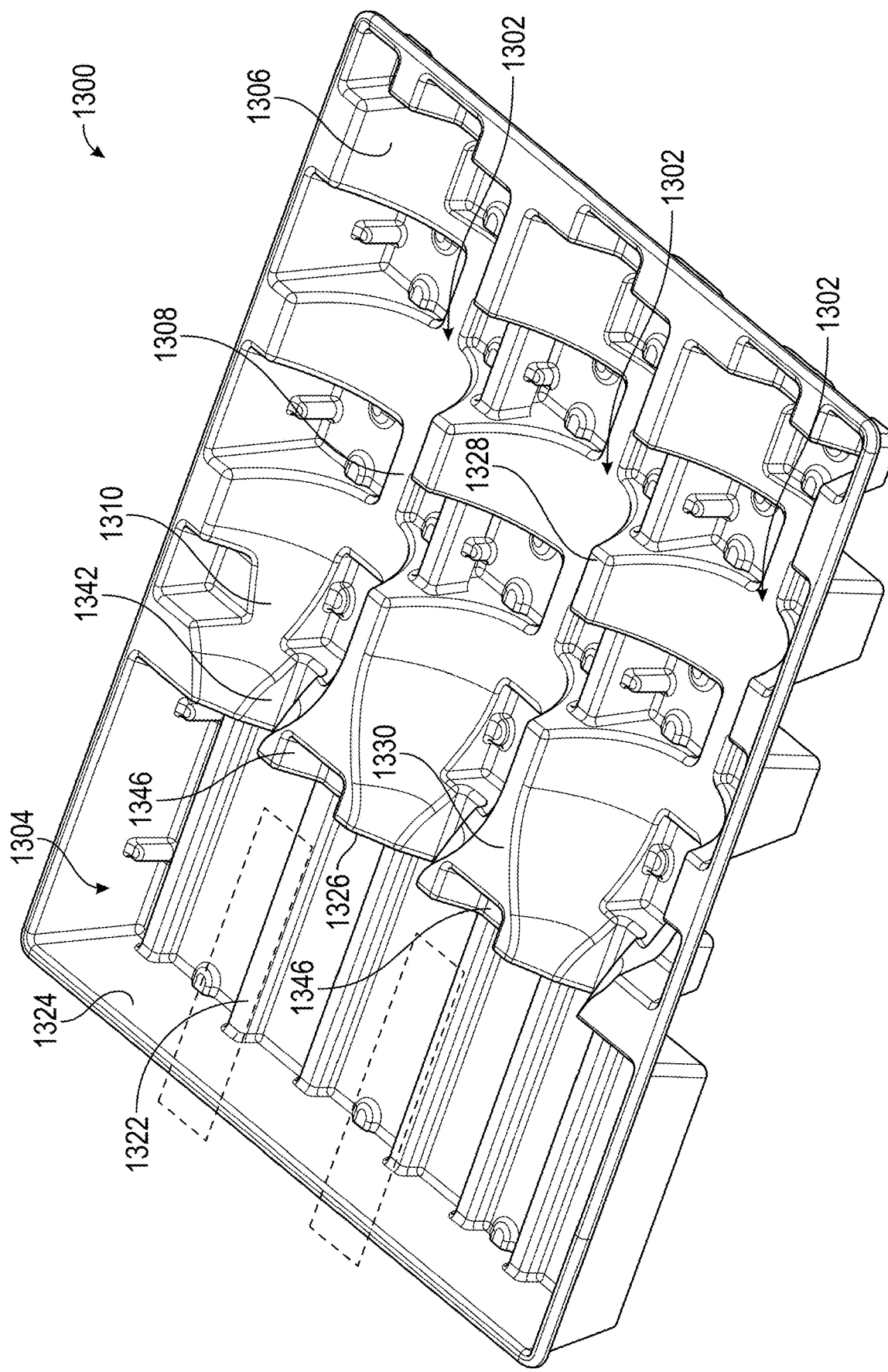
FIG. 13 depicts a beverage container packing tray according to various embodiments.

FIG. 13 depicts a beverage container packing tray according to various embodiments. In the example shown, a beverage container packing tray 1300 is configured to accommodate three beverage containers. Beverage container packing tray 1300 may be similar in many respects to the beverage container packing trays 100, 200, 300, 400, 500, 600, 700, 1100, 1200 of FIGS. 1-7, 11, and 12, and some of features similar across the designs will not be discussed in relation to FIG. 13 to avoid redundancy. The beverage container packing tray 1300 may include bottle contoured compartments 1302, thermo pack compartments 1304, and/or other elements. The bottle contoured compartments 1302 include bottle cradle elements 1306, spine elements 1308, conical elements 1310, bottle neck support elements 1342, and/or other components. The bottle neck support elements 1342 includes a pass through to accommodate the neck (reduced diameter) portion of beverage container. The beverage container packing tray 1300 is configured to accommodate three beverage containers (not shown) in a lay flat or horizontal position.

In some embodiments, there are platforms 1328 between adjacent cradle elements and platforms 1330 between the conical elements 1310. The platforms 1328, 1330 provide structural rigidity in the tray 1300 and define the boundary between adjacent bottle contoured compartments 1302.

In various embodiments, a thermo pack compartment 1304 houses thermo packs. In certain cases, beverage containers are placed in the tray 1300 in the bottle contoured compartments 1302. The thermo pack compartment 1304 may include dividers 1322 (ribs) that partition in the thermo pack compartment 1304. The dividers 1322 may be positioned to accommodate the size of the thermo packs. In certain cases, the dividers 1322 enhance the structural characteristics of the thermo pack compartment 1304. The thermo pack compartment 1304 may be sized to accommodate multiple thermo packs. The thermo pack compartment 1304 is bounded by outer walls 1324 a partition wall 1326. The outer walls 1324 form the outside of the tray 1300 in the thermo pack compartment 1304 portion of the tray 1300. The partition wall 1326 defines a boundary between the thermo pack compartment 1304 and the beverage container contoured compartments 1302. The geometry of the thermo pack compartment 1304 may be sized to accommodate particular thermo packs. The recessed area 1346 may be located in between and adjacent to bottle neck support elements 1342. Such a configuration allows for the transport thermo pack to be installed between and/or adjacent to portions of beverage containers, such as between the necks of adjacent beverage containers.

Figure 14:
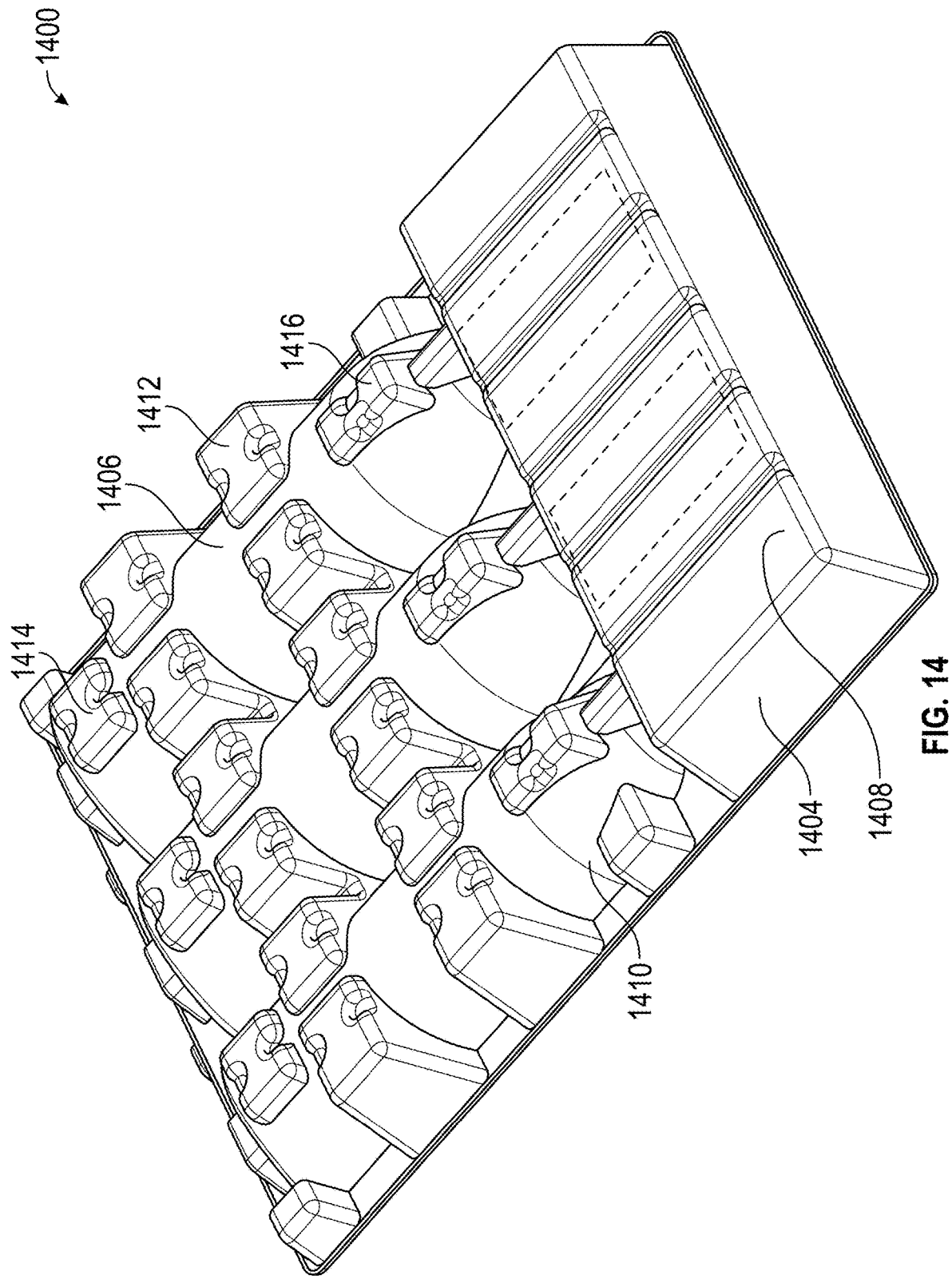
FIG. 14 depicts an underside of a beverage container packing tray according to various embodiments.

FIG. 14 depicts an underside of a beverage container packing tray according to various embodiments. In the example shown, a beverage container packing tray 1400 is depicted. The beverage container packing tray 1400 depicted may include a different view, such as a bottom view or underside view, of beverage container packing tray 1300 of FIG. 13. The beverage container packing tray 1400 may include cradle elements 1406. The cradle elements 1406 may include the underside of cradle elements 1306 of FIG. 13. The tray 1400 includes conical elements 1410, which may include the underside of conical elements 1310 of FIG. 13. The tray 1400 further includes a thermo pack compartment 1404, which may include the underside of thermo pack compartment 1404 of FIG. 14. In the example shown, thermo transport packs may be installed in the transport thermo pack compartment 1404 in the locations denoted by the blue rectangles. In such a configuration, the thermo transport packs would be installed between the adjacent necks of the beverage containers (e.g., between necks of wine bottles). Though, the transport thermo pack would be installed on the in the transport thermo pack compartment of the 1304 of FIG. 13.

The beverage container packing tray 1400 includes platforms 1408, 1412-1416. The platforms allow the tray 1400 to sit steady on a flat surface, such as the bottom of shipping container, a box, a top of another tray, and/or any other relatively flat surface. In certain cases, the platforms 1408, 1412-1416 aid in stacking of beverage tray container packing trays 1400. In the example shown, the tray 1400 includes thermo pack compartment platforms 1408 (four platforms shown). Platforms 1408 may be located on the underside of thermo pack compartment 1304 of FIG. 13. Platforms 1416 may extend from the conical elements 1410. In the example shown, two platforms 1416 extend from the conical surface 1410. Platforms 1412 may be disposed between the cradle elements 1406. Platforms 1412 (eight shown) may include and/or extend from, for example, recessed elements between the cradle elements 1306 of FIG. 13. Platforms 1414 may extend from the cradle elements 1406. In the example shown, three platforms 1414 extend from the cradle elements 1406 that contact a lower portion of a beverage container.

Figure 15:
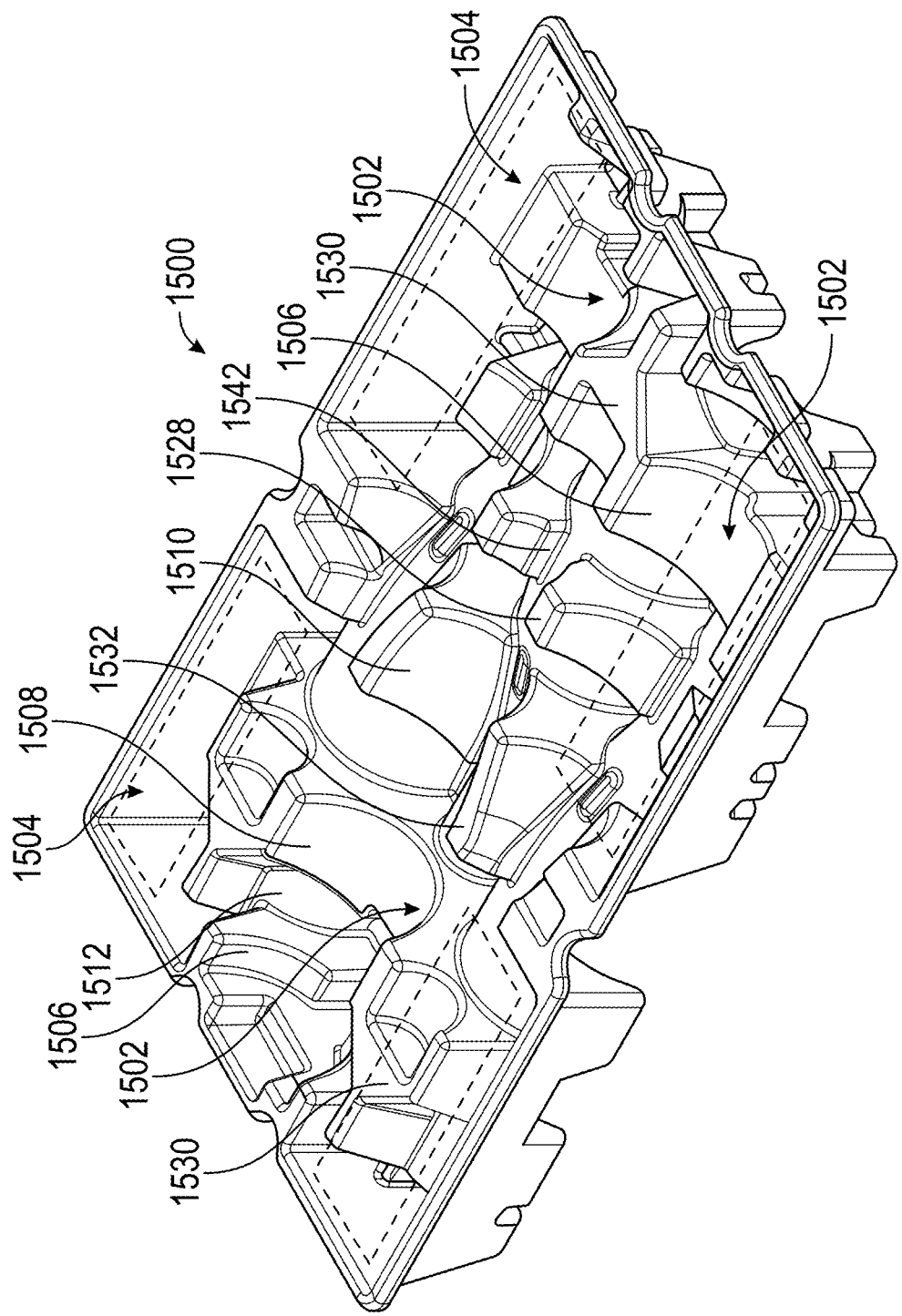
FIG. 15 depicts a beverage container packing tray according to various embodiments.

FIG. 15 depicts a beverage container packing tray according to various embodiments. In the example shown, a beverage container packing tray 1500 includes bottle contoured compartments 1502, thermo pack compartments 1504, and/or other elements. A beverage container packing tray 1500 may hold three beverage containers and four thermo transport packs. The thermo transport packs (not shown) may be placed in, for example, the locations denoted by the rectangles. The beverage container packing tray 1500 is configured to accommodate beverage containers (not shown) in a lay flat or horizontal position. In the example shown, the beverage containers are included in the tray 1500 in a head to foot configuration where the base of one beverage container is aligned to the neck of neck of an adjacent beverage container. The bottle contoured compartments 1502 (three shown) are configured to support a beverage container that is laid flat in the tray 1500. The bottle contoured compartments 1502 may include one or more cradle elements 1506, 1508, conical elements 1510, bottle neck support elements 1542, and/or other elements.

The bottle contoured compartment 1502 may include a first cradle element 1506 and a second cradle element 1508. The cradle elements 1506, 1508 may include a semi-circular cradle shaped element structure that matches or approximates the outer shape of the beverage container. The cradle elements 1506, 1508 are configured to continuously surround a portion of the beverage container, such as half of the container. In the example shown, the cradle elements 1506, 1508 partially surround roughly half of the beverage container at two locations near the bottom of the container. The first cradle element 1506 may configured to accommodate a lower portion of a beverage container. A second cradle element 1508 is configured accommodate a middle section of the beverage container. The first cradle element 1506 and second cradle element 1508 may be separated by recessed elements 1512. For example, the first cradle element 1506 and second cradle element 1508 may include distinct structures that independently contact the beverage container at different points.

The bottle contoured compartments 1502 include conical elements 1510. The conical element 1510 may be configured to house a tapered portion (varying diameter portion) of a beverage container. The conical element 1510 may taper to a neck of the beverage container. For example, the neck of the beverage container may be housed in bottle neck support element 1542 of bottle contoured compartment 1502. The neck of the beverage container may rest in the bottle neck support element 1542.

In some embodiments, platforms 1528, 1530, 1532 are located between adjacent beverage container contoured compartments 1502. The platforms 1528, 1530, 1532 provide structural rigidity in the tray and define the boundary between various portions of adjacent bottle contoured elements 1502. In the example shown, platform 1528 separates a cradle element 1506 of a first compartment from bottle neck support of another compartment 1542. A platform 1530 may separate two cradle elements 1506. Platform 1532 separates a neck support element 1542 and a conical element 1510. Platforms may separate any combination of adjacent bottle contoured elements.

In various embodiments, beverage container packing tray 1500 includes multiple transport thermo pack compartments 1504. The transport thermo pack compartments 1504 are configured to house thermo packs. In certain cases, beverage containers are placed in the tray 1500, and transport thermo packs are placed in the thermo pack compartment 1504. In the example shown, the tray 1500 includes four transport thermo pack compartments 1504. The transport thermo pack compartments 1504 (denoted by dotted lines) are configured to house thermo packs in proximity to multiple beverage containers. The geometry of the thermo pack compartments 1504 may be sized to accommodate particular thermo packs.

In some embodiments, beverage containers are placed in the beverage container packing tray 1500 in, for example, the beverage container contoured elements 1502. The beverage containers may contact the first cradle elements 1506, second cradle elements 1508, the conical elements 1510, bottle neck support elements 1542, and/or other components of the tray 1500. Transport thermo packs are place in the transport thermo pack compartments 1504. Portions of the transport thermo packs may be in contact with the beverage containers. A second tray 1500 may be placed on the top of the tray 1500. The second tray may be identical (or substantially similar) to the first tray 1500 and/or may mirror the first tray. The first and second trays may completely surround, protect, and secure the beverage containers, transport thermo packs, and other items. This assembly may be placed in beverage container shipping container.

In certain cases, multiple assemblies including multiple trays are loaded into a single shipping container. For example, two sets of trays each housing three bottles may be placed in a shipping container, and a total of six bottles are shipped. In another example, nine bottles may be shipped in three stacked sets of trays. Similarly, twelve bottles may be shipped in four stacked sets of trays.

Figure 16:
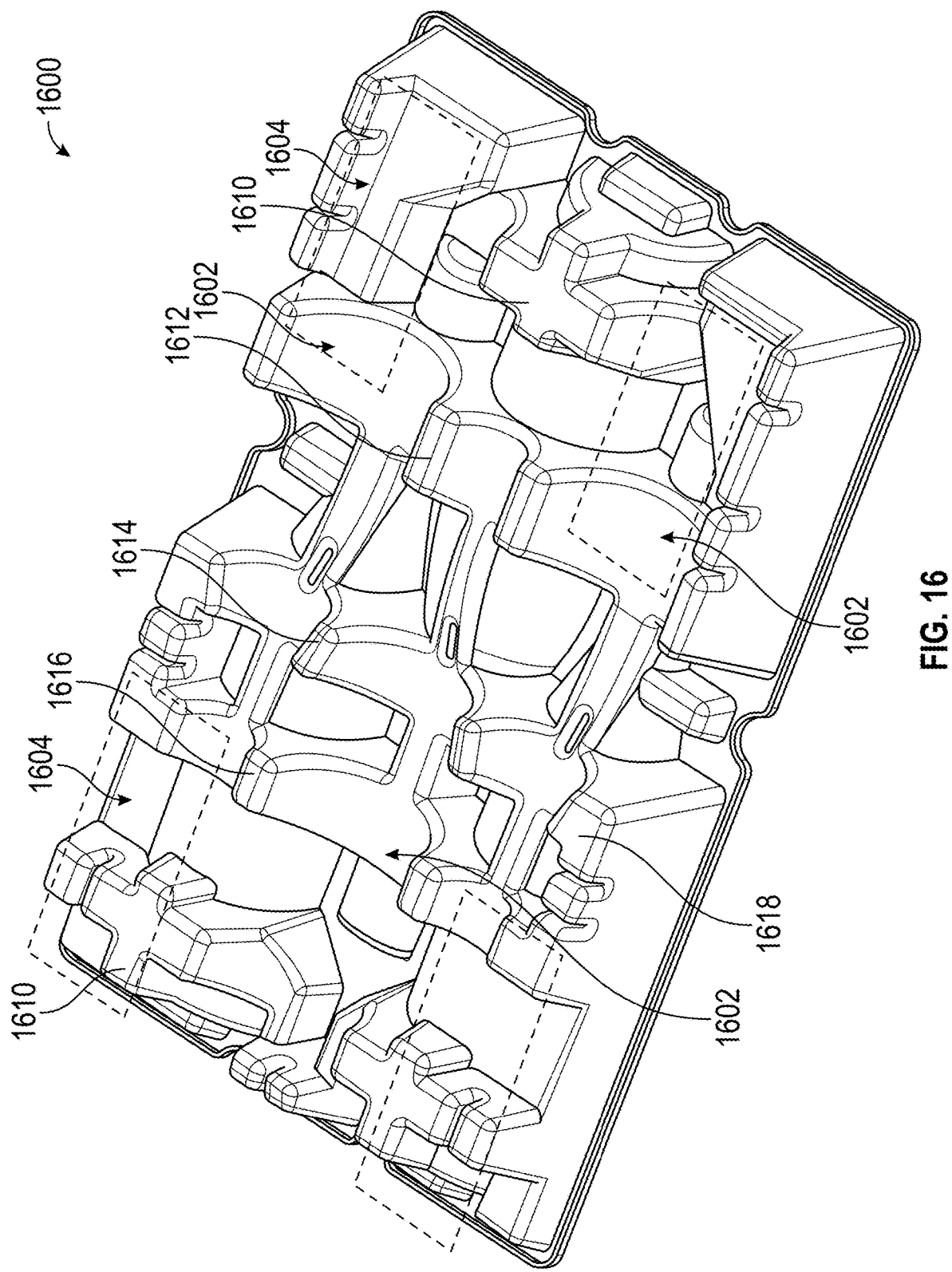
FIG. 16 depicts an underside of a beverage container packing tray according to various embodiments.

FIG. 16 depicts an underside of a beverage container packing tray according to various embodiments. In the example shown, a beverage container packing tray 1600 is depicted. The beverage container packing tray 1600 depicted may include a different view, such as a bottom view or underside view, of beverage container packing tray 1500 of FIG. 15. The beverage container packing tray 1600 may include bottle contoured compartments 1602. The bottle contoured compartments 1602 may include the underside of bottle contoured compartments 1502 of FIG. 15. The tray 1600 includes a thermo pack compartments 1604. In the example shown, the locations where thermo packs are installed are depicted by dashed lines. Four thermo packs may be installed at locations near the corners of the beverage container packing tray 1600. In certain cases, the thermo packs may include flexible gel packs installed under the beverage containers.

In various embodiments, beverage containers are placed in the beverage container contoured compartments 1602. For example, the tray 1600 may be stacked on top of another beverage container tray (e.g., tray 1500 of FIG. 15), and beverage containers are placed in the beverage container contoured compartments 1602 of the tray 1600. Thermo transport packs may also be placed in the tray in the thermo transport pack compartments 1604.

The beverage container packing tray 1600 includes platforms 1610-1618. The platforms allow the tray 1600 to sit steady on a flat surface, such as the bottom of shipping container, a box, a top of another tray, and/or any other relatively flat surface. In certain cases, the platforms 1610-1618 assist in stacking of beverage tray container packing trays 1600. In the example shown, the tray 1600 includes plus-sign shaped platforms 1610. Platforms 1612 may be located in the inner portion of the tray 1600 and/or on the underside of cradle elements 1506 of FIG. 15. Platforms 1614 may be located in the inner portion of the tray 1600 and/or on the underside of conical elements 1510 of FIG. 15. Platforms 1616 may be located in the inner portion of the tray 1600. Platforms 1618 may be located at various points around the perimeter of the tray 1600.

In certain cases, multiple beverage container trays 1600 are stacked on top of one another in a shipping container. A first tray 1600 may be placed in the bottom of the shipping container, loaded with beverage containers, and transport thermo packs. A second tray 1600 is placed on top of the first tray so the two trays encase (surround) the beverage containers, thermo transport packs, and other components. Details regarding potential stacking configurations are described in subsequent figures. Platforms 1610-1618 of a third tray may be stacked on the platforms 1610-1618 of the second tray. Because the platforms include flat or relatively flat surfaces, the trays may be efficiently stacked. The flat surfaces of the platforms 1610-1618 allow stacked beverage container trays 1600 to transmit load between trays while reducing the load applied to beverage containers housed within the trays. Stacking flat platforms 1610-1618 of one tray on the platforms of another tray allows the trays to be stacked with causing damage to of the trays, which may be fabricated out of paper-based materials that are somewhat susceptible to damage. In some instances, a first set of trays 1600 is stacked on a second set of trays 1600 during transit to ship for example four beverage containers. Additional sets of trays 1600 may be stacked to ship six, eight, or any number of beverage containers in a single package.

Figure 17:
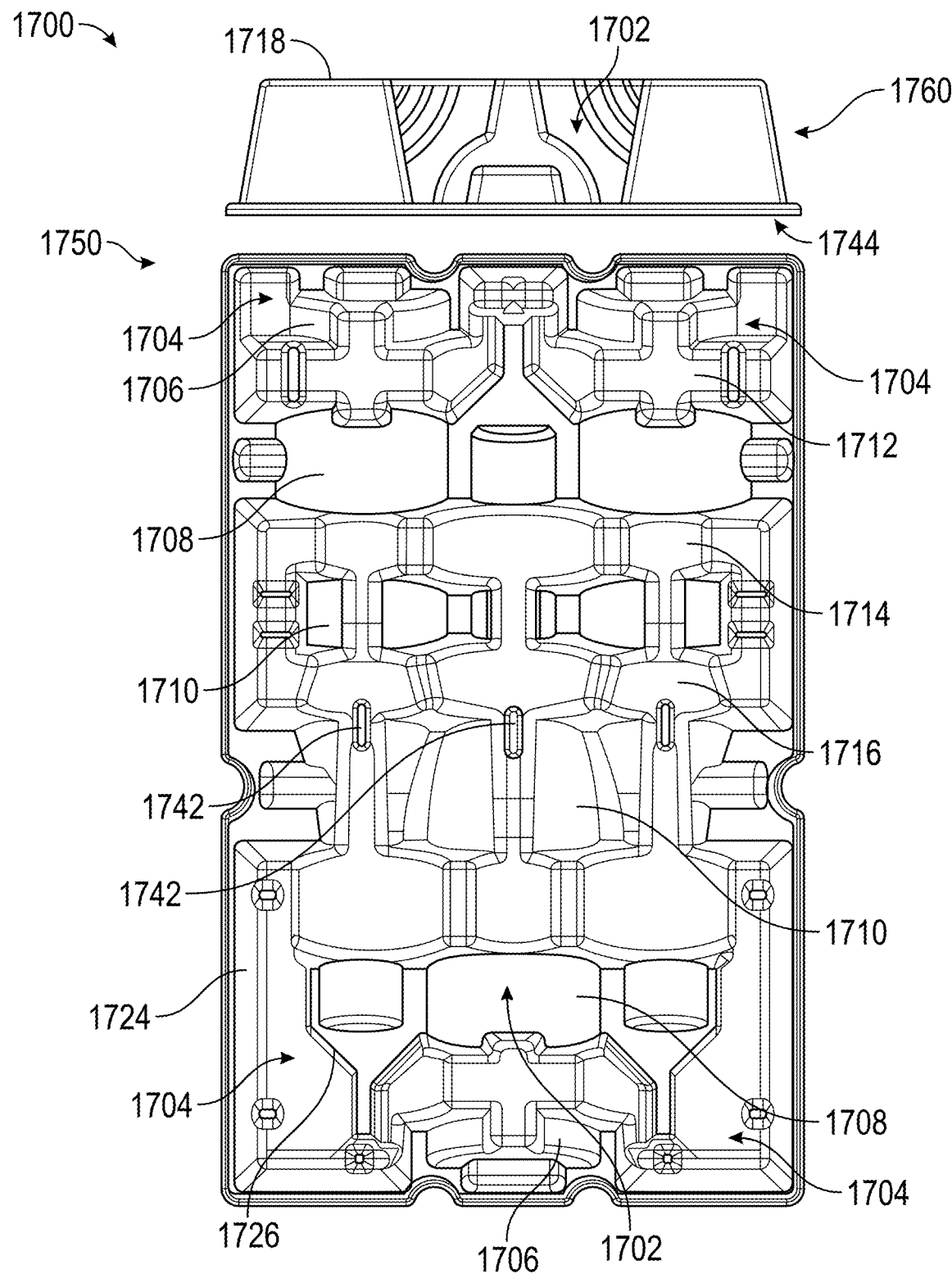
FIG. 17 depicts top and front views of a beverage container packing tray according to various embodiments.

FIG. 17 depicts top and front views of a beverage container packing tray according to various embodiments. Two separate views of the beverage container packing tray 1700 are depicted in the figure shown. As shown, a top view 1750 depicts bottle contoured compartments 1702, thermo pack compartments 1704, and/or other elements. In the example shown, a front view 1760 of a beverage container packing tray includes a tray base 1718 (a bottom of a tray) and an upper surface 1744 of a tray. In the front view 1760 of a beverage container packing tray includes an end view of the bottle contoured compartments 1702 are depicted.

The beverage container packing tray 1700 may be similar to tray 1500 of FIG. 15 and/or tray 1600 of FIG. 16. In the example shown, the top view 1750 depicts bottle contoured compartments 1702, a thermo pack compartments 1704, and/or other elements. The bottle contoured compartments 1702 may include, for example, first bottle cradle elements 1706, second bottle cradle elements 1708, conical elements 1710, bottle neck elements 1742, and/or other components. The neck portion 1742 may be configured to support a neck portion of a beverage container. The neck portion 1742 span the conical section and terminate at a partition wall 1726 of the thermo pack compartment 1704.

In various embodiments, the tray 1700 includes multiple recessed elements 1712, 1714, 1716. Recessed elements 1712 may be located between first cradle elements 1706 and second cradle elements 1708. Recessed elements 1714 may be located between the second cradle elements 1708 and conical elements 1710 of the tray 1700.

In various embodiments, the thermo pack compartments 1704 are configured to house (accommodate) thermo packs. The thermo pack compartment 1704 is bounded by outer walls 1724 and inner walls 1726. The outer walls 1724 define portions of the outer surface of the tray 1700. The inner walls 1726 may define a boundary (border) between the thermo pack compartment 1704 and the beverage container accommodating space 1702. The inner walls 1726 and outer walls 1724 may include a draft (for example, a seven degree or other draft) to enable the tray 1700 to be removed from the mold during fabrication. The thermo pack compartments 1704 are placed at multiple locations (such as four locations) to provide consistent thermal control across the tray 1700.

Figure 18:
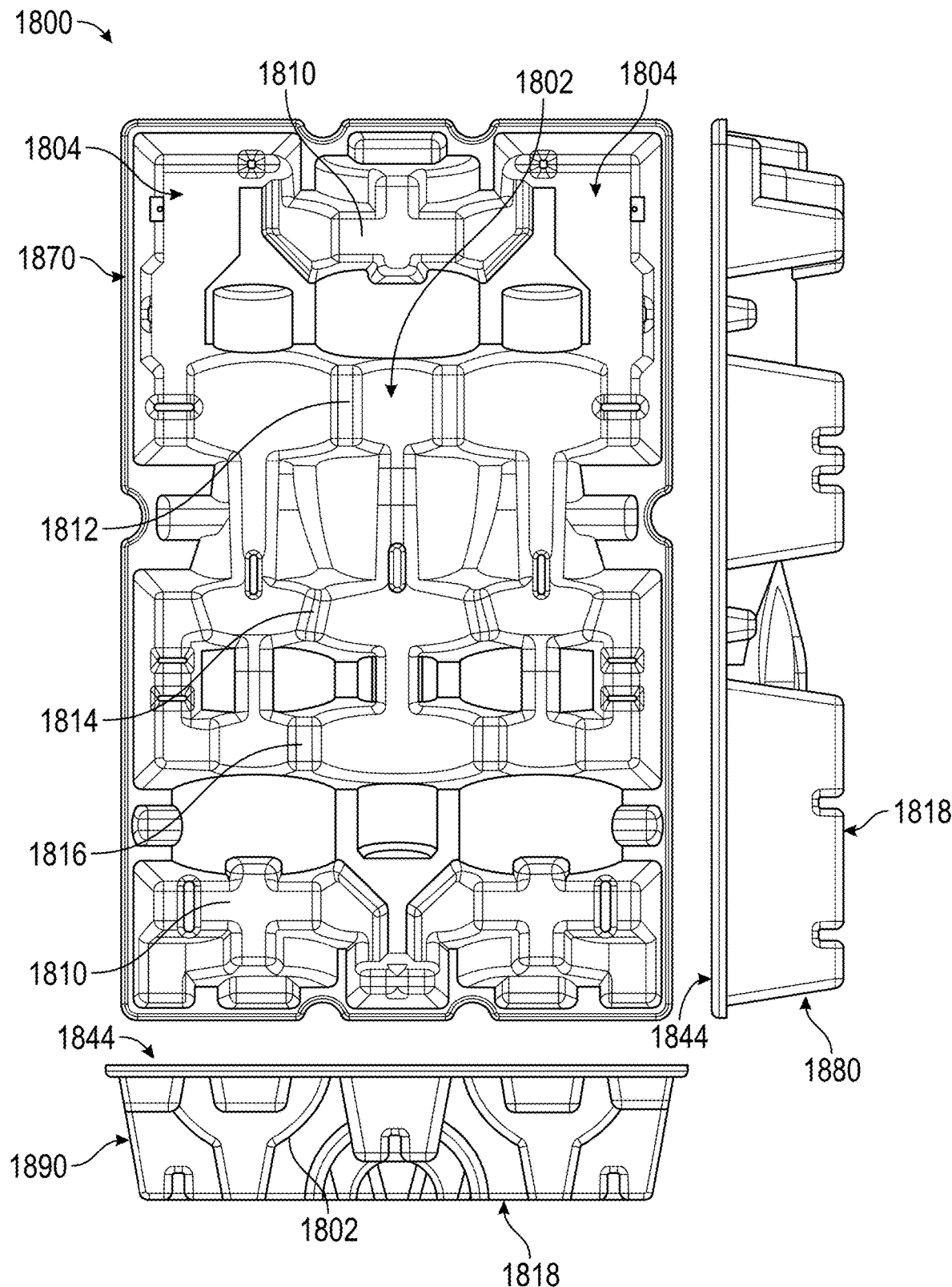
FIG. 18 depicts bottom, side, and back views of a beverage container packing tray according to various embodiments.

FIG. 18 depicts bottom, side, and back views of a beverage container packing tray according to various embodiments. Three separate views of the beverage container packing tray 1800 are depicted in the figure shown. As shown, a bottom view 1870 depicts bottle contoured compartments 1802, thermo pack compartments 1804, and/or other elements. In the example shown, the side view 1880 of a beverage container packing tray includes an end view of the bottle contoured compartments 1802 are depicted. A back view 1890 of a beverage container packing tray includes a tray base 1818 (a bottom of a tray) and an upper surface 1844 of a tray.

In various embodiments, beverage containers may be placed in the beverage container contoured compartments 1802 and transport thermo packs are placed in the transport thermo pack compartments 1804.

The beverage container packing tray 1800 includes platforms 1810, 1812, 1814, 1816. The platforms 1810-1816 allow the tray 1800 to sit steady on a flat surface, such as the bottom of shipping container, a box, a top of another tray, and/or any other relatively flat surface. In certain cases, the platforms 1810-1816 aid in stacking of beverage tray container packing trays 1800 as discussed herein.

Figure 19:
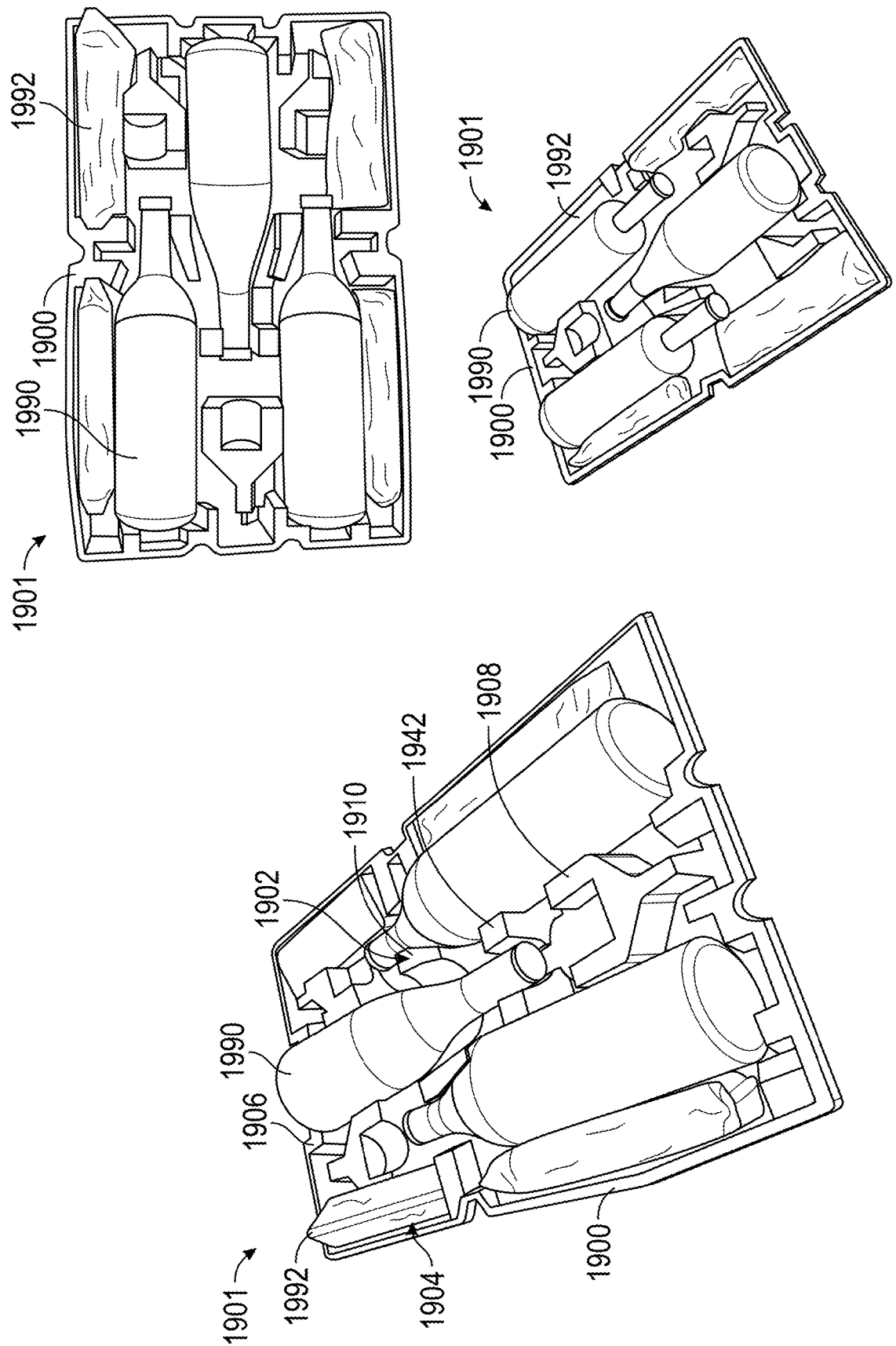
FIG. 19 depicts beverage containers and thermo transport packs in a beverage container packing tray according to various embodiments.

FIG. 19 depicts beverage containers and thermo transport packs in a beverage container packing tray according to various embodiments. In the example shown, a portion of a beverage container packing assembly 1901 includes a beverage container packing tray 1900, beverage containers 1990 (three shown), thermo transport packs 1992 (four shown), and/or other elements. The beverage containers 1990 are placed in the tray 1900 in a horizontal (lay flat) configuration. Transport thermo packs 1992 are placed in the tray 1900 at locations (four shown) along the perimeter of the tray 1900. The transport thermo packs 1992 are directly adjacent to multiple beverage containers 1990 and located in close proximity to the other beverage containers.

In the example shown, beverage containers 1990 are placed in beverage container contoured compartments 1902. The beverage container contoured compartments 1902 include first bottle cradle elements 1906, second bottle cradle elements 1908, conical elements 1910, bottle neck support elements 1942, and/or other components. As shown, these elements are configured to match the contour of the beverage container 1990. Transport thermo packs 1992 are placed in the transport thermo pack compartments 1904. In the example shown, the transport thermo pack compartments 1904 are located near the corners of the tray 1900. Though in other configurations, transport thermo pack compartments may be included in other locations, such as between the beverage containers, around portions of the beverage containers, and/or in other locations. For example, additional transport thermo packs may be placed in the tray 1900 at any feasible location. Transport thermo packs may be sized to fit in various locations within the packaging.

Figure 20:
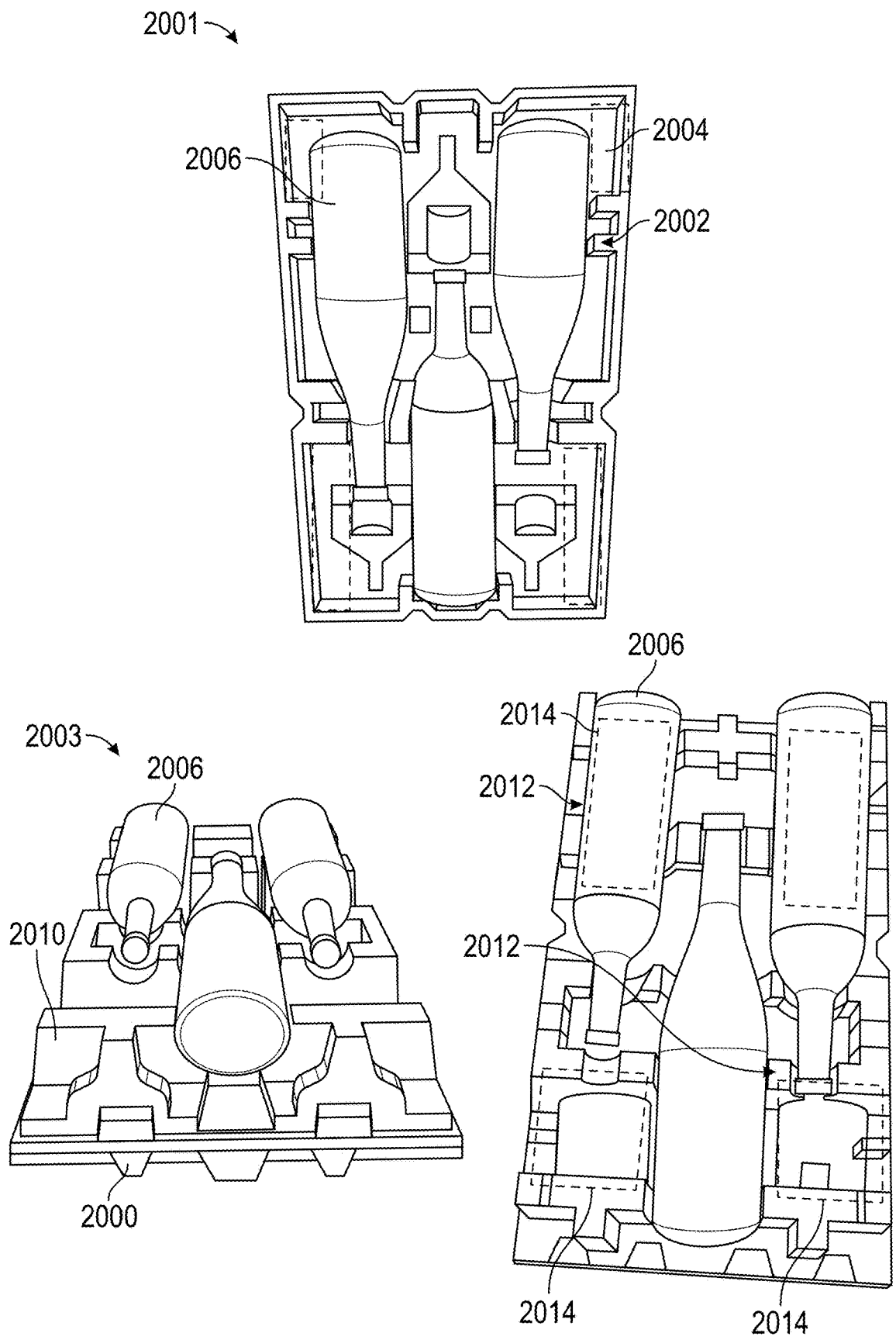
FIG. 20 depicts stacking beverage container packing trays according to various embodiments.

FIG. 20 depicts stacking beverage container packing trays according to various embodiments. In the example shown, a first step 2001 in assembling a beverage container packing assembly includes placing beverage containers 2006 in a first beverage container packing tray 2000. The beverage containers 2006 may be placed in beverage container contoured compartments 2002 in the first beverage container packing tray 2000. The beverage containers 2006 are placed in the tray 2000 in a horizontal (lay flat) configuration. Thermo transport packs are also placed in the tray 2000 in, for example, thermo pack compartments 2004 (e.g., denoted with dashed-line rectangles). The thermo pack compartments 2004 may be located, for example, along the perimeter of the tray 2000.

In a next step 2003 (depicted in two views), a second beverage container packing tray 2010 is placed on the first beverage container packing tray 2000, transport thermo packs (not shown) are placed the second beverage container tray 2010, and additional beverage containers 2006 are placed on the second beverage container packing tray 2010. The second tray 2010 may be placed on the first tray 2000 so that the two trays encapsulate the beverage containers 2006 and transport thermo packs placed on the first tray 2000. Transport thermo packs may be placed in transport thermo pack compartments 2014 (depicted as dashed rectangles). The transport thermo packs may be include thermal gel packs. The thermal gel packs may be flexible to the contours of the tray 2010 and the beverage containers 2006. Beverage containers 2006 are placed on the second tray 2010 in beverage container contoured compartments 2012. The beverage container contoured compartments 2012 are located on a top side (an opposite side) of the second tray 2010. The second tray 2010 (and the first tray 2000) may include first beverage container contoured compartments 2002 on a bottom of the tray 2010 and second beverage container contoured compartments 2012 on a top (opposite side) of the tray 2010. The first beverage container contoured compartments 2002 and second beverage container contoured compartments 2012 may include similar features, such as cradle elements, conical elements, neck support elements, and the like. The first beverage container contoured compartments 2002 and second beverage container contoured compartments 2012 may differ in overall geometry. For example, the width of the cradle elements, conical elements, neck support elements, and other elements of the first beverage container contoured compartments 2002 may differ from the second beverage container contoured compartments 2012.

Figure 21:
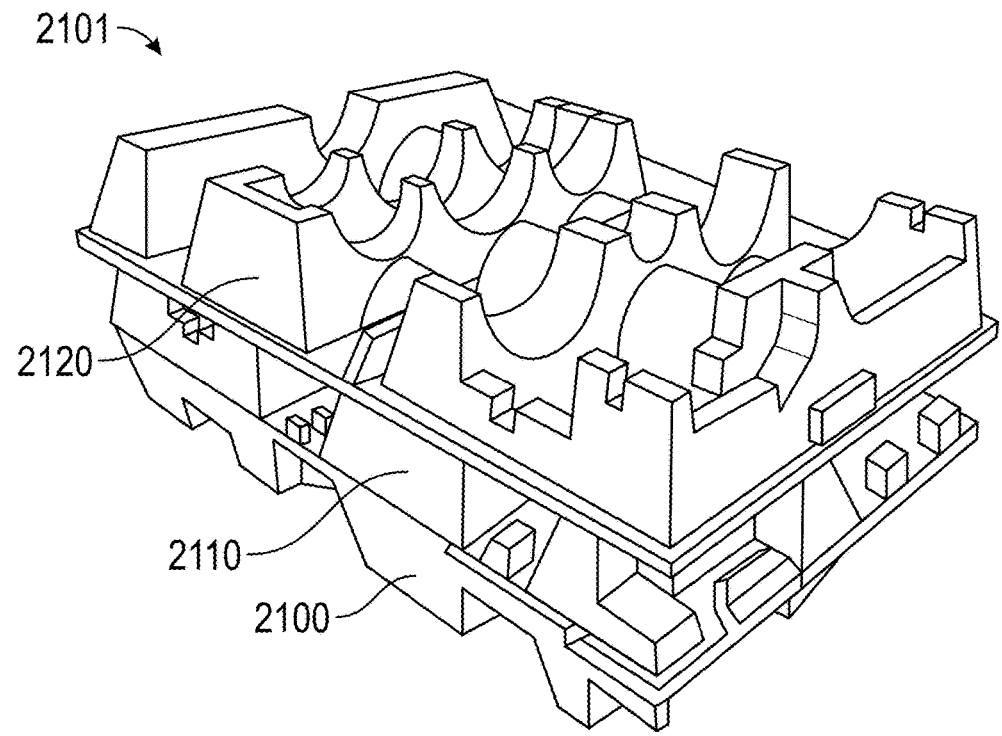
FIG. 21 depicts stacking beverage container packing trays according to various embodiments.
Figure 21:
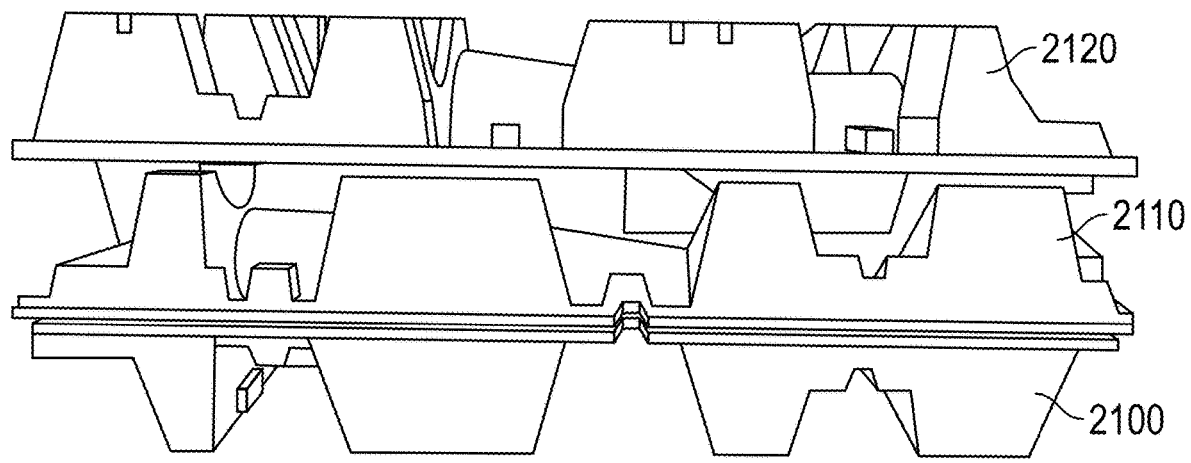

FIG. 21 depicts stacking beverage container packing trays according to various embodiments. FIG. 21 may, for example, depict steps performed after those in FIG. 20. For example, in the steps depicted in FIG. 20, beverage containers and transport thermo packs are placed in a first beverage container packing tray 2100. A second beverage container packing tray 2110 is placed on the first beverage container packing tray 2100. Beverage containers and transport thermo packs are placed on the second beverage container packing tray 2110. In the example shown, a step 2101 in assembling a beverage container packing assembly includes placing a third beverage container packing tray 2120 on the second beverage container packing tray 2110. In certain cases, the bottom side of the third beverage container packing tray 2120 may be placed on the second beverage container packing tray 2110 and the beverage containers placed on the second tray 2110. In other cases (not shown), a top side of the third beverage container packing tray 2120 is placed on the beverage container packing tray 2110.

Figure 22:
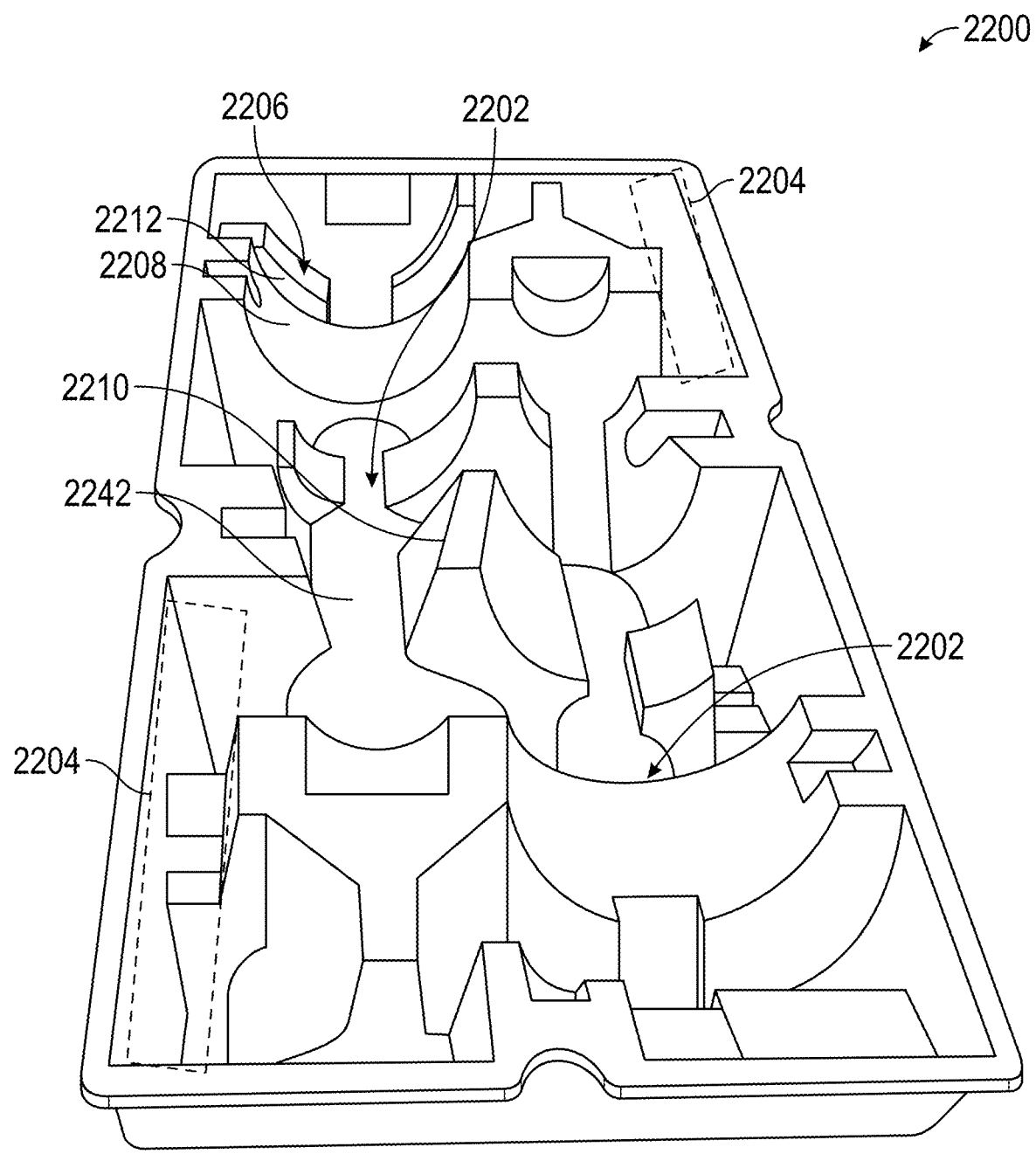
FIG. 22 depicts a beverage container packing tray according to various embodiments.

FIG. 22 depicts a beverage container packing tray according to various embodiments. In the example shown, a beverage container packing tray 2200 includes bottle contoured compartments 2202, thermo pack compartments 2204, and/or other elements. A beverage container packing tray 2200 may hold two beverage containers and two thermo transport packs. The thermo transport packs (not shown) may be placed in, for example, the thermo pack compartments 2204 denoted by the dashed rectangles. The beverage container packing tray 2200 is configured to accommodate beverage containers (not shown) in a lay flat or horizontal position. In the example shown, the beverage containers are included in the tray 2200 in a head to foot configuration where the base of one beverage container is aligned to the neck of neck of an adjacent beverage container. The bottle contoured compartments 2202 (two shown) are configured to support a beverage container that is laid flat in the tray 2200. The bottle contoured compartments 2202 may include one or more cradle elements 2206, 2208, conical elements 2210, bottle neck support elements 2242, and/or other elements.

The bottle contoured compartment 2202 may include a first cradle element 2206 and a second cradle element 2208. The cradle elements 2206, 2208 may include a semi-circular cradle shaped element structure that matches or approximates the outer shape of the beverage container. The cradle elements 2206, 2208 are configured to continuously surround a portion of the beverage container, such as half of the container. In the example shown, the cradle elements 2206, 2208 partially surround roughly half of the beverage container at two locations near the bottom of the container. The first cradle element 2206 may be configured to accommodate a lower portion of a beverage container. A second cradle element 2208 is configured accommodate a middle section of the beverage container. The first cradle element 2206 and second cradle element 2208 may be separated by recessed elements 2212. For example, the first cradle element 2206 and second cradle element 2208 may include distinct structures that independently contact the beverage container at different points.

The bottle contoured compartments 2202 include conical elements 2210. The conical element 2210 may be configured to house a tapered portion (varying diameter portion) of a beverage container. The conical element 2210 may taper to a neck of the beverage container. For example, the neck of the beverage container may be housed in bottle neck support element 2242 of bottle contoured compartment 2202. The neck of the beverage container may rest in the bottle neck support element 2242.

In various embodiments, beverage container packing tray 2200 includes multiple transport thermo pack compartments 2204. The transport thermo pack compartments 2204 are configured to house thermo packs. In certain cases, beverage containers are placed in the tray 2200, and transport thermo packs are placed in the thermo pack compartment 2204. In the example shown, the tray 2200 includes two transport thermo pack compartments 2204. The transport thermo pack compartments 2204 are configured to house thermo packs in proximity to multiple beverage containers. The geometry of the thermo pack compartments 2204 may be sized to accommodate particular thermo packs.

In certain cases, the tray 2200 of FIG. 22 may include additional features as depicted. For example, the tray 2200 may include certain features described in FIGS. 15-18.

Figure 23:
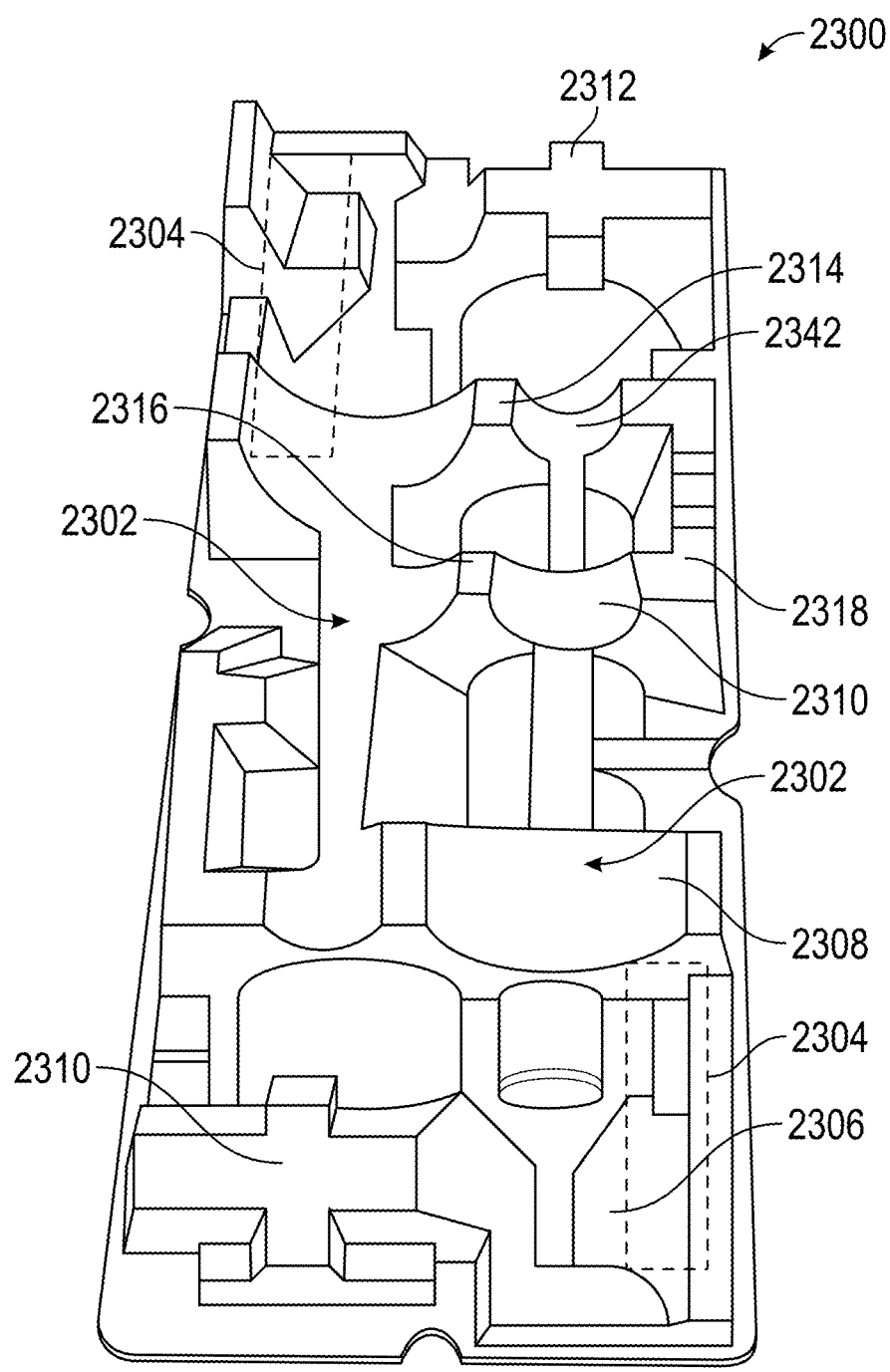
FIG. 23 depicts a beverage container packing tray according to various embodiments.

FIG. 23 depicts a beverage container packing tray according to various embodiments. In the example shown, a beverage container packing tray 2300 is depicted. The beverage container packing tray 2300 depicted may include a different view, such as a bottom view or underside view, of beverage container packing tray 2200 of FIG. 22. The beverage container packing tray 2300 may include bottle contoured compartments 2302. The tray 2300 includes a thermo pack compartments 2304. In the example shown, the locations where thermo packs are installed are depicted in dashed rectangles. Two thermo packs may be installed at locations near the corners of the beverage container packing tray 2300. In certain cases, the thermo packs may include flexible gel packs installed under the beverage containers. The bottle contoured compartments 2302 may include first cradle elements 2306, second cradle elements 2308, conical elements 2310, and bottle neck support components 2342. In certain cases, these elements include geometry to match the contours of a beverage container.

In various embodiments, beverage containers are placed in the beverage container contoured compartments 2302. For example, the tray 2300 may be stacked on top of another beverage container tray (e.g., tray 2200 of FIG. 22), and beverage containers are placed in the beverage container contoured compartments 2302 of the tray 2300. Thermo transport packs may also be placed in the tray in the thermo transport pack compartments 2304.

The beverage container packing tray 2300 includes platforms 2312-2318. The platforms allow the tray 2300 to sit steady on a flat surface, such as the bottom of shipping container, a box, a top of another tray, and/or any other relatively flat surface. In certain cases, the platforms 2312-

2318 assist in stacking of beverage tray container packing trays 2300. In the example shown, the tray 2300 includes plus-sign shaped platforms 2312. Platforms 2314 may be located in the inner portion of the tray 2300 and/or on the underside of cradle elements 2308 of FIG. 23. Platforms 2316 may be located in the inner portion of the tray 2300 and/or on the underside of conical elements 2310 of FIG. 23. Platforms 2316 may be located in the inner portion of the tray 2300 and/or on the underside of cradle elements 2210 of FIG. 22. Platforms 2318 may be located at various points around the perimeter of the tray 2300.

In certain cases, multiple beverage container trays 2300 are stacked on top of one another in a shipping container. A first tray 2300 may be placed in the bottom of the shipping container, loaded with beverage containers, and transport thermo packs. A second tray 2300 is placed on top of the first tray so the two trays encase (surround) the beverage containers, thermo transport packs, and other components. Details regarding potential stacking configurations is described in subsequent figures. Platforms 2312-2318 of a third tray may be stacked on the platforms 2312-2318 of the second tray. Because the platforms include flat or relatively flat surfaces, the trays may be efficiently stacked. The flat surfaces of the platforms 2312-2318 allow stacked beverage container trays 2300 to transmit load between trays while reducing the load applied to beverage containers housed within the trays. Stacking flat platforms 2312-2318 of one tray on the platforms of another tray allows the trays to be stacked with causing damage to of the trays, which may be fabricated out of paper-based materials that are somewhat susceptible to damage. In some instances, a first set of trays 2300 is stacked on a second set of trays 2300 during transit to ship for example four beverage containers. Additional sets of trays 2300 may be stacked to ship six, eight, or any number of beverage containers in a single package.

Figure 24:
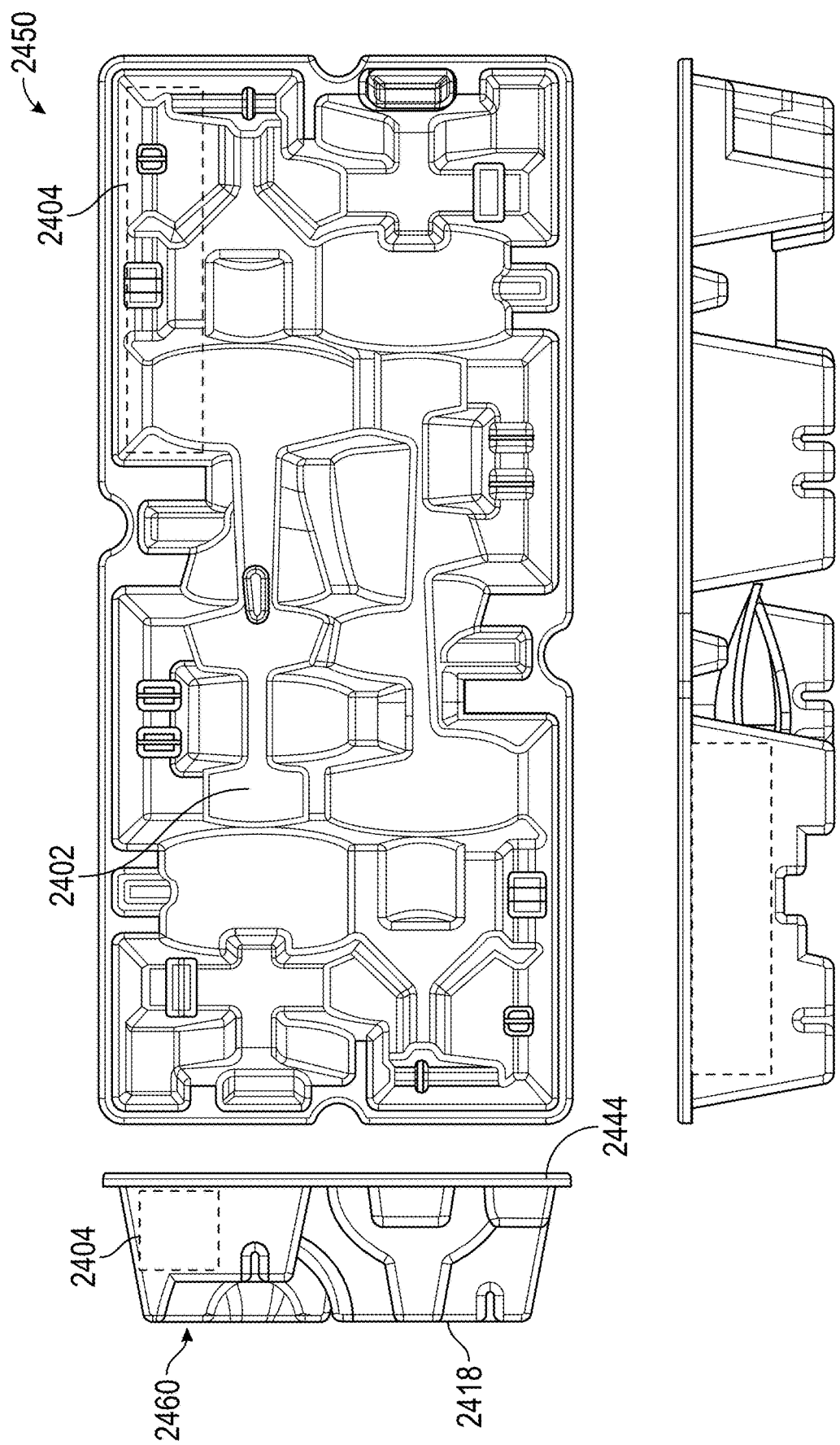
FIG. 24 depicts top and front views of a beverage container packing tray according to various embodiments.

FIG. 24 depicts top, front, and side views of a beverage container packing tray according to various embodiments. Three separate views of the beverage container packing tray 2400 are depicted in the figure shown. As shown, a top view 2450 depicts bottle contoured compartments 2402, thermo pack compartments 2404, and/or other elements. In the example shown, a front view 2460 of a beverage container packing tray includes a tray base 2418 (a bottom of a tray) and an upper surface 2444 of a tray. In the front view 2460 of a beverage container packing tray includes an end view of the bottle contoured compartments 2402 are depicted.

The beverage container packing tray 2400 may be similar to tray 2200 of FIG. 22 and/or tray 2300 of FIG. 23. In the example shown the top view 2450 depicts bottle contoured compartments 2402, a thermo pack compartments 2404, and/or other elements. The thermo pack compartments 2404 are configured to house (accommodate) thermo packs. The thermo pack compartment 2404 are located to provide optimal thermal energy transfer between the beverage container and transport thermo pack. The thermo pack compartments 2404 are placed at multiple locations denoted by rectangles to provide consistent thermal control across the tray 2400.

Figure 25:
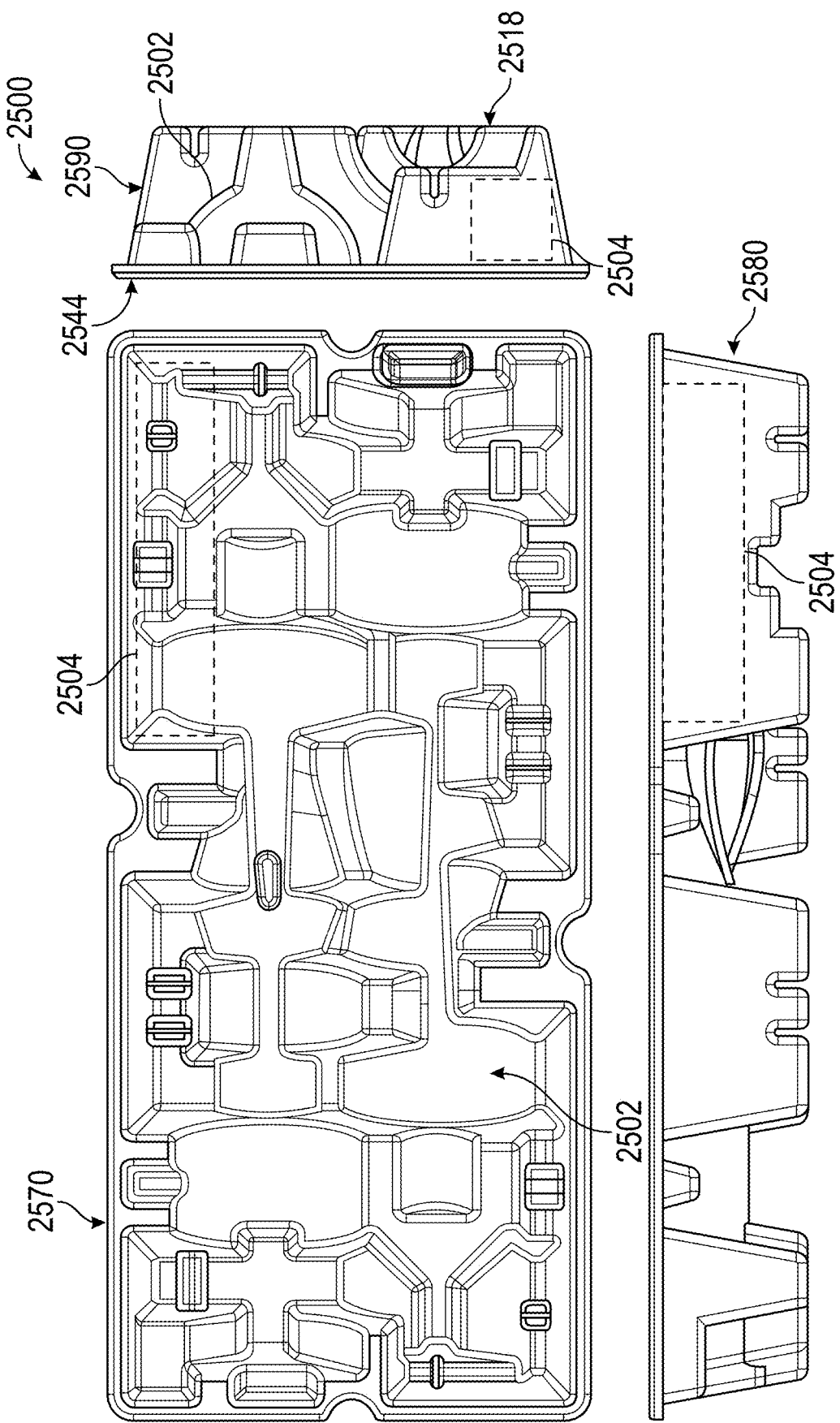
FIG. 25 depicts bottom, side, and back views of a beverage container packing tray according to various embodiments.

FIG. 25 depicts bottom, side, and back views of a beverage container packing tray according to various embodiments. Three separate views of the beverage container packing tray 2500 are depicted in the figure shown. As shown, a bottom view 2570 depicts bottle contoured compartments 2502, thermo pack compartments 2504, and/or other elements. In the example shown, the side view 2580 of a beverage container packing tray includes an end view of the bottle contoured compartments 2502 are depicted. A back view 2590 of a beverage container packing tray includes a tray base 2518 (a bottom of a tray) and an upper surface 2544 of a tray.

In various embodiments, beverage containers may be placed in the beverage container contoured compartments 2502 and transport thermo packs are placed in the transport thermo pack compartments 2504.

Figure 26:
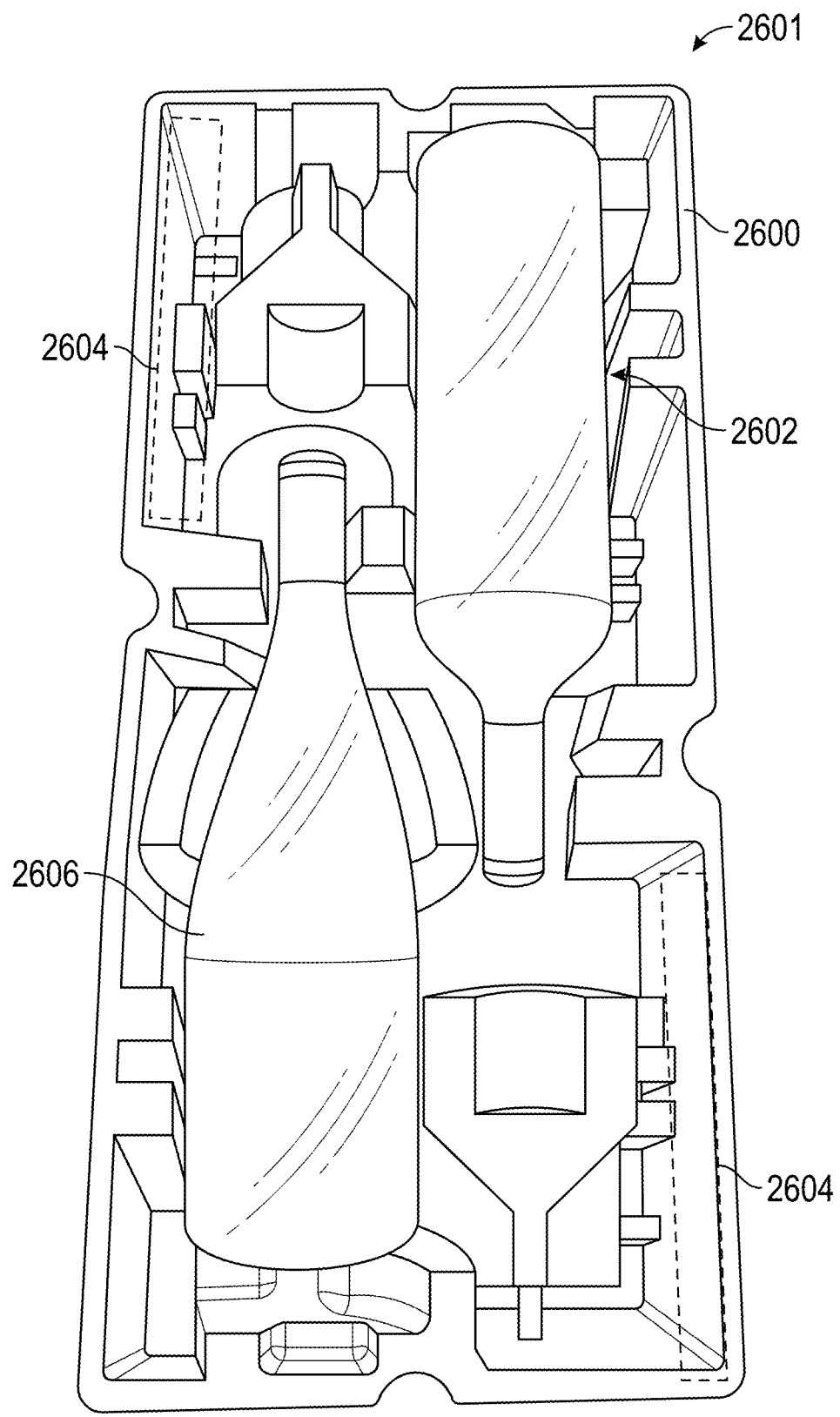
FIG. 26 depicts beverage containers in a beverage container packing tray according to various embodiments.

FIG. 26 depicts beverage containers in a beverage container packing tray according to various embodiments. In the example shown, a portion of a beverage container packing assembly 2601 includes a beverage container packing tray 2600, beverage containers 2606 (two shown), thermo transport packs (not shown), and/or other elements. The beverage containers 2606 are placed in the tray 2600 in a horizontal (lay flat) configuration. Transport thermo packs (not show) are placed in the tray 2600 in transport thermo pack compartments 2604 along the perimeter of the tray 2600. The transport thermo packs may be positioned adjacent to multiple beverage containers 2606.

In the example shown, beverage containers 2606 are placed in beverage container contoured compartments 2602. The beverage container contoured compartments 2602 include first bottle cradle elements, second bottle cradle elements, conical elements, bottle neck support elements, and/or other components as described herein in, for example, FIG. 23. As shown, these elements are configured to match the contour of the beverage container 2606. Transport thermo packs are placed in the transport thermo pack compartments 2604. In the example shown, the transport thermo pack compartments 2604 are located near the corners of the tray 2600. Though in other configurations, transport thermo pack compartments 2604 may be included in other locations, such as between the beverage containers, around portions of the beverage containers, and/or in other locations. For example, additional transport thermo packs may be placed in the tray 2600 at any feasible location. Transport thermo packs may be sized to fit in various locations within the packaging.

Figure 27:
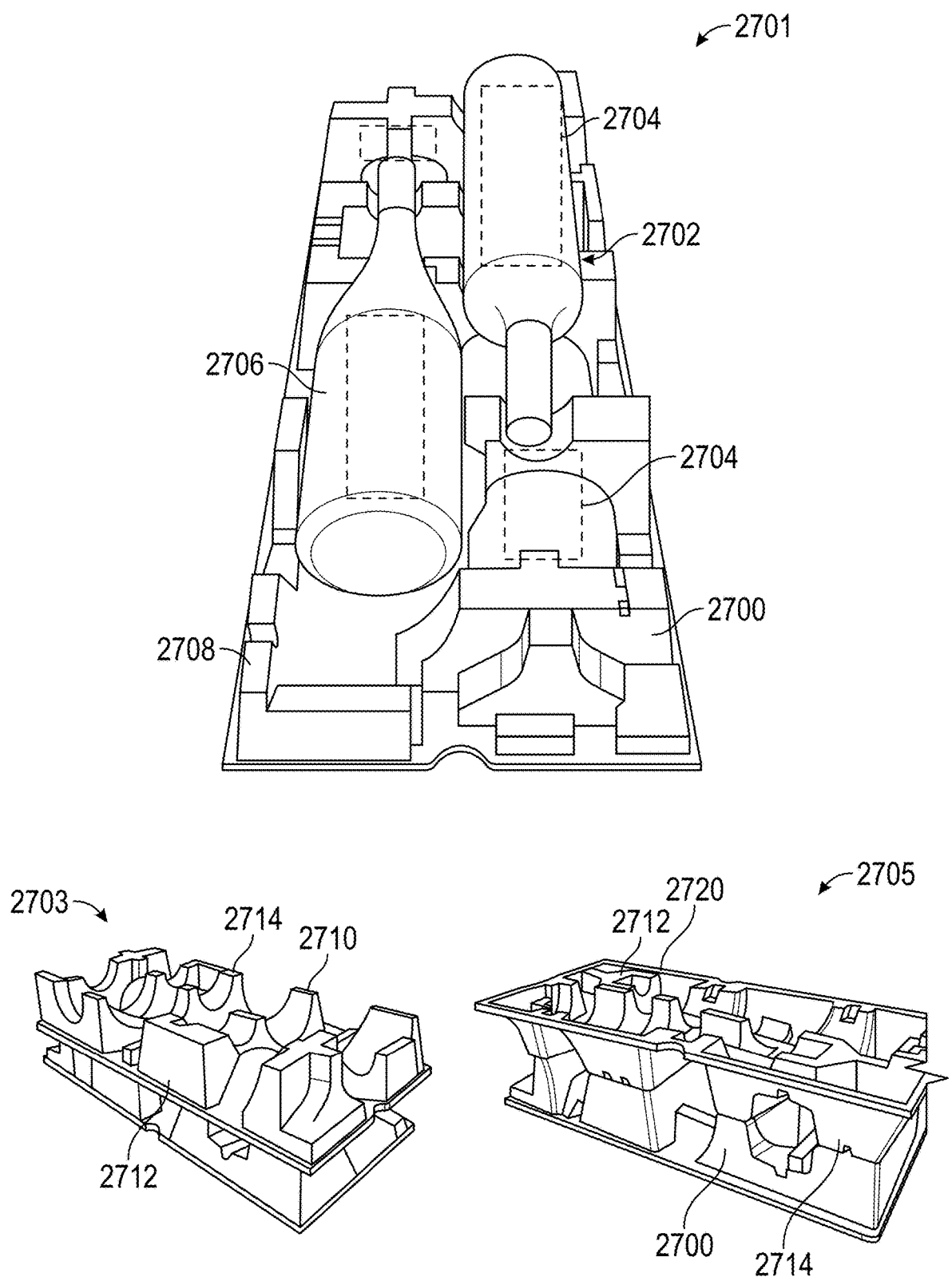
FIG. 27 depicts stacking beverage container packing trays according to various embodiments.

FIG. 27 depicts stacking beverage container packing trays according to various embodiments. FIG. 27 may, for example, depict steps performed after those in FIG. 26. In the example shown, a first step 2701 in assembling a beverage container packing assembly includes placing beverage containers 2706 in a first beverage container packing tray 2700. The beverage containers 2706 may be placed in beverage container contoured compartments 2702 in the first beverage container packing tray 2700. The beverage containers 2706 are placed in the tray 2700 in a horizontal (lay flat) configuration. Thermo transport packs are also placed in the tray 2700 in, for example, thermo pack compartments 2704 (e.g., denoted with dashed-line rectangles). The thermo pack compartments 2704 may be located, for example, along the perimeter of the tray 2700.

In a next step 2703, a second beverage container packing tray 2710 is placed on the first beverage container packing tray 2700. Transport thermo packs are placed the second beverage container tray 2710 and additional beverage containers (not shown) are placed on the second beverage container packing tray 2710. The second tray 2710 may be placed on the first tray 2700 so that the two trays encapsulate the beverage containers 2706 and transport thermo packs placed on the first tray 2700. In the example shown in step 2703, the first tray 2700 and second tray 2710 are a similar (if not identical) design. Beverage containers 2706 are placed on a top side 2708 of the first tray 2700, and the bottom side 2712 of the second tray 2710 is placed on the top side 2708 of first tray 2700. Additional beverage containers and/or transport thermo packs are placed on the top side 2714 of the second tray 2710.

In an alternative next step 2705, which may be an alternative to step 2703, a second beverage container packing tray 2720 is placed on the first beverage container packing tray 2700. The second tray 2720 may be placed on the first tray 2700 so that the two trays encapsulate the beverage containers 2706 and transport thermo packs placed on the first tray 2700. In the example shown in step 2705, the first tray 2700 and second tray 2720 are a similar (if not identical) design. Beverage containers 2706 are placed on a top side 2708 of the first tray 2700, and the top side 2714 of the second tray 2720 is placed on the top side 2708 of first tray 2700. Additional beverage containers and/or transport thermo packs are placed on the top side 2712 of the second tray 2710.

Figure 28:
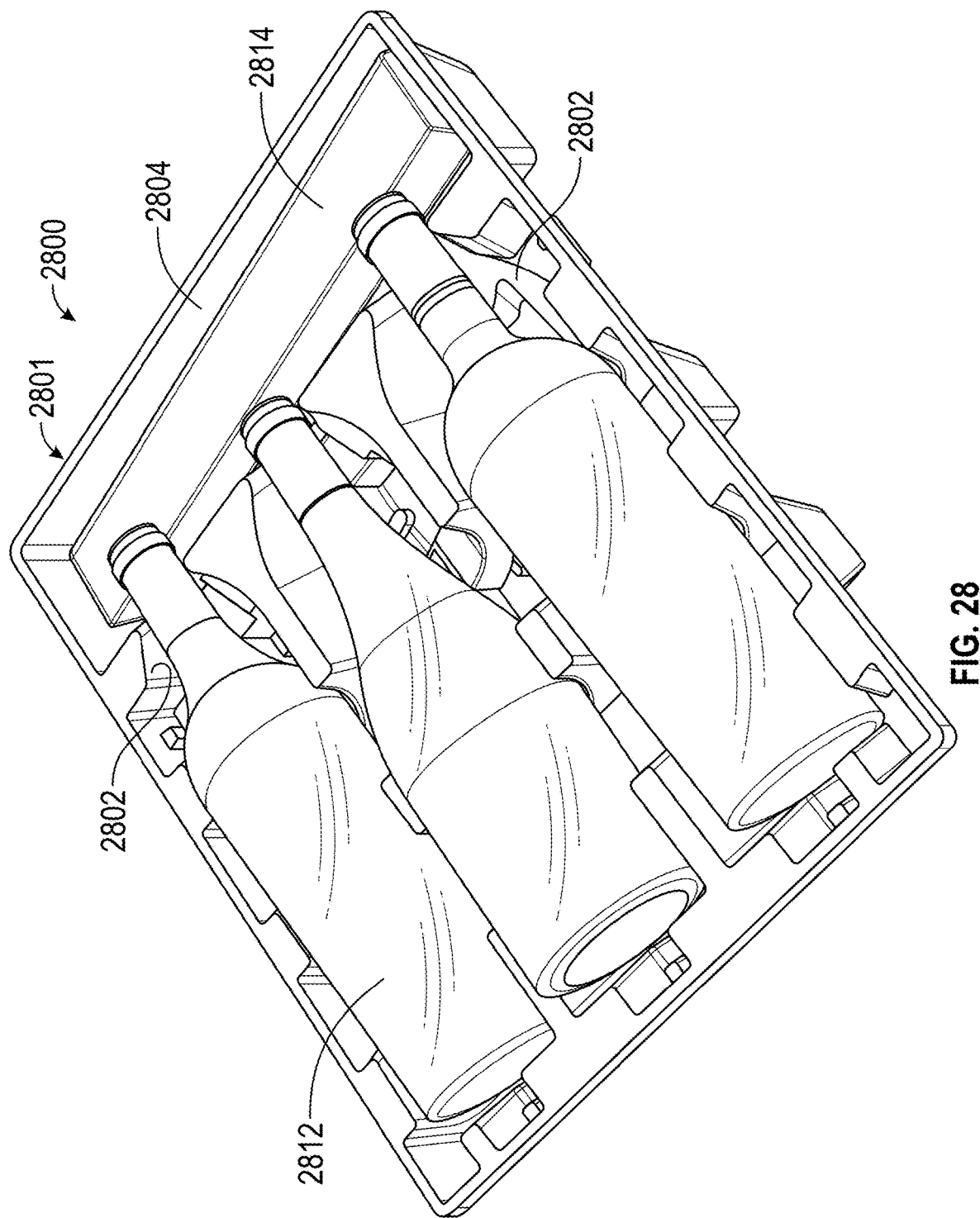
FIG. 28 depicts a beverage container packing tray, beverage containers, and a thermo pack according to various embodiments.

FIG. 28 depicts a beverage container packing tray, beverage containers, and a thermo pack according to various embodiments. In the example shown, a beverage container packaging assembly 2800 includes beverage container packing tray 2801. The beverage container packing tray 2801 includes one or more bottle contoured compartments 2802 (three shown), one or more thermo pack compartments 2804, and/or other features. In the example shown, the beverage container packing tray 2801 includes three bottle contoured compartments 2802. The bottle contoured compartments 2802 are configured to accommodate a beverage container 2812. The bottle contoured compartments 2802 may be molded to match or resemble the general shape of the beverage container 2812. The bottle contoured compartments 2802 may be shaped to protect a beverage container 2812 during transit. The bottle contoured compartments 2802 may be shaped to constrain the beverage container 2812 from movement. The thermo pack compartments 2804 are configured to accommodate one or more thermo packs 2814. In the example shown, the thermo pack compartment 2804 is configured to accommodate one or more thermo packs 2814 in proximity to the neck of the beverage container 2812. By placing thermo packs 2814 close to the neck of the beverage container (and away from much of the liquid in the beverage container), the thermo pack may maintain a consistent temperature in the packaging assembly 2800 without overcooling (e.g., freezing) or overheating the liquid in the container 2812. In some scenarios, the thermo packs are installed to maintain the beverage container 2812 contents at a desired temperature range, such as cellar temperature for wines and similar spirits. In certain cases, the thermo pack 2814 may be shaped to match the geometry of the thermo pack compartment 2804. In some instances, the thermo pack compartment 2804 is shaped to accommodate different thermo packs 2814 of varying size, shape, weight, and the like.

In certain cases, an additional beverage container packing tray (not shown) may be placed on the beverage container packing tray 2801. The additional packing tray (not shown) may include thermo pack compartments, bottle contoured compartments, and/or similar features. The additional beverage container packing tray may accommodate additional thermo packs. The additional beverage container packing tray (and thermo pack) may be placed on top of the beverage container packing tray 2801. Upon assembly the neck portions of the bottle may be in proximity to two thermo packs 2814. The beverage container packaging assembly 2800 may be placed in a box for transit. In certain cases, multiple beverage container packing assemblies 2800 may be placed in a box, for example, stacked on top of each other.

Figure 29:
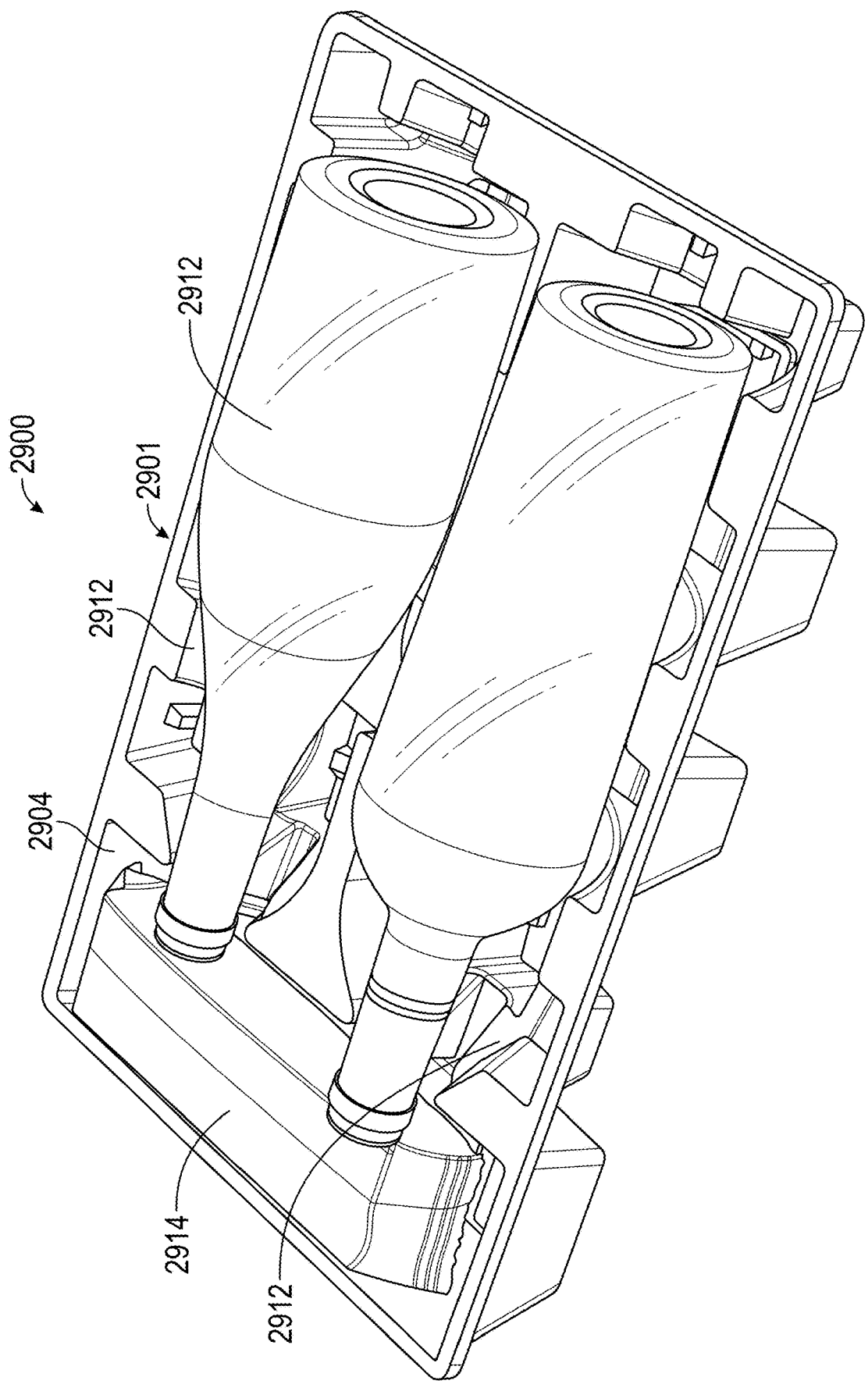
FIG. 29 depicts a beverage container packing tray, beverage containers, and a thermo pack according to various embodiments.

FIG. 29 depicts a beverage container packing tray, beverage containers, and a thermo pack according to various embodiments. In the example shown, a beverage container packaging assembly 2900 includes beverage container packing tray 2901. The beverage container packing tray 2901 includes one or more bottle contoured compartments 2902 (two shown), one or more thermo pack compartments 2904, and/or other features. In the example shown, the beverage container packing tray 2901 includes two bottle contoured compartments 2902. The thermo pack compartments 2904 are configured to accommodate one or more thermo packs 2914. In the example shown, the thermo pack compartment 2904 is configured to accommodate one or more thermo packs 2914 in proximity to the neck of the beverage container 2912. By placing thermo packs 2914 close to the neck of the beverage container (and away from much of the liquid in the beverage container), the thermo pack may maintain a consistent temperature in the packaging assembly 2900 without overcooling (e.g., freezing) or overheating the liquid in the container 2912. In certain cases, an additional beverage container packing tray (not shown) may be placed on the beverage container packing tray 2901. The additional packing tray (not shown) may include thermo pack compartments, bottle contoured compartments, and/or similar features. The additional beverage container packing tray may accommodate additional thermo packs. The additional beverage container packing tray (and thermo pack) may be placed on top of the beverage container packing tray 2901. Upon assembly the neck portions of the bottle may be in proximity to two thermo packs 2914. The beverage container packaging assembly 2900 may be placed in a box for transit. In certain cases, multiple beverage container packing assemblies 2900 may be placed in a box, for example, stacked on top of each other.

Figure 30:
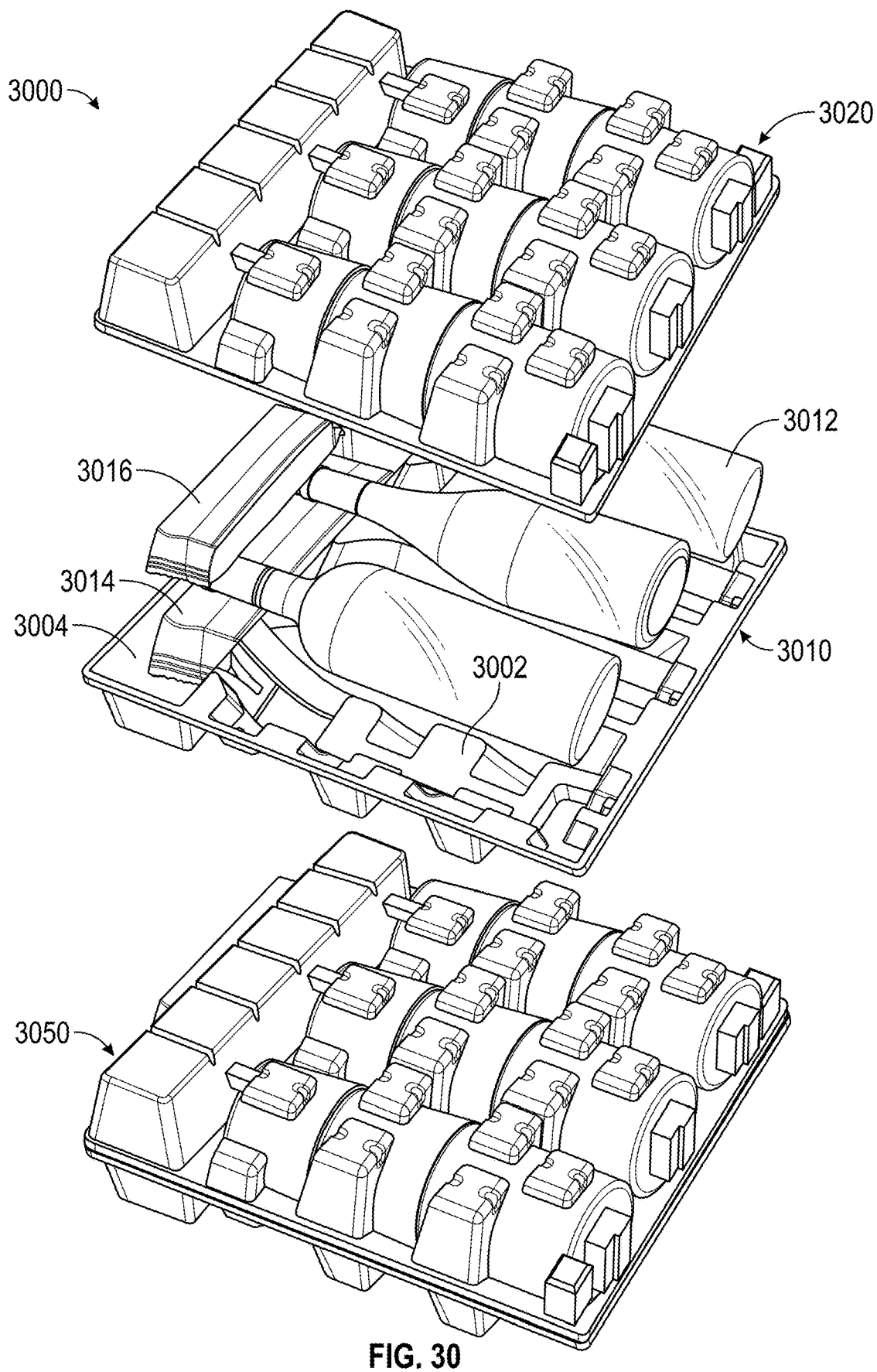
FIG. 30 depicts assembling beverage container packing trays according to various embodiments.

FIG. 30 depicts assembling beverage container packing trays according to various embodiments. In the example shown, a first step 3000 in assembling a beverage container packing assembly includes placing transport thermo packs 3014 in a first beverage container packing tray 3010. The thermo transport packs 3014 are placed in the tray 3010 in thermo pack compartments 3004. Beverage containers 3012 are placed in the first tray 3010 in, for example, bottle contoured compartments 3002. The beverage containers 3012 are placed in the tray 3010 in a horizontal (lay flat) configuration. Additional transport thermo packs 3016 may be placed in the tray 3010. In certain cases, a first thermo transport pack 3014 is placed in the thermo pack compartment 3004, beverage containers 3012 are placed in the first beverage container packing tray 3010, and a second thermo transport pack 3016 is placed on top of the first thermo transport pack 3014 and/or upper (neck) portions of a beverage container 3012. The thermo transport packs 3014, 3016 may surround (e.g., sandwich) the upper portions of the beverage containers 3012.

In a next step 3050, a second beverage container packing tray 3020 is placed on the first beverage container packing tray 3010. The second tray 3020 may be placed on the first tray 3010 so that the two trays encapsulate the beverage containers 3012 and transport thermo packs 3014, 3016. In the example shown in step 3050, the first tray 3010 and second tray 3020 are a similar (if not identical) design. After completion of step 3050, the beverage container packaging assembly may be placed in a box for transit. In certain cases, multiple beverage container packing assemblies may be placed in a box, for example, stacked on top of each other.

Figure 31:
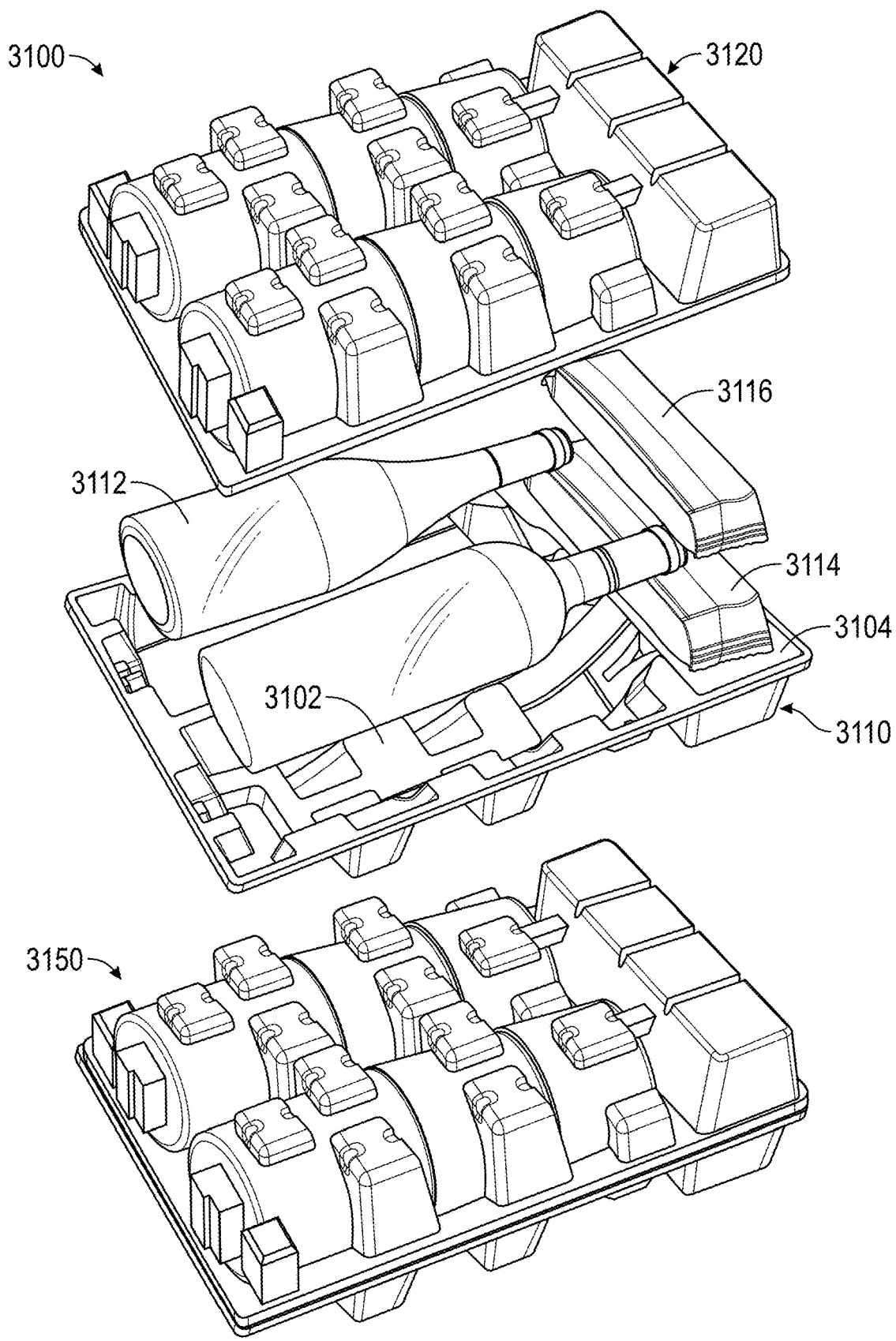
FIG. 31 depicts assembling beverage container packing trays according to various embodiments.

FIG. 31 depicts assembling beverage container packing trays according to various embodiments. The techniques depicted in FIG. 31 are similar to those depicted in FIG. 30, with one difference being that FIG. 31 depicts trays that accommodate two beverages, as opposed to trays accommodating three beverage containers as depicted in FIG. 30. In the example shown, a first step 3100 in assembling a beverage container packing assembly includes placing transport thermo packs 3114 in a first beverage container packing tray 3110. The thermo transport packs 3114 are placed in the tray 3110 in thermo pack compartments 3104. Beverage containers 3112 are placed in the first tray 3110 in, for example, bottle contoured compartments 3102. The beverage containers 3112 are placed in the tray 3110 in a horizontal (lay flat) configuration. Additional transport thermo packs 3116 may be placed in the tray 3110. In certain cases, a first thermo transport pack 3114 is placed in the thermo pack compartment 3104, beverage containers 3112 are placed in the first beverage container packing tray 3110, and a second thermo transport pack 3116 is placed on top of the first thermo transport pack 3114 and/or upper (neck) portions of a beverage container 3112. The thermo transport packs 3114, 3116 may surround (e.g., sandwich) the upper portions of the beverage containers 3112.

In a next step 3150, a second beverage container packing tray 3120 is placed on the first beverage container packing tray 3110. The second tray 3120 may be placed on the first tray 3110 so that the two trays encapsulate the beverage containers 3112 and transport thermo packs 3114, 3116. In the example shown in step 3150, the first tray 3110 and second tray 3120 are a similar (if not identical) design. After completion of step 3150, the beverage container packaging assembly may be placed in a box for transit. In certain cases, multiple beverage container packing assemblies may be placed in a box, for example, stacked on top of each other.

Figure 32:
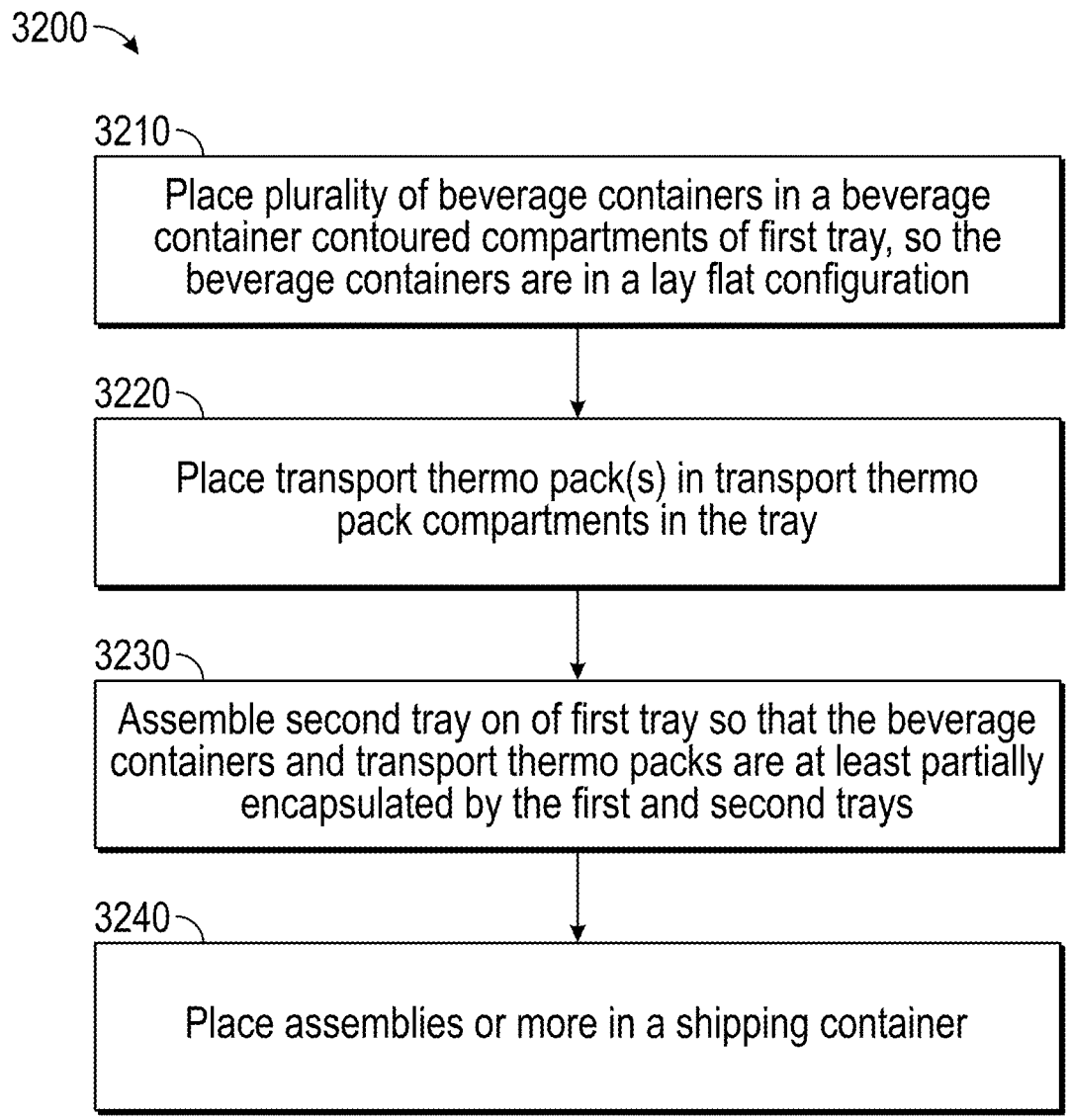
FIG. 32 is a flowchart depicting a method of packing beverage containers according to various embodiments.

FIG. 32 is a flowchart depicting a method of packing beverage containers according to various embodiments. In the example shown, a method 3200 of packing beverage containers id disclosed. The method 3200 includes placing (3210) a plurality of beverage containers in a beverage container contoured compartments in a first tray. The beverage containers are placed in the contoured compartments so the beverage containers lay flat in the tray. In certain cases, the tray may be placed in a shipping container prior to assembly as described herein.

The method includes placing (3220) transport thermo packs in transport thermo pack compartments in the tray. The tray may include specific compartments designed to accommodate transport thermo packs. The transport thermo pack compartments may be located such that the transport thermo packs are placed near the upper portion (e.g., neck) of beverage container. Such a configuration is depicted, for example, in FIGS. 1-14 and 28-31. The transport thermo pack compartments may be located in a tray such that the thermo packs are placed around the outside of the tray, thereby surrounding beverage containers place in the center portion of the tray. Such as configuration is depicted, for example, in FIGS. 15-27.

The method includes assembling (3230) a second tray on the first tray so that the beverage containers and transport thermo packs are at least partially encapsulated by the first and second trays. For example, the second tray may be placed on top of the first tray housing the beverage containers and transport thermo packs. The two trays may sandwich and/or substantially surround the beverage containers and thermo packs.

The method includes placing (3240) assemblies of beverage container packing trays, beverage containers, and/or transport thermo packs in a shipping container. For example, the assembly first and second tray of step 3230 may be placed in the shipping container. In certain cases, multiple assemblies may be placed in the shipping container. The assemblies may be placed in the shipping container, such that the assemblies and trays are stacked on top of one another. Platforms of a beverage container tray may be stacked on the platforms of another beverage container tray. As discussed herein, the platforms are configured to allow the trays to efficiently stack on top of one another. In certain cases, multiple tray assemblies each housing two beverage containers and thermo transport packs are placed in the shipping container. When fully assembled, the shipping container may include, for example, two pairs of trays for a total of four beverage containers, three pairs of trays for a total of six beverage containers, and/or other configurations. In other cases, multiple tray assemblies each housing three beverage containers and thermo transport packs are placed in the shipping container. When fully assembled, the shipping container in this configuration may include, for example, two pairs of trays for a total of six beverage containers, three pairs of trays for a total of nine beverage containers, and/or other configurations.

In various embodiments, a box liner is placed in the shipping container. The box liner may include insulating material. In certain cases, the box liner may be, for example, placed in the shipping container before the beverage container trays are placed in the shipping container. The box liner may resemble and/or follow the contour of the inner surface of the shipping container. In certain cases, the box liner and shipping container may resemble a box within a box. With the box liner in place, for example along the inside of the shipping container, the bottom tray and beverage containers may then be placed in the beverage container package. In some cases, the box liner may be added to the shipping container after the bottom tray, center support, top tray, and beverage containers. The box liner may in conjunction with for example, the thermo transport packs may increase the R value of the cooling time range for the beverage container packaging.

While various embodiments have been described above, it should be understood that they have been presented by way of example only, and not limitation. Thus, the breadth and scope of the disclosure should not be limited by any of the above-described illustrative embodiments but should instead be defined only in accordance with the following claims and their equivalents.

The invention claimed is:

1. A beverage container packing tray, comprising:
  a plurality of beverage container contoured compartments each configured to receive one or more beverage containers in a lay flat configuration, and each of the beverage container contoured compartments including at least a cradle element, a conical element, and a neck support element; and
  at least one thermo pack compartment, the thermo pack compartment configured to receive a transport thermo pack at least partially in contact with, in the beverage container packing tray with, and adjacent to at least a portion of the beverage containers,
  wherein the thermo pack compartment includes a recessed area configured to house the transport thermo pack adjacent to a neck of a beverage container.

2. The beverage container packing tray according to claim 1, wherein the thermo pack compartment is located adjacent to a portion of the beverage container contoured compartments that is configured to house an upper portion of a beverage container.

3. The beverage container packing tray according to claim 1, wherein the thermo pack compartment includes the recessed area configured to house the transport thermo pack between necks of the beverage containers.

4. The beverage container packing tray according to claim 1, wherein the at least one thermo pack compartment is located adjacent at least one of the beverage container contoured compartments.

5. The beverage container packing tray according to claim 1, further comprising a plurality of platforms with substantially flat surfaces that allow the beverage container packing tray to be stacked on another, substantially similar, beverage container packing tray.

6. The beverage container packing tray according to claim 1, wherein the beverage container contoured compartments include a plurality of recessed elements.

7. The beverage container packing tray according to claim 1, wherein the beverage container contoured compartments further include a spine element connecting the cradle element and the conical element.

8. The beverage container packing tray according to claim 1, wherein the thermo pack compartment is located adjacent to a corner of the beverage container packing tray.

9. The beverage container packing tray according to claim 1, wherein the beverage container packing tray is configured to at least partially encapsulate the one or more beverage container and transport thermo pack.

10. A beverage container packing system, comprising:
a first beverage container packing tray including beverage container contoured compartments and one or more thermo pack compartments, each of the beverage container contoured compartments configured to receive a beverage container in a lay flat configuration and the thermo pack compartments configured to receive a transport thermo pack at least partially in contact with, in the first beverage container packing tray with, and adjacent to at least a portion of a beverage container; and
a second beverage container packing tray defining second beverage container contoured compartments and second thermo pack compartments, the second beverage container packing tray substantially similar to the first beverage container packing tray,
wherein at least one of the one or more thermo pack compartments includes a recessed area configured to house the transport thermo pack adjacent to a neck of a beverage container.

11. The beverage container packing system according to claim 10, further comprising a shipping container configured to receive the first and second beverage container packing trays.

12. The beverage container packing system according to claim 10, further comprising a box liner configured to receive at least the first and second beverage container packing trays inside of the shipping container.

13. The beverage container packing system according to claim 10, wherein the beverage container contoured compartments include a bottle cradle element, a conical element, and a bottle neck support element.

14. The beverage container packing system according to claim 13, wherein the bottle neck support element terminates at a partition wall so that a neck of the beverage container passes through the partition wall into the thermo pack compartment.

15. The beverage container packing system according to claim 13, wherein the beverage container contoured compartments further include a spine element connecting the bottle cradle element and the conical element.

16. The beverage container packing system according to claim 10, wherein at least one of the one or more thermo pack compartments is located adjacent to a portion of the beverage container contoured compartment that is configured to house an upper portion of a beverage container.

17. The beverage container packing system according to claim 10, wherein the at least one thermo pack compartment includes the recessed area configured to house the transport thermo pack between necks of a plurality of beverage containers.

18. The beverage container packing system according to claim 10, wherein the one or more thermo pack compartments are located adjacent to corners of the first beverage container packing tray and second beverage container packing tray.

19. The beverage container packing system according to claim 10, wherein the first and second beverage container packing trays are configured to at least partially encapsulate the beverage container and transport thermo packs.

20. The beverage container packing system according to claim 10, wherein the first and second beverage container packing trays include a plurality of platforms with substantially flat surfaces that allow the first beverage container packing tray and second beverage container packing tray to be stacked.

21. The beverage container packing system according to claim 10, wherein the beverage container contoured compartments and the thermo pack compartment are separated by a partition wall.

22. The beverage container packing system according to claim 10, wherein the beverage container contoured compartments include a plurality of recessed elements.

* * * * *